(12) United States Patent (10) Patent No.: US 9,090,312 B2
Urabe et al. (45) Date of Patent: Jul. 28, 2015

(54) CONTINUOUSLY VARIABLE BICYCLE TRANSMISSION

(75) Inventors: Hiroyuki Urabe, Osaka (JP); Akihiko Shoge, Osaka (JP); Takashi Yamamoto, Osaka (JP)

(73) Assignee: Shimano Inc., Osaka (JP)

( * ) Notice: Subject to any disclaimer, the term of this patent is extended or adjusted under 35 U.S.C. 154(b) by 605 days.

(21) Appl. No.: 13/348,839

(22) Filed: Jan. 12, 2012

(65) Prior Publication Data

US 2013/0184115 A1 Jul. 18, 2013

(51) Int. Cl.
*F16H 37/02* (2006.01)
*B62M 11/10* (2006.01)
*F16H 15/16* (2006.01)
*B62M 11/14* (2006.01)
*F16H 15/20* (2006.01)

(52) U.S. Cl.
CPC ............. *B62M 11/10* (2013.01); *B62M 11/14* (2013.01); *F16H 15/16* (2013.01); *F16H 37/022* (2013.01); *F16H 15/20* (2013.01)

(58) Field of Classification Search
CPC ........ F16H 15/16; F16H 15/20; F16H 37/022
USPC ......... 475/183, 190, 193, 197, 207, 214, 300; 192/217, 217.4
See application file for complete search history.

(56) References Cited

U.S. PATENT DOCUMENTS

| 4,680,985 | A | | 7/1987 | Troester |
| 5,876,299 | A | * | 3/1999 | Kim et al. ................. 475/215 |
| 5,984,820 | A | | 11/1999 | Wedeniwski |
| 7,273,433 | B1 | | 9/2007 | Troester |
| 7,762,919 | B2 | | 7/2010 | Smithson et al. |
| 7,803,077 | B1 | | 9/2010 | Spaude |
| 8,047,956 | B2 | | 11/2011 | Frank |

FOREIGN PATENT DOCUMENTS

| CN | 2341885 | Y | | 10/1999 | |
| JP | 54-045051 | A | | 4/1979 | |
| JP | 01234637 | A | * | 9/1989 | ............. F16F 15/20 |
| JP | 11-270641 | A | | 10/1999 | |
| JP | 2002-372114 | A | | 12/2002 | |
| JP | 2005-331024 | A | | 12/2005 | |

* cited by examiner

*Primary Examiner* — Derek D Knight
(74) *Attorney, Agent, or Firm* — Global IP Counselors

(57) ABSTRACT

A continuously variable bicycle transmission includes a ring roller, a first conical planetary roller, a first carrier and a sun roller. The first conical planetary roller is frictionally engaged with the ring roller. The first carrier rotatably supports the first conical planetary roller. The sun roller is movable along an axis. The sun roller is frictionally engaged with the first conical planetary roller.

51 Claims, 15 Drawing Sheets

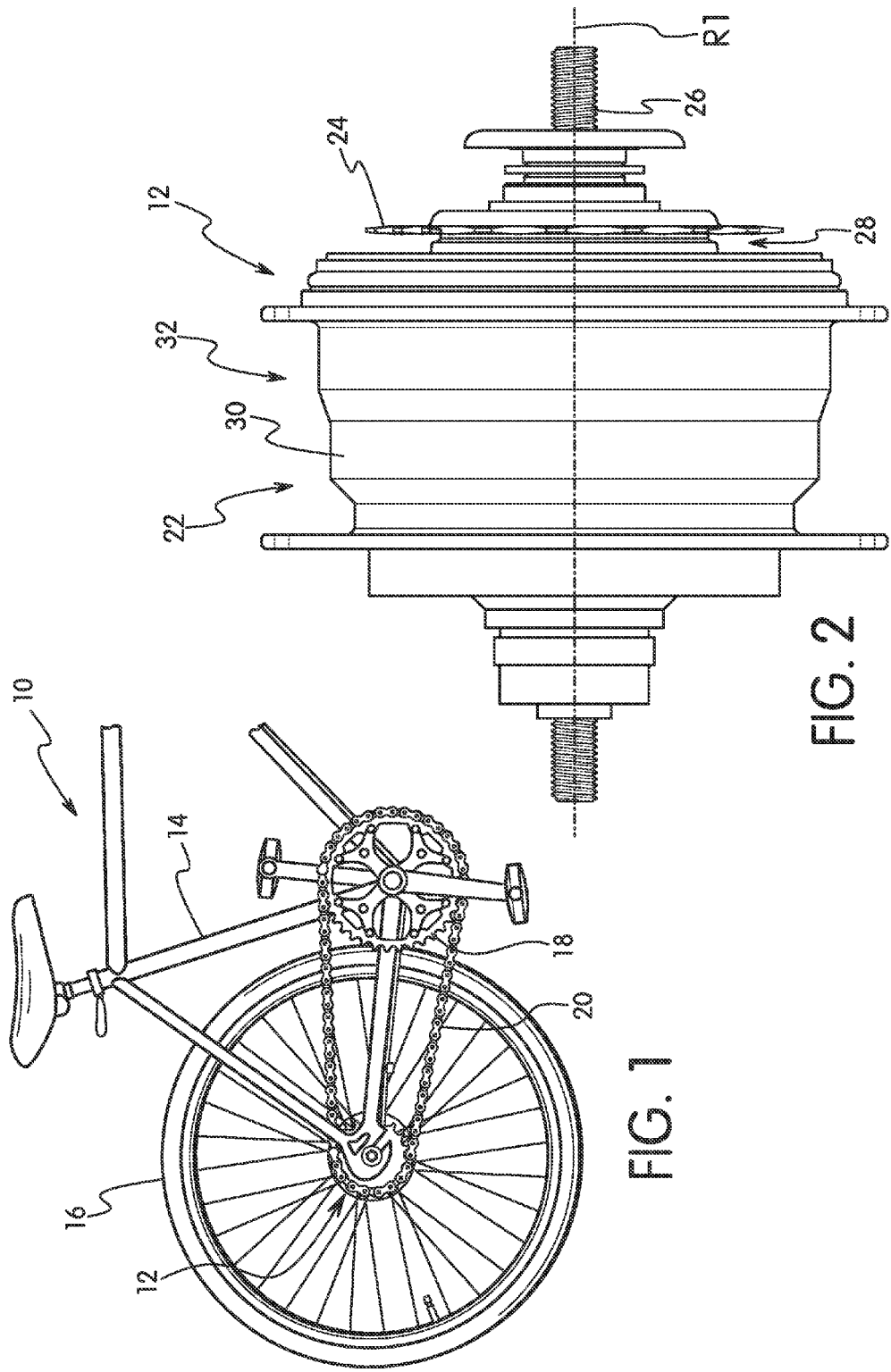

CONTINUOUSLY VARIABLE BICYCLE TRANSMISSION

BACKGROUND

1. Field of the Invention

This invention generally relates to a continuously variable bicycle transmission. More specifically, the present invention relates to a continuously variable bicycle transmission having a frictional roller.

2. Background Information

Bicycles are typically provided with a chain drive that includes a rear drive sprocket mounted to a rear hub that is mounted to a rear portion of a frame of a bicycle. Some bicycles are provided with a rear hub that includes an internal gearing mechanism for shift among a plurality of gears to change an output gear ratio from a drive sprocket. This type of rear hub is often called an internally geared hub. Some internally geared hubs are provided with a continuously variable transmission. One example of an internally geared hub having a continuously variable transmission is disclosed in U.S. Pat. No. 7,762,919. In this internally geared hub of this publication, the continuously variable transmission uses spherical speed adjusters that each has a liftable axis of rotation. The spherical speed adjusters are distributed in a plane about a longitudinal axis of the continuously variable transmission.

SUMMARY

It may be desirable that a continuously variable transmission has a simple mechanism in view of assembly or maintenance of the continuously variable transmission. One aspect presented in this disclosure is to provide a continuously variable bicycle transmission, which has a simpler mechanism.

The foregoing objects can basically be attained by providing a continuously variable bicycle transmission includes a ring roller, a first conical planetary roller, a first carrier and a sun roller. The first conical planetary roller is frictionally engaged with the ring roller. The first carrier rotatably supports the first conical planetary roller. The sun roller is movable along an axis. The sun roller is frictionally engaged with the first conical planetary roller.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure:

FIG. 1 is a side elevational view of a bicycle with a hub assembly having a continuously variable bicycle transmission unit in accordance with a first embodiment;

FIG. 2 is a front elevational view of the hub assembly having the continuously variable bicycle transmission unit illustrated in FIG. 1;

DETAILED DESCRIPTION OF EMBODIMENTS

Figure 3:
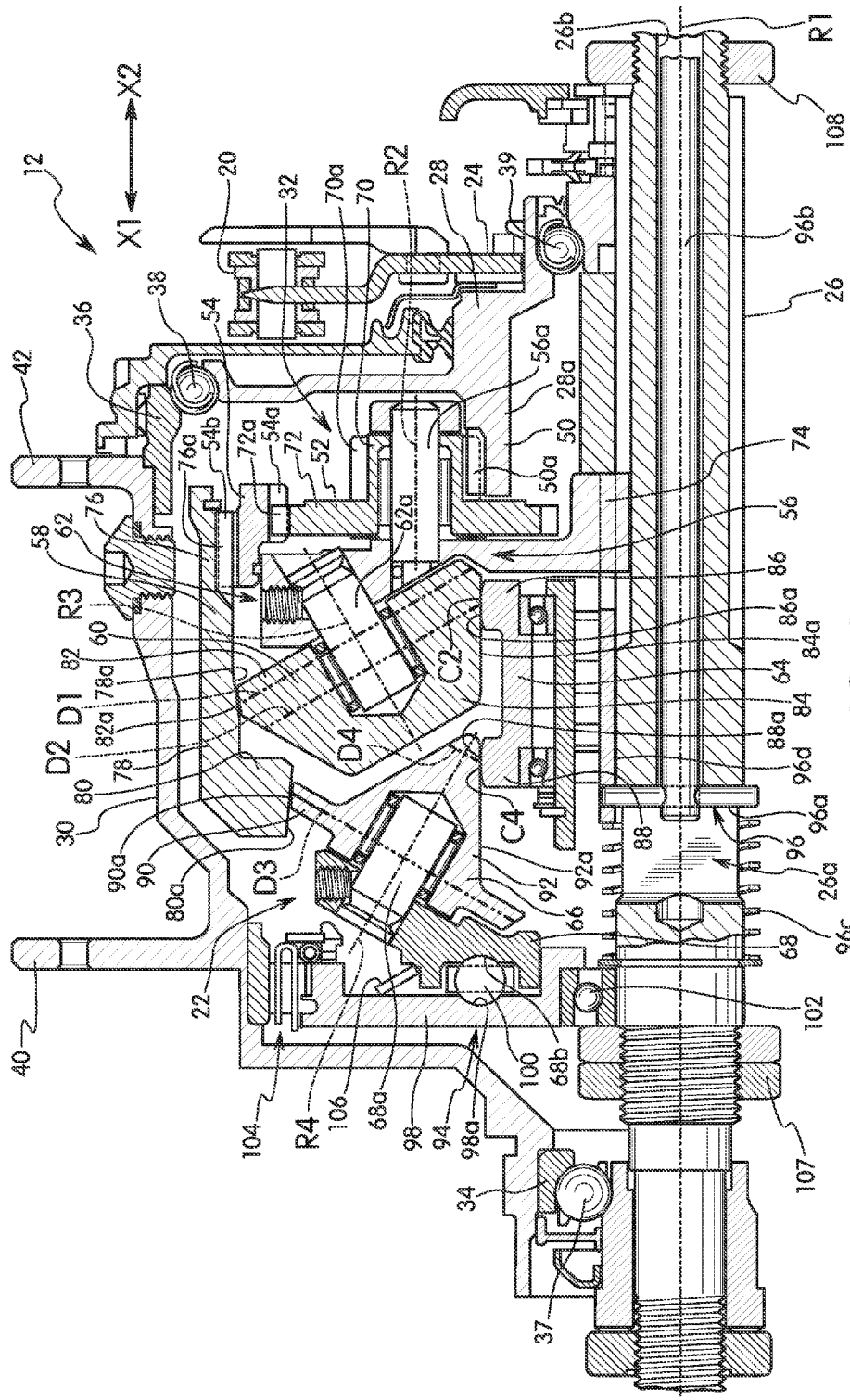
FIG. 3 is a cross sectional view of the hub assembly having the continuously variable bicycle transmission unit illustrated in FIG. 1, illustrating a sun roller of the continuously variable bicycle transmission unit axially positioned at a top gear position to establish a top gear ratio of the hub assembly.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIG. 1, a bicycle 10 is illustrated that is equipped with a hub assembly 12 forming a continuously variable bicycle transmission in accordance with a first embodiment. As illustrated in FIG. 1, the bicycle 10 further includes a frame 14, a rear wheel 16, a front chain sprocket 18, and a chain 20. Although not shown, the bicycle 10 also includes a handlebar with a conventional gear shifter mounted thereon. The conventional gear shifter is further connected to a Bowden type cable for operating the hub assembly 12 to change through effective gear ratios between maximum and minimum values, as described in greater detail below. The rear wheel 16 is rotatably supported by the hub assembly 12 on the frame 14. The front chain sprocket 18 is configured to receive rotational power from a cyclists pedaling action. The chain 20 is configured to transmit the rotational power from the front chain sprocket 18 to the hub assembly 12 in a conventional manner to rotate the rear wheel 16 relative to the frame 14.

As illustrated in FIG. 2, the hub assembly 12 basically includes a continuously variable transmission unit 22 (hereinafter "CVT unit 22"). The hub assembly 12 also includes a rear chain sprocket 24 and a stationary hub shaft 26 (e.g., bicycle axle). Furthermore, the hub assembly 12 includes a driver 28 as an example of a bicycle drive member, and a hub shell 30 as an example of a driven member. Moreover, the hub assembly 12 includes an upstream planetary gear unit 32 (e.g., upstream planetary gear mechanism).

As illustrated in FIG. 3, the rear chain sprocket 24 is rotatably supported to the hub shaft 26. The rear chain sprocket 24 is configured to receive the rotational power from the front chain sprocket 18 via the chain 20. The hub shaft 26 is stationary coupled to the frame 14 in a conventional manner. The hub shaft 26 has a center axis R1 that defines a rotational axis of the hub assembly 12 and the rear wheel 16. The hub shell 30 is rotatably supported about the hub shaft 26 by a left cup 34, a right cup 36 and bearing assemblies 37, 38 and 39. The hub shell 30 defines an internal space of the hub assembly 12. The hub shell 30 further includes spoke flanges 40 and 42. The spoke flanges 40 and 42 are configured to support spokes and an outer wheel rim of the rear wheel 16 in a conventional manner. The left cup 34 is rotatably supported relative to the hub shaft 26 by the bearing assembly 37 that is disposed between the left cup 34 and the hub shaft 26. The right cup 36 is fixedly coupled to the left cup 34. The right cup 36 is rotatably supported relative to the driver 28 by the bearing assembly 38 that is disposed between the right cup 36 and the driver 28. The driver 28 is a generally annular member. The driver 28 is rotatably supported about the hub shaft 26 by the bearing assembly 39 that is disposed between the driver 28 and the hub shaft 26. The driver 28 supports the rear chain sprocket 24 that is fixedly attached to the driver 28. Since the rear chain sprocket 24 is non-rotatably attached to the driver 28, torque from the rear chain sprocket 24 is directly transferred to the driver 28.

Hereinafter, a rotational direction in which the rear chain sprocket 24 rotates about the center axis R1 in response to a cyclists forward pedaling action is called a "forward rotational direction" about the center axis R1 (i.e., clockwise direction about the hub assembly 12 in FIG. 1). Furthermore, a rotational direction that is opposite the forward rotational direction is called a "reverse rotational direction" about the center axis R1 (counterclockwise direction about the hub assembly 12 in FIG. 1). Furthermore, an axial direction in which an extended thumb of a right hand points when the center axis R1 is gripped such that other fingers of the right hand point in the forward rotational direction about the center axis R1 is called a "first axial direction X1" of the center axis R1 of the hub shaft 26 (i.e., leftward direction along the center axis R1 of the hub shaft 26 in FIG. 3). Moreover, an axial direction that is opposite the first axial direction is called a "second axial direction X2" of the center axis R1 of the hub shaft 26 (i.e., rightward direction along the center axis R1 of the hub shaft 26 in FIG. 3).

As illustrated in FIG. 3, the CVT unit 22 and the upstream planetary gear unit 32 are disposed within the internal space of the hub shell 30. The CVT unit 22 and the upstream planetary gear unit 32 are operatively disposed in a power transmission path between the driver 28 and the hub shell 30. In particular, the upstream planetary gear unit 32 is operatively disposed upstream in the power transmission path relative to the CVT unit 22. Specifically, the upstream planetary gear unit 32 is operatively disposed between the driver 28 and the CVT unit 22. The CVT unit 22 is operatively disposed between the upstream planetary gear unit 32 and the hub shell 30. With this arrangement, the rotational power from the driver 28 is transmitted to the hub shell 30 via the upstream planetary gear unit 32 and the CVT unit 22 through the power transmission path.

The upstream planetary gear unit 32 basically includes an upstream sun gear 50, a plurality of upstream planetary gears 52, an upstream ring gear 54 and an upstream planetary gear carrier 56. Specifically, in this embodiment, the upstream planetary gear unit 32 includes four of the upstream planetary gears 52 (only one is shown in FIG. 3). However, the number of the upstream planetary gears 52 can be changed as needed or desired. In particular, for example, the number of the upstream planetary gears 52 can be preferably changed to three. The upstream sun gear 50, the upstream planetary gears 52, the upstream ring gear 54 and the upstream planetary gear carrier 56 are made of metallic material, such as steel, or any other suitable material that is typically used in gear mechanisms. Furthermore, the CVT unit 22 basically includes a ring roller 58, a plurality of first conical planetary rollers 60, a first roller carrier 62 (e.g., first carrier), and a sun roller 64. The CVT unit 22 further includes a plurality of second conical planetary rollers 66 and a second roller carrier 68 (e.g., second carrier). Specifically, in this embodiment, the CVT unit 22 includes four of the first conical planetary rollers 60 (only one is shown in FIG. 3), and four of the second conical planetary rollers 66 (only one is shown in FIG. 3). However the numbers of the first conical planetary rollers 60 and the second conical planetary rollers 66 can be changed as needed or desired. In particular, for example, the number of the first conical planetary rollers 60 can be preferably changed to seven, and the number of the second conical planetary rollers 66 can be preferably changed to six. The ring roller 58, the first conical planetary rollers 60, the first roller carrier 62 and the sun roller 64 are made of metallic material, such as steel, or any other suitable material that is typically used in friction gear mechanisms. The upstream planetary gear carrier 56 and the first roller carrier 62 are integrally formed on a common carrier member 74 that is fixedly and non-rotatably coupled to the hub shaft 26.

The upstream sun gear 50 is integrally formed on an outer peripheral face of an annular section 28a of the driver 28. The upstream sun gear 50 includes radially outwardly extending gear teeth 50a. The upstream sun gear 50 is rotatable about the huh shaft 26 with the driver 28. The upstream planetary gears 52 are rotatably supported to the upstream planetary gear carrier 56. The upstream planetary gear carrier 56 is non-rotatably supported to the hub shaft 26. The upstream planetary gear carrier 56 has four rotational axles 56a that are circumferentially arranged on the upstream planetary gear carrier 56 about the hub shaft 26 with equal spacing. The upstream planetary gears 52 are rotatably coupled to the rotational axles 56a of the upstream planetary gear carrier 56, respectively. The rotational axles 56a have center axes that define rotational axes R2 of the upstream planetary gears 52, respectively.

Each of the upstream planetary gears 52 includes a smaller diameter gear section 70, and a larger diameter gear section 72 that has a larger diameter than the smaller diameter gear section 70. The smaller and larger diameter gear sections 70 and 72 are integrally formed as a one-piece, unitary member. The smaller diameter gear section 70 has radially outwardly extending gear teeth 70a. The larger diameter gear section 72 has radially outwardly extending gear teeth 72a. The gear teeth 70a of the smaller diameter gear section 70 mesh with the gear teeth 50a of the upstream sun gear 50. The gear teeth 72a of the larger diameter gear section 72 mesh with the upstream ring gear 54. The upstream ring gear 54 is disposed on an inner peripheral face of the ring roller 58 of the CVT unit 22. The upstream ring gear 54 has radially inwardly extending gear teeth 54a. The gear teeth 54a mesh with the gear teeth 72a of the larger diameter gear section 72. Furthermore, the upstream ring gear 54 is fixedly coupled to the inner peripheral face of the ring roller 58 of the CVT unit 22 in a conventional manner. Specifically, in this embodiment, splines 54b formed on an outer peripheral surface of the upstream ring gear 54 engage with spline grooves 76a formed on a coupling portion 76 of the ring roller 58. In this embodiment, each of the upstream planetary gears 52 is formed as a stepped gear with dual gear sections (i.e., the smaller and larger diameter gear sections 70 and 72). However, the upstream planetary gears 52 can be a different type of gear as needed or desired. In particular, for example, the upstream planetary gears 52 can only include a single gear section which meshes with both upstream sun gear 50 and the upstream ring gear 54. Furthermore, the upstream planetary gears 52 can also be formed as a stepped gear with three or more gear sections. Furthermore, in this embodiment, the number of gear teeth 72a of the larger diameter gear section 72 is greater than the number of gear teeth 70 of the smaller diameter gear section 70. However, the numbers of the gear teeth 70a and 72a can be changed as needed or desired. In particular, for example, the number of gear teeth 72a of the larger diameter gear section 72 can be smaller than the number of gear teeth 70 of the smaller diameter gear section 70. Furthermore, alternatively, the upstream planetary gears 52 can include a larger diameter gear section that meshes with the upstream sun gear 50 and a smaller diameter gear section that has a smaller diameter than the larger diameter gear section and meshes with the upstream ring gear 54.

The ring roller 58 is operatively supported to the hub shaft 26, and operatively coupled to the driver 28 through the upstream planetary gear unit 32. Specifically, the ring roller 58 is rotatably supported to the hub shaft 26. The ring roller 58 includes first and second ring roller portions 78 and 80 at axially spaced apart locations of the ring roller 58 along the center axis R1 of the hub shaft 26. The first and second ring roller portions 78 and 80 frictionally engage with the first and second conical planetary rollers 60 and 66, respectively. In particular, the first and second ring roller portions 78 and 80 have first and second tapered inner peripheral faces 78a and 80a, respectively. An inner diameter of the first ring roller portion 78 is larger than an inner diameter of the second ring roller portion 80. The first tapered inner peripheral face 78a is configured such that the inner diameter of the first ring roller portion 78 decreases along the first axial direction X1 of the hub shaft 26. The second tapered inner peripheral face 80a is configured such that the inner diameter of the second ring roller portion 80 increases along the first axial direction X1 of the hub shaft 26. The first and second ring roller portions 78 and 80 have no gear teeth. In particular, no gear teeth are formed on the first and second tapered inner peripheral faces 78a and 80a.

The first conical planetary rollers 60 are rotatably supported to the first roller carrier 62. The first conical planetary rollers 60 frictionally engage with the ring roller 58 and the sun roller 64. The first carrier 62 is operatively supported to the hub shaft 26. In particular, the first roller carrier 62 is non-rotatably mounted on the hub shaft 26. The first carrier 62 has four rotational axles 62a that are circumferentially arranged on the first roller carrier 62 about the hub shaft 26 with equal spacing. The first conical planetary rollers 60 are rotatably coupled to the rotational axles 62a of the first roller carrier 62, respectively, in a conventional manner. The rotational axles 62a have center axes that define rotational axes R3 first rotational axes) of the first conical planetary rollers 60, respectively. Each of the rotational axes R3 of the first conical planetary rollers 60 is slanted relative to the center axis R1 of the hub shaft 26. Specifically, each of the rotational axes R3 is configured such that a distance between the center axis R1 and each of the rotational axes R3 decreases along the first axial direction X1 of the center axis R1. The first conical planetary rollers 60 are substantially identical to each other. Thus, only one of them (i.e., first conical planetary roller 60) will be discussed herein for the sake of brevity. The first conical planetary roller 60 is integrally formed as a one-piece, unitary member. The first conical planetary roller 60 has first and second frictional engagement portions 82 and 84 at axially spaced apart locations of the first conical planetary roller 60 along the rotational axis R3 of the first conical planetary roller 60. The first and second frictional engagement portions 82 and 84 frictionally engage with the ring roller 58 and the sun roller 64, respectively. The first and second frictional engagement portions 82 and 84 are coaxially arranged along the rotational axis R3 of the first conical planetary roller 60. The first frictional engagement portion 82 has a truncated cone shape (i.e., a section of cone or a cone frustum) with a tapered outer peripheral face 82a. The second frictional engagement portion 84 has a truncated cone shape a section of cone, or a cone frustum) with a tapered outer peripheral face 84a. The first frictional engagement portion 82 has an outer diameter that gradually increases from a first minimum diameter to a first maximum diameter as axially approaching the second frictional engagement portion 84 along the rotational axis R3. The second frictional engagement portion 84 has also an outer diameter that gradually increases from a second minimum diameter to a second maximum diameter as axially approaching the first frictional engagement portion 82 along the rotational axis R1 in this embodiment, the first maximum diameter of the first frictional engagement portion 82 is equal to the second maximum diameter of the second frictional engagement portion 84. The first and second frictional engagement portions 82 and 84 have no gear teeth. In particular, no gear teeth are formed on the tapered outer peripheral faces 82a and 84a.

The tapered outer peripheral face 82a of the first frictional engagement portion 82 frictionally engages with the first tapered inner peripheral face 78a of the first ring roller portion 78 of the ring roller 58. Specifically, the tapered outer peripheral face 82a contacts the first tapered inner peripheral face 78a such that the tapered outer peripheral face 82a has a first effective diameter D1 at a first contact between the tapered outer peripheral face 82a and the first tapered inner peripheral face 78a. The first frictional engagement portion 82 is oriented such that an intersection of the tapered outer peripheral face 82a with a first plane including the center axis R1 of the hub shaft 26 and the rotational axis R3 of the first conical planetary roller 60 substantially extends along an intersection of the first tapered inner peripheral face 78a with this first plane. The tapered outer peripheral face 84a of the second frictional engagement portion 84 frictionally engages with the sun roller 64. Specifically, the tapered outer peripheral face 84a contacts the sun roller 64 such that the tapered outer peripheral face 84a has a second effective diameter D2 at a second contact C2 between the tapered outer peripheral face 84a and sun roller 64. The second frictional engagement portion 84 is oriented such that an intersection of the tapered outer peripheral face 84a with the first plane including the center axis R1 of the hub shaft 26 and the rotational axis R3 of the first conical planetary roller 60 substantially extends parallel to the center axis R1 of the hub shaft 26.

The sun roller 64 is operatively supported to the hub shaft 26. Specifically, the sun roller 64 is rotatably supported to the hub shaft 26. Furthermore, the sun roller 64 is movable along the center axis R1 of the hub shaft 26. The sun roller 64 frictionally engages with the first and second conical planetary rollers 60 and 66. The sun roller 64 basically has a cylindrical shape. The sun roller 64 has first and second sun roller portions 86 and 88 at axially spaced apart locations of the sun roller 64 along the center axis R1 of the hub shaft 26. The first and second sun roller portions 86 and 88 radially outwardly protrude relative to an outer peripheral face of the sun roller 64 to form flanges. The first and second sun roller portions 86 and 88 are circumferentially arranged about the outer peripheral face of the sun roller 64. The first and second sun roller portions 86 and 88 are substantially parallel to each other. The first and second sun roller portions 86 and 88 have outer peripheral faces 86a and 88a, respectively. The outer peripheral faces 86a and 88a are curved relative to the center axis R1 of the hub shaft 26, respectively, such that the first and second sun roller portions 86 and 88 include a barrel-shape. The first and second sun roller portions 86 and 88 frictionally engage with the first and second conical planetary rollers 60 and 66, respectively. In particular, the radially outermost portions of the outer peripheral faces 86a and 88a radially contact the first and second conical planetary rollers 60 and 66, respectively. The radially outermost portions of the outer peripheral faces 86a and 88a have the same diameter. The radially outermost portion of the outer peripheral face 86a forms a first interface between the first sun roller portion 86 and the first conical planetary roller 60. The radially outermost portion of the outer peripheral face 88a forms a second interface between the second sun roller portion 88 and the second conical planetary roller 66. The first and second interfaces are substantially parallel to each other. The first and second sun roller portions 86 and 88 have no gear teeth. In particular, no gear teeth are formed on the outer peripheral faces 86a and 88a.

The second conical planetary rollers 66 are rotatably supported to the second roller carrier 68. The second conical planetary rollers 66 frictionally engage with the ring roller 58 and the sun roller 64. The second roller carrier 68 is operatively supported to the hub shaft 26. In particular, the second roller carrier 68 is rotatably mounted around the hub shaft 26. The second roller carrier 68 is further operatively coupled to the hub shell 30. The second roller carrier 68 has four rotational axles 68a that are circumferentially arranged on the second roller carrier 68 about the hub shaft 26 with equal spacing. The second conical planetary rollers 66 are rotatably coupled to the rotational axles 68a of the second roller carrier 68, respectively, in a conventional manner. The rotational axles 68a have center axes that define rotational axes R4 (e.g., second rotational axes) of the second conical planetary rollers 66, respectively. Each of the rotational axes R4 of the second conical planetary rollers 66 is slanted relative to the center axis R1 of the hub shaft 26. Specifically, each of the rotational axes R4 is configured such that a distance between the center axis R1 and each of the rotational axes R4 decreases along the second axial direction X2 of the center axis R1.

The second conical planetary rollers 66 are substantially identical to each other. Thus, only one of them (i.e., second conical planetary roller 66) will be discussed herein for the sake of brevity. The second conical planetary roller 66 is integrally formed as a one-piece, unitary member. The second conical planetary roller 66 has third and fourth frictional engagement portions 90 and 92 at axially spaced apart locations of the second conical planetary roller 66 along the rotational axis R4 of the second conical planetary roller 66. The third and fourth frictional engagement portions 90 and 92 frictionally engage with the ring roller 58 and the sun roller 64, respectively. The third and fourth frictional engagement portions 90 and 92 are coaxially arranged along the rotational axis R4 of the second conical planetary roller 66. The third frictional engagement portion 90 has a truncated cone shape (i.e., a section of cone, or a cone frustum) with a tapered outer peripheral face 90a. The fourth frictional engagement portion 92 substantially has a cone shape with a tapered outer peripheral face 92a. However, the fourth frictional engagement portion 92 can have a truncated cone shape (i.e., a section of cone, or a cone frustum). The third frictional engagement portion 90 has an outer diameter that gradually increases from a third minimum diameter to a third maximum diameter as axially approaching the fourth frictional engagement portion 92 along the rotational axis R4. The fourth frictional engagement portion 92 has also an outer diameter that gradually increases from a fourth minimum diameter to a fourth maximum diameter as axially approaching the third frictional engagement portion 90 along the rotational axis R4. In this embodiment, the third maximum diameter of the third frictional engagement portion 90 is larger than the fourth maximum diameter of the fourth frictional engagement portion 92. Thus, the third frictional engagement portion 90 radially outwardly protrudes relative to the tapered outer peripheral face 92a of the fourth frictional engagement portion 92 to form a flange. The third and fourth frictional engagement portions 90 and 92 have no gear teeth. In particular, no gear teeth are formed on the tapered outer peripheral faces 90a and 92a.

The tapered outer peripheral face 90a of the third frictional engagement portion 90 frictionally engages with the second tapered inner peripheral face 80a of the second ring roller portion 80 of the ring roller 58. Specifically, the tapered outer peripheral face 90a contacts the second tapered inner peripheral face 80a such that the tapered outer peripheral face 90a has a third effective diameter D3 at a third contact between the tapered outer peripheral face 90a and the second tapered inner peripheral face 80a. The third frictional engagement portion 90 is oriented such that an intersection of the tapered outer peripheral face 90a with a second plane including the center axis R1 of the hub shaft 26 and the rotational axis R4 of the second conical planetary roller 66 substantially extends along an intersection of the second tapered inner peripheral face 80a with this second plane. The tapered outer peripheral face 92a of the fourth frictional engagement portion 92 frictionally engages with the sun roller 64. Specifically, the tapered outer peripheral face 92a contacts the sun roller 64 such that the tapered outer peripheral face 92a has a fourth effective diameter D4 at a fourth contact C4 between the tapered outer peripheral face 92a and sun roller 64. The fourth frictional engagement portion 92 is oriented such that an intersection of the tapered outer peripheral face 92a with the second plane including the center axis R1 of the hub shaft 26 and the rotational axis R4 of the second conical planetary roller 66 substantially extends parallel to the center axis R1 of the huh shaft 26.

With this configuration of the CVT unit 22, the first and second frictional engagement portions 82 and 84 of the first conical planetary rollers 60 frictionally engage with the first ring roller portion 78 of the ring roller 58 and the first sun roller portion 86 of the sun roller 64, respectively. The third and fourth frictional engagement portions 90 and 92 of the second conical planetary rollers 66 frictionally engage with the second ring roller portion 80 of the ring roller 58 and the second sun roller portion 88 of the sun roller 64, respectively.

The CVT unit 22 further includes a cam loader 94 (e.g., axial biasing member), and a varying mechanism 96. The cam loader 94 is a conventional cam loader, and is operatively disposed between the second roller carrier 68 and the hub shell 30. The cam loader 94 transmits the rotational power from the second roller carrier 68 to the hub shell 30. The cam loader 94 is configured to axially bias the second roller carrier 68 away from the hub shell 30 in a conventional manner. The cam loader 94 basically includes an output plate 98 (e.g., output member), and a plurality of balls 100. The output plate 98 is disposed between the second roller carrier 68 and the hub shell 30. The output plate 98 is rotatably mounted around the hub shaft 26 by a bearing assembly 102. The output plate 98 is axially non-movably supported to the hub shaft 26. The output plate 98 is operatively coupled to the hub shell 30 via a one-way clutch 104. The one-way clutch 104 is a conventional one-way clutch, and transmits the rotational power from the output plate 98 to the hub shell 30 only in the forward rotational direction about the center axis R1. The balls 100 are disposed between a cam surface 68b formed on the second roller carrier 68 and a cam surface 98a of the output plate 98 at circumferentially spaced apart locations about the hub shaft 26. The cam surfaces 68b and 98a are configured such that the balls 100 axially press the second roller carrier 68 away from the output plate 98 in the second axial direction X2 when the second roller carrier 68 and the output plate 98 relatively rotate with respect to each other. Furthermore, a belleville washer 106 or other type of spring is disposed between the second roller carrier 68 and the output plate 98 to bias the second roller carrier 68 away from the output plate 98. In this embodiment, both the second roller carrier 68 and the out put plate 98 have the cam surfaces 68b and 98a. However, the cam surface can be formed on at least one of the second roller carrier 68 and the output plate 98. Furthermore, in this embodiment, the cam loader 94 includes the balls 100. However, alternatively, a plurality of rollers can be used in the cam loader 94 instead of the balls 100.

As discussed above, the cam loader 94 generates an axial biasing force in the second axial direction X2. This axial biasing force further generates contact forces between members of the CVT unit 22. Specifically, when the second roller carrier 68 and the output plate 98 relatively rotate with respect to each other, the cam loader 94 generates the axial biasing force which biases the second roller carrier 68 away from the output plate 98. The output plate 98 is axially non-movably mounted to the hub shaft 26. Specifically, an axial movement of the output plate 98 in the first axial direction X1 is restricted by left side lock nuts 107 threaded onto the hub shaft 26. Furthermore, the common carrier member 74 forming the first roller carrier 62 is also axially non-movably mounted to the hub shaft 26. Specifically, an axial movement of the common carrier member 74 in the second axial direction X2 is restricted by a right side lock nut 108. Thus, when the axial biasing force in the second axial direction X2 is generated by the cam loader 94, the axial biasing force is applied to the second conical planetary roller 66 through the second roller carrier 68. The third frictional engagement portion 90 of second roller carrier 68 contacts with the second ring roller portion 80 of the ring roller 58. Furthermore, the second ring roller portion 80 of the ring roller 58 includes the second tapered inner peripheral face 80a. Thus, when the axial biasing force is applied to the second conical planetary roller 66, the third frictional engagement portion 90 of the second conical planetary roller 66 is axially pressed against the second ring roller portion 80 of the ring roller 58, which causes a strong frictional engagement between the second roller carrier 68 and the ring roller 58. Furthermore, when the third frictional engagement portion 90 of the second conical planetary roller 66 is pressed against the second ring roller portion 80 of the ring roller 58, the second tapered inner peripheral face 80a of the second ring roller portion 80 of the ring roller 58 generates a radial reaction force that presses the second conical planetary roller 66 in a radial inward direction against the second sun roller portion 88 of the sun roller 64. This also causes a strong frictional engagement between the second conical planetary roller 66 and the second sun roller portion 88 of the sun roller 64. Furthermore, when the axial biasing force is applied to the second conical planetary roller 66, the axial biasing force axially presses the ring roller 58 in the second axial direction X2. The first ring roller portion 78 of the ring roller 58 contacts with the first frictional engagement portion 82 of the first conical planetary roller 60. The third frictional engagement portion 90 of second roller carrier 68 contacts with the second ring roller portion 80 of the ring roller 58. Thus, when the axial biasing force is applied to the ring roller 58, the first frictional engagement portion 82 of the first conical planetary roller 60 is axially pressed against the first ring roller portion 78 of the ring roller 58. The first conical planetary roller 60 is supported to the first roller carrier 62 which is axially non-movably mounted to the hub shaft 26. Thus, this axial biasing force causes a strong frictional engagement between the ring roller 58 and the first roller carrier 62. Furthermore, when the first ring roller portion 78 of the ring roller 58 is pressed against the first frictional engagement portion 82 of the first conical planetary roller 60, the first tapered inner peripheral face 78a of the first ring roller portion 78 of the ring roller 58 generates a radial reaction force that presses the first conical planetary roller 60 in a radial inward direction against the first sun roller portion 86 of the sun roller 64. This also causes a strong frictional engagement between the first conical planetary roller 60 and the first sun roller portion 86 of the sun roller 64. With this arrangement of the CVT unit 22, when the cam loader 94 generates the axial biasing force, the frictional engagements between the ring roller 58, the first conical planetary rollers 60, the sun roller 64 and the second conical planetary roller 66 become stronger and tighter. As a result, the CVT unit 22 transfers the rotational power from the upstream planetary gear unit 32 to the hub shell 30 without slip of the frictional engagements.

The varying mechanism 96 is operatively coupled to the sun roller 64 such that the varying mechanism continuously changes an axial position of the sun roller 64 between a first axial position (shown in FIG. 3) and a second axial position (shown in FIG. 5) via a middle axial position (shown in FIG. 4) along the center axis R1 of the hub shaft 26. Specifically, the varying mechanism 96 basically includes a shift key 96a, a push rod 96b, a coil spring 96c and a base portion 96d. The varying mechanism 96 is a conventional shifting mechanism that operates in a manner that corresponds to operation of a conventional shifting mechanism in either U.S. Pat. Nos. 5,882,274 and/or 5,928,103 (both assigned to Shimano Inc.). Therefore, description of the varying mechanism 96 is minimal for the sake of brevity.

The shift key 96a is preferably a metallic block of material. The shift key 96a is disposed through a slot 26a that perpendicularly extends perpendicular to the center axis R1 through the hub shaft 26. The shift key 96a is rigidly fixed to one end of the push rod 96b for movement therewith. Opposite ends of the shift key 96a extend out of the slot 26a and engage with the base portion 96d. The push rod 96b is disposed within a central bore 26b of the hub shaft 26. The push rod 96b is operatively coupled to the Bowden type cable that is connected to the gear shifter (not shown) in a conventional manner. Since coupling between the push rod 96b and the Bowden type cable is conventional, description is omitted for the sake of brevity. However, the Bowden type cable can be operatively coupled to the push rod 96b via a conventional bell crank mounted at an axial end of the hub shaft 26. The conventional bell crank is swingably coupled to the hub shaft 26, and operates the push rod 96b along the center axis R1 in response to cyclist shifting actions, thereby sliding the shift key 96a along the slot 26a. The coil spring 96c is disposed about the hub shaft 26 between a retainer and the base portion 96d for biasing the base portion 96d in the second axial direction X2 along the center axis R1. Thus, if a pushing force applied to the push rod 96b in the first axial direction by the conventional bell crank is released, then the coil spring 96c cause the base portion 96d move in the second axial direction X2. The base portion 96d is disposed around the hub shaft 26. The base portion 96d is axially slidably attached to the hub shaft 26. The base portion 96d rotatably supports the sun roller 64 via bearing assemblies. Since the shift key 96a engages with the base portion 96d, the axial movement of the shift key 96a along the slot 26a causes an axial movement of the sun roller 64 along the center axis R1 between the first axial position (shown in FIG. 3) and the second axial position (shown in FIG. 5).

In this embodiment, the varying mechanism 96 includes the push rod 96b that is pushed along the center axis R1 from outside of the hub shaft 26. However, the varying mechanism for changing the axial position of the sun roller 64 can also includes different type of shifting mechanisms. In particular, the shifting mechanism can includes a conventional mechanism that transforms a rotation of the push rod 96b to an axial movement of the base portion 96d.

Figure 6:
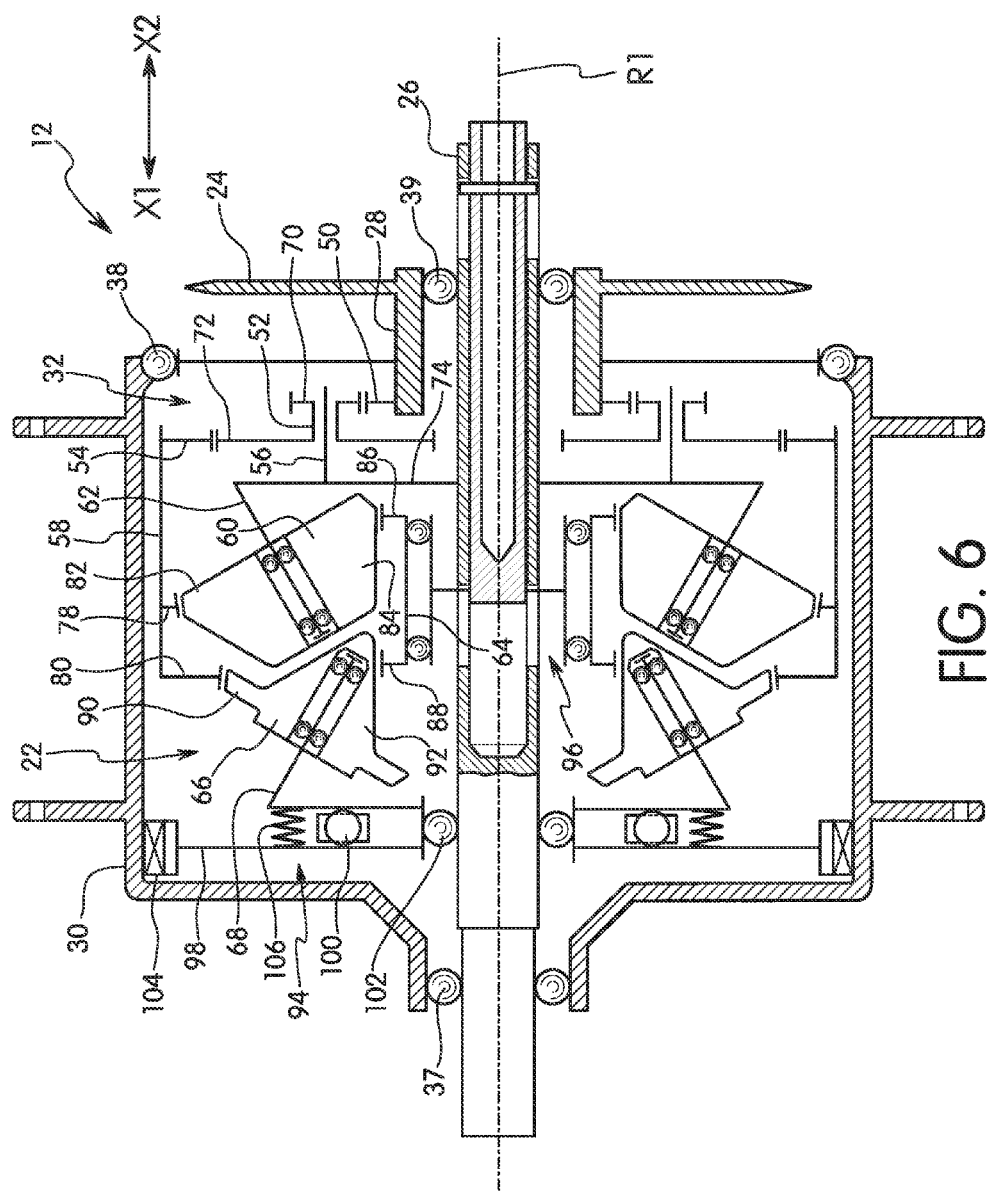
FIG. 6 is a schematic representation of the hub assembly having the continuously variable bicycle transmission unit illustrated in FIG. 1, illustrating a power transmission in the hub assembly.

Referring now to FIG. 6, the power transmission path of the hub assembly 12 will be discussed in detail. First, the rear chain sprocket 24 receives the rotational power from the front chain sprocket 18 via the chain 20. The rotational power rotates the rear chain sprocket 24 in the forward rotational direction about the center axis R1, which also rotates the driver 28 together with the upstream sun gear 50 of the upstream planetary gear unit 32 in the forward rotational direction about the center axis R1. The upstream planetary gear unit 32 is arranged to receive the rotational power from the driver 28, and rotate the ring roller 58. In other words, the ring roller 58 is operatively coupled to the driver 28 via the upstream planetary gear unit 32. The upstream planetary gear unit 32 receives the rotational power from the upstream sun gear 50 as a rotational input, and transmits the rotational power to the upstream ring gear 54 via the upstream planetary gears 52. The upstream planetary gear unit 32 is configured such that the upstream planetary gear unit 32 has a gear ratio of −1.29. In other words, the upstream planetary gear unit 32 increases an input rotational speed of the upstream sun gear 50, but reverses an input rotational direction (i.e., forward rotational direction) of the upstream sun gear 50. As a result, the ring roller 58 rotates in the reverse rotational direction about the center axis R1.

The CVT unit 22 receives the rotational power from the ring roller 58 as a rotational input, and transmits the rotational power to the second roller carrier 68 via the first conical planetary rollers 60, the sun roller 64 and the second conical planetary rollers 66. Specifically, the CVT unit 22 receives the rotational power from the ring roller 58 in the reverse rotational direction about the center axis R1, and transmits the rotational power to the second roller carrier 68 such that the second roller carrier 68 rotates in the forward rotational direction about the center axis R1 in other words, the CVT unit 22 reverses an input rotational direction (i.e., reverse rotational direction) of the ring roller 58. Specifically, each of the first frictional engagement portions 82 of the first conical planetary rollers 60 receives the rotational power from the first ring roller portion 78 of the ring roller 58 as a rotational input. Then, each of the second frictional engagement portions 84 of the first conical planetary rollers 60 transmits the rotational power to the first sun roller portion 86 of the sun roller 64. As a result, the sun roller 64 rotates in the forward rotational direction about the center axis R1 at a rotational speed according to an axial position of the first sun roller portion 86 of the sun roller 64 (i.e., axial position of the second contact C2). On the other hand, each of the third frictional engagement portions 90 of the second conical planetary roller 66 receives the rotational power from the second ring roller portion 80 of the ring roller 58. Furthermore, each of the fourth frictional engagement portions 92 of the second conical planetary roller 66 receives the rotational power from the second sun roller portion 88. In other words, each of the second conical planetary rollers 66 receives two rotational inputs from the ring roller 58 and the sun roller 64. Each of the second conical planetary rollers 66 operates as a differential. Thus, each of the second conical planetary rollers 66 combines the two rotational inputs from the ring roller 58 and the sun roller 64 to cause each of the second conical planetary rollers 66 to rotate in the forward rotational direction about the center axis R1 at a rotational speed according to an axial position of the second sun roller portion 88 of the sun roller 64 (i.e., axial position of the fourth contact C4). Furthermore, this rotational movement of each of the second conical planetary rollers 66 in turn causes the second roller carrier 68 to rotate in the forward rotational direction about center axis R1. The second roller carrier 68 is operatively coupled to the hub shell 30. Thus, the second roller carrier 68 further transmits the rotational power to the hub shell 30 via the cam loader 94 with the output plate 98, and the one-way clutch 104.

Figure 4:
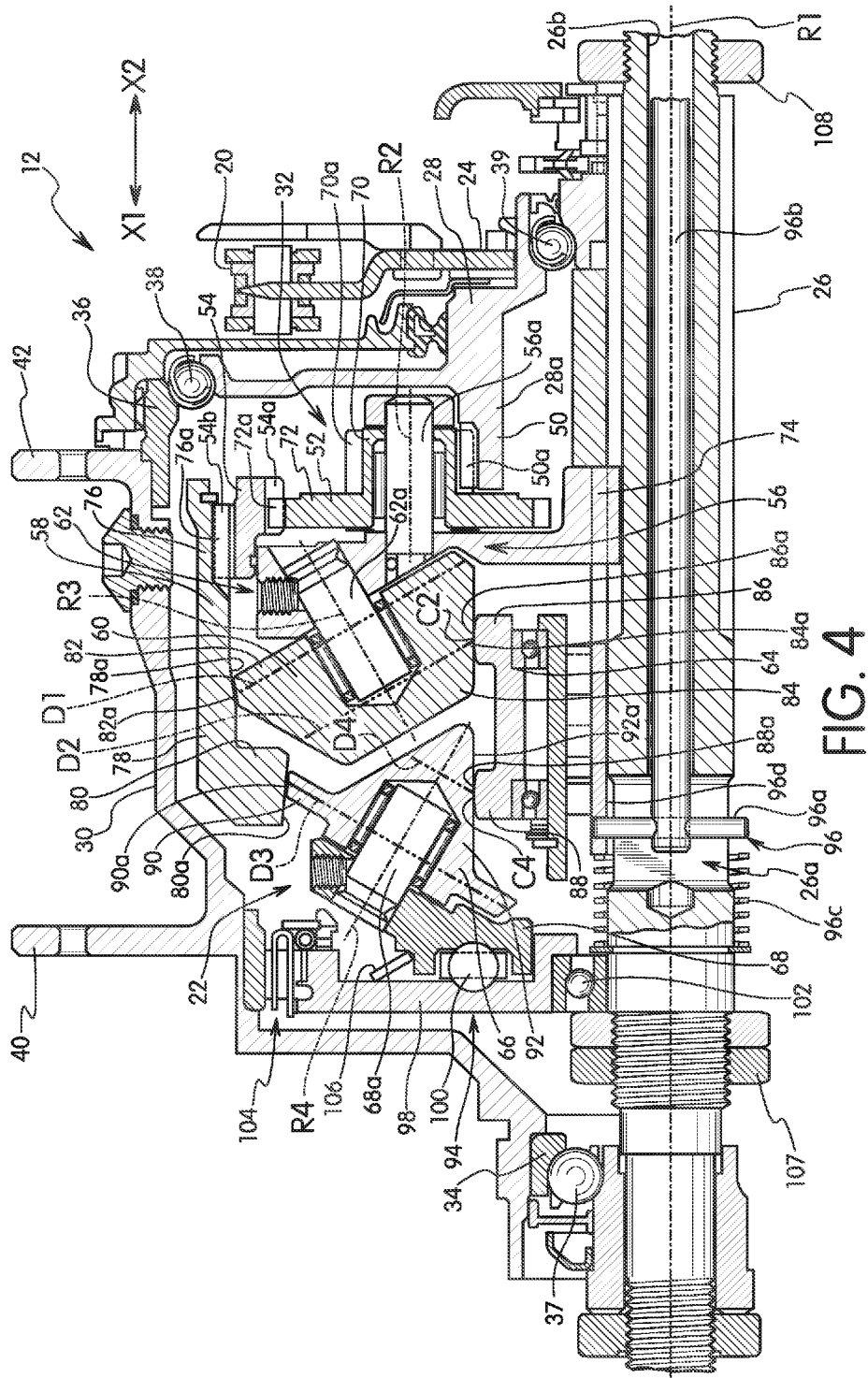
FIG. 4 is a cross sectional view of the hub assembly having the continuously variable bicycle transmission unit illustrated in FIG. 1, illustrating the sun roller of the continuously variable bicycle transmission unit axially positioned at a middle gear position to establish a middle gear ratio of the hub assembly.
Figure 5:
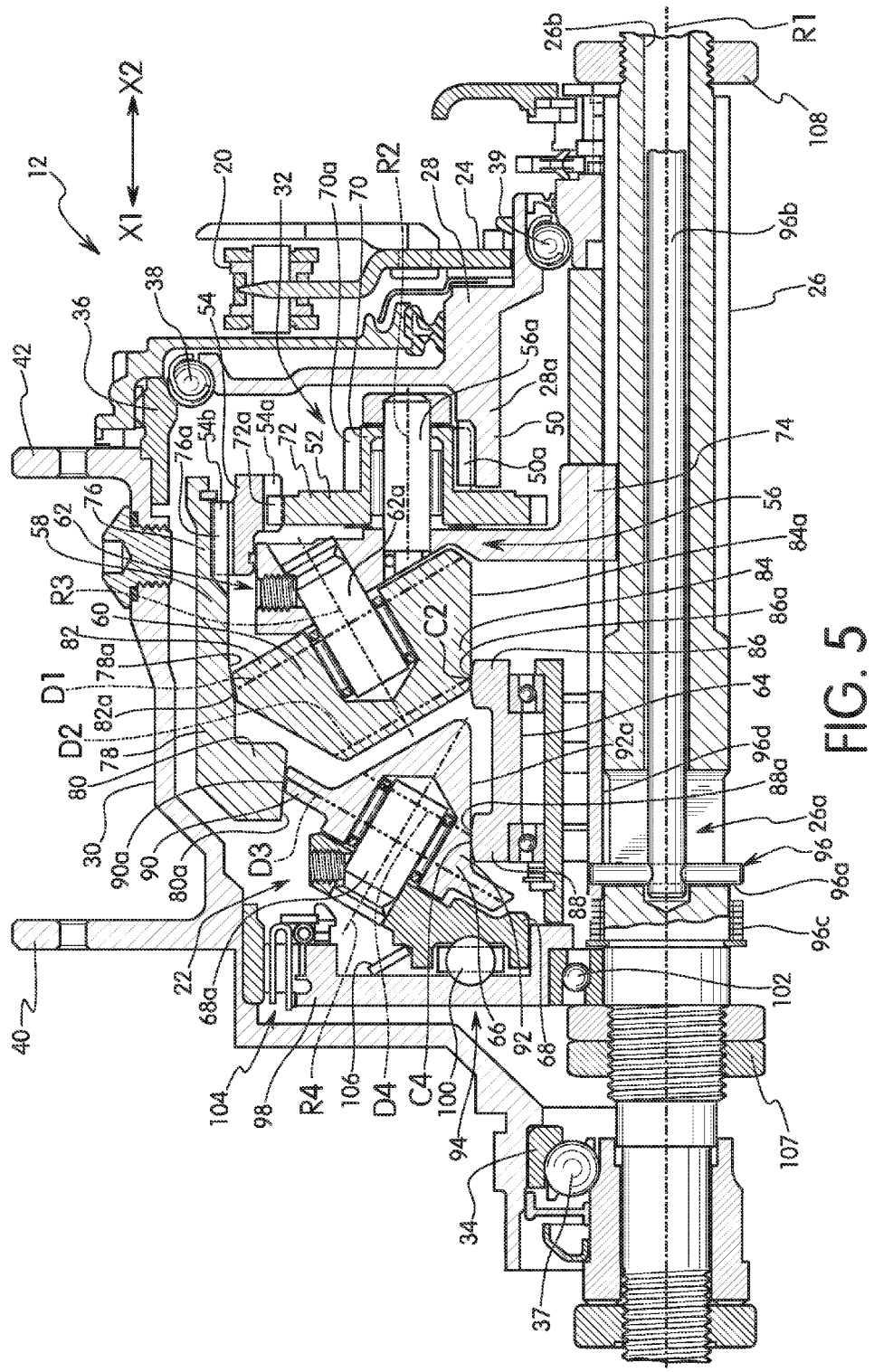
FIG. 5 is a cross sectional view of the hub assembly having the continuously variable bicycle transmission unit illustrated in FIG. 1, illustrating the sun roller of the continuously variable bicycle transmission unit axially positioned at a low gear position to establish a low gear ratio of the hub assembly.

Referring further to FIGS. 3 to 5, the varying mechanism 96 continuously changes an axial position of the sun roller 64 between the first axial position (shown in FIG. 3) and the second axial position (shown in FIG. 5) via the middle axial position (shown in FIG. 4) along the center axis R1 of the hub shaft 26. The first axial position is axially located in the second axial direction X2 relative to the second axial position. The middle axial position is axially located between the first and second axial position. The second effective diameter D2 (or engaging radius) of the second frictional engagement portion 84 of the first conical planetary roller 60 at the second contact C2 between the second frictional engagement portion 84 and the first sun roller portion 86 of the sun roller 64 gradually decreases as the sun roller 64 continuously moves from the first axial position (shown in FIG. 3) toward the second axial position (shown in FIG. 5). The fourth effective diameter D4 (or engaging radius) of the fourth frictional engagement portion 92 of the second conical planetary roller 66 at the fourth contact C4 between the fourth frictional engagement portion 92 and the second sun roller portion 88 of the sun roller 64 gradually increases as the sun roller 64 continuously moves from the first axial position (shown in FIG. 3) toward the second axial position (shown in FIG. 5). These axial movements of the second and fourth contacts C2 and C4 along the tapered outer peripheral faces 84a and 92a changes effective radial distance between the ring roller 58 and the sun roller 64, thereby causing gear ratio of the CVT unit 22 to change. Specifically, these axial movements of the second and fourth contacts C2 and C4 along the tapered outer peripheral faces 84a and 92a cause gear ratios of the first and second conical planetary rollers 60 and 66 to continuously change, respectively, thereby continuously changing a gear ratio of the hub assembly 12. In particular, the first axial position of the sun roller 64 (shown in FIG. 3) corresponds to a top gear position that establishes a high gear ratio of the hub assembly 12. In this embodiment, the high gear ratio of the hub assembly 12 is adjusted to about 1.2. The middle axial position of the sun roller 64 (shown in FIG. 4) corresponds to a middle gear position that establishes a middle gear ratio of the hub assembly 12. In this embodiment, the middle gear ratio of the hub assembly 12 is adjusted to about 0.7. The second axial position of the sun roller 64 (shown in FIG. 5) corresponds to a low gear position that establishes a tow gear ratio of the hub assembly 12. In this embodiment, the tow gear ratio of the hub assembly 12 is adjusted to about 0.3.

In this embodiment, the CVT unit 22 is disposed within the hub shell 30. However, the CVT unit 22 can be disposed any other places on the bicycle 10. In particular, the CVT unit 22 can be accommodated in a cylindrical hanger part of the frame 14 to which a front chain sprocket is attached.

Second Embodiment

Figure 7:
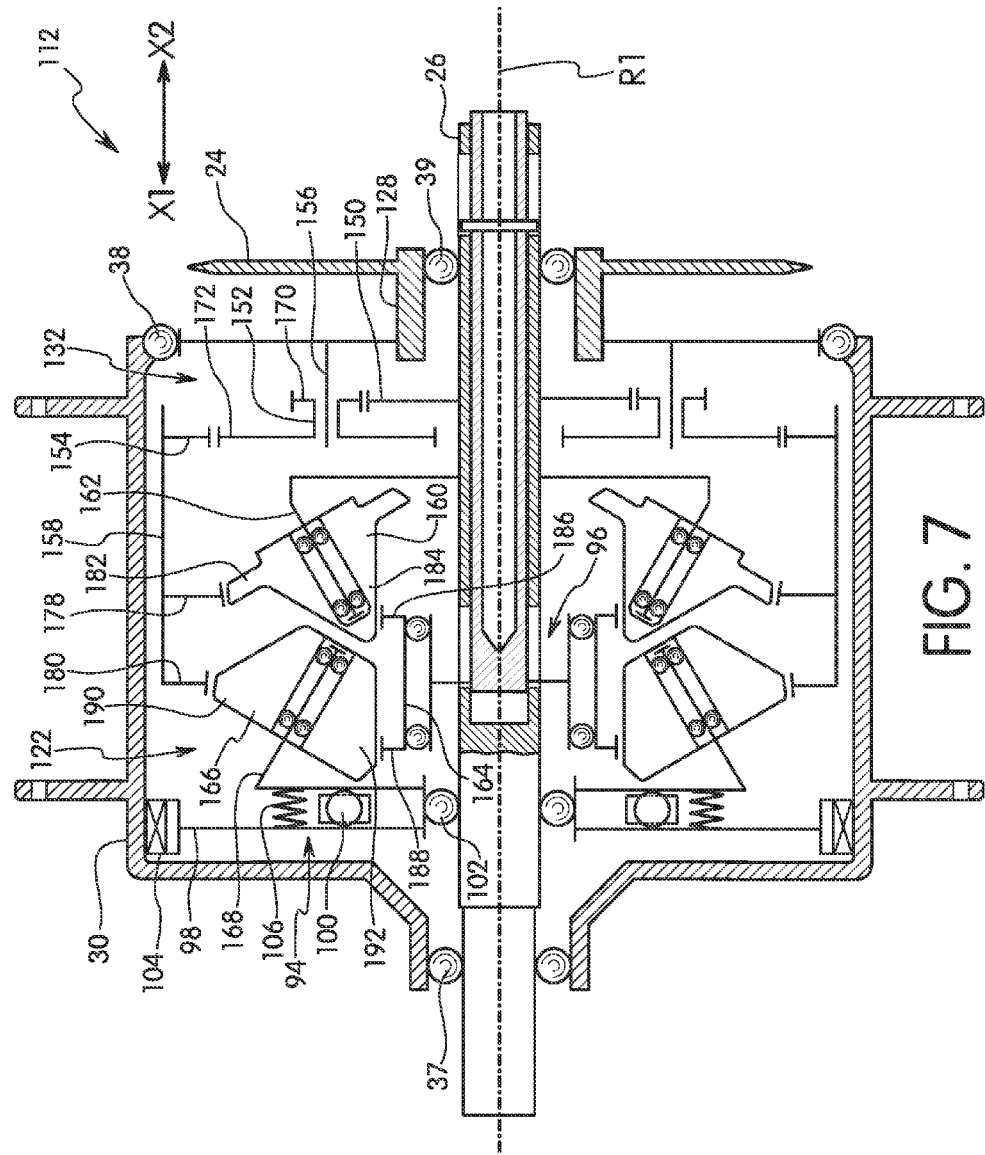
FIG. 7 is a schematic representation of a hub assembly having a continuously variable bicycle transmission unit in accordance with a second embodiment, illustrating a power transmission in the hub assembly.

Referring now to FIG. 7, a hub assembly 112 with a modified continuously variable transmission unit 122 (hereinafter "CVT unit 122") in accordance with a second embodiment will now be explained.

In view of the similarity between the first and second embodiments, the parts of the second embodiment that are identical to the parts of the first embodiment will be given the same reference numerals as the parts of the first embodiment. Also, parts of this second embodiment that are functionally identical and/or substantially identical to parts of the first embodiment will be given the same reference numerals but with "100" added thereto. In any event, the descriptions of the parts of the second embodiment that are substantially identical to the parts of the first embodiment may be omitted for the sake of brevity. However, it will be apparent to those skilled in the an from this disclosure that the descriptions and illustrations of the first embodiment also apply to this second embodiment, except as discussed and/or illustrated herein.

As illustrated in FIG. 7, the hub assembly 112 basically includes, among other things, the CVT unit 122 and a modified upstream planetary gear unit 132. The upstream planetary gear unit 132 basically includes an upstream sun gear 150, a plurality of upstream planetary gears 152, an upstream ring gear 154 and an upstream planetary gear carrier 156. Specifically, in this embodiment, the upstream planetary gear unit 132 includes four of the upstream planetary gears 152 (only two is shown in FIG. 7). However, the number of the upstream planetary gears 152 can be changed as needed or desired. Furthermore, the CVT unit 122 basically includes a ring roller 158, a plurality of first conical planetary rollers 160, a first roller carrier 162 (e.g., first carrier), and a sun roller 164. The CVT unit 122 further includes a plurality of second conical planetary rollers 166 and a second roller carrier 168 (e.g., second carrier). Specifically, in this embodiment, the CVT unit 122 includes four of the first conical planetary rollers 160 (only two is shown in FIG. 7), and four of the second conical planetary rollers 166 (only two is shown in FIG. 7). However the numbers of the first conical planetary rollers 160 and the second conical planetary rollers 166 can be changed as needed or desired.

The upstream sun gear 150 is non-rotatably supported to an outer peripheral face of the hub shaft 26. The upstream ring gear 154 is disposed on an inner peripheral face of the ring roller 158 of the CVT unit 122. The upstream ring gear 154 is fixedly coupled to the ring roller 158 in a conventional manner. The upstream planetary gears 152 engage with the upstream sun gear 150 and the upstream ring gear 154. Specifically, each of the upstream planetary gears 152 includes a smaller diameter gear section 170, and a larger diameter gear section 172 that has a larger diameter than the smaller diameter gear section 170. The smaller and larger diameter gear sections 170 and 172 are integrally formed as a one-piece, unitary member. The smaller diameter gear section 170 meshes with the upstream sun gear 150. The larger diameter gear section 172 meshes with the upstream ring gear 154. The upstream planetary gear carrier 156 is disposed on an outer peripheral face of a driver 128 that fixedly couples the rear chain sprocket 24. The upstream planetary gear carrier 156 is rotatable about the hub shaft 26 with the driver 128. The upstream planetary gear carrier 156 rotatably supports the upstream planetary gears 152. The upstream planetary gears 152 are circumferentially arranged on the upstream planetary gear carrier 156 about the hub shaft 26 with equal spacing.

The ring roller 158 is operatively supported to the hub shaft 26, and operatively coupled to the driver 128 through the upstream planetary gear unit 132. Specifically, the ring roller 158 is rotatably supported to the hub shaft 26. The ring roller 158 includes first and second ring roller portions 178 and 180 at axially spaced apart locations of the ring roller 158 along the center axis R1 of the hub shaft 26. The first and second ring roller portions 178 and 180 frictionally engage with the first and second conical planetary rollers 160 and 166, respectively. The ring roller 158 is substantially identical to the ring roller 58 of the first embodiment, except that an inner diameter of the first ring roller portion 178 is smaller than an inner diameter of the second ring roller portion 180.

The first conical planetary rollers 160 are rotatably supported to the first roller carrier 162. The first conical planetary rollers 160 frictionally engage with the ring roller 158 and the sun roller 164. The first roller carrier 162 is operatively supported to the hub shaft 26. In particular, the first roller carrier 162 is non-rotatably mounted on the hub shaft 26. The first conical planetary rollers 160 are circumferentially arranged on the first roller carrier 162 about the hub shaft 26 with equal spacing. The first conical planetary rollers 160 are rotatably supported to the first roller carrier 162 in a conventional manner about rotational axes R3 (e.g., first rotational axes) of the first conical planetary rollers 160, respectively. Each of the rotational axes R3 of the first conical planetary rollers 160 is slanted relative to the center axis R1 of the hub shaft 26. Specifically, each of the rotational axes R3 is configured such that a distance between the center axis R1 and each of the rotational axes R3 decreases along the first axial direction X1 of the center axis R1. The first conical planetary rollers 160 are substantially identical to each other. Furthermore, the first conical planetary rollers 160 are substantially identical to the second conical planetary rollers 66 of the first embodiment, and are arranged in the same manner as the first conical planetary rollers 60 of the first embodiment. Thus, description of the first conical planetary rollers 160 is minimal for the sake of brevity. The first conical planetary roller 160 has first and second frictional engagement portions 182 and 184 that are substantially identical to the third and fourth frictional engagement portions 90 and 92 of the first embodiment, respectively. The first and second frictional engagement portions 182 and 184 frictionally engage with the ring roller 158 and the sun roller 164, respectively. The first and second frictional engagement portions 182 and 184 have no gear teeth.

The sun roller 164 is operatively supported to the hub shaft 26. Specifically, the sun roller 164 is rotatably supported to the hub shaft 26. Furthermore, the sun roller 164 is movable along the center axis R1 of the hub shaft 26. The sun roller 164 frictionally engages with the first and second conical planetary rollers 160 and 166. The sun roller 164 is substantially identical to the sun roller 64 of the first embodiment. Thus, description of the sun roller 164 is minimal for the sake of brevity. The sun roller 164 has first and second sun roller portions 186 and 188 that are substantially identical to the first and second sun roller portions 86 and 88 of the first embodiment. The first and second sun roller portions 186 and 188 frictionally engage with the first and second conical planetary rollers 160 and 166, respectively. The first and second sun roller portions 186 and 188 have no gear teeth.

The second conical planetary rollers 166 are rotatably supported to the second roller carrier 168. The second conical planetary rollers 166 frictionally engage with the ring roller 158 and the sun roller 164. The second roller carrier 168 is substantially identical to the second roller carrier 68 of the first embodiment. Thus, description of the second roller carrier 168 is minimal for the sake of brevity. The second roller carrier 168 is operatively supported to the hub shaft 26, in particular, the second roller carrier 168 is rotatably mounted around the hub shaft 26. The second roller carrier 168 is further operatively coupled to the hub shell 30. The second conical planetary rollers 166 are circumferentially arranged on the second roller carrier 168 about the hub shaft 26 with equal spacing. The second conical planetary rollers 166 are rotatably supported to the second roller carrier 168 in a conventional manner about rotational axes R4 (e.g., second rotational axes) of the second conical planetary rollers 166, respectively. Each of the rotational axes R4 of the second conical planetary rollers 166 is slanted relative to the center axis R1 of the hub shaft 26. Specifically, each of the rotational axes R4 is configured such that a distance between the center axis R1 and each of the rotational axes R4 decreases along the second axial direction X2 of the center axis R1. The second conical planetary rollers 166 are substantially identical to each other. Furthermore, the second conical planetary rollers 166 are substantially identical to the first conical planetary rollers 60 of the first embodiment, and are arranged in the same manner as the second conical planetary rollers 66 of the first embodiment. Thus, description of the second conical planetary rollers 166 is minimal for the sake of brevity. The second conical planetary roller 166 has third and fourth frictional engagement portions 190 and 192 that are substantially identical to the first and second frictional engagement portions 82 and 84 of the first embodiment, respectively. The third and fourth frictional engagement portions 190 and 192 frictionally engage with the ring roller 158 and the sun roller 164, respectively. The third and fourth frictional engagement portions 190 and 192 have no gear teeth.

With this configuration of the CVT unit 122, the first and second frictional engagement portions 182 and 184 of the first conical planetary rollers 160 frictionally engage with the first ring roller portion 178 of the ring roller 158 and the first sun roller portion 186 of the sum roller 164, respectively. The third and fourth frictional engagement portions 190 and 192 of the second conical planetary rollers 166 frictionally engage with the second ring roller portion 180 of the ring roller 158 and the second sun roller portion 188 of the sun roller 164, respectively.

Referring further to FIG. 7, the power transmission path of the hub assembly 112 will be discussed in detail. First, the rear chain sprocket 24 receives the rotational power from the front chain sprocket 18 via the chain 20 (see FIG. 1). The rotational power rotates the rear chain sprocket 24 in the forward rotational direction about the center axis R1, which also rotates the driver 128 together with the upstream planetary gear carrier 156 of the upstream planetary gear unit 132 in the forward rotational direction about the center axis R1. The upstream planetary gear unit 132 is arranged to receive the rotational power from the driver 128, and rotate the ring roller 158. In other words, the ring roller 158 is operatively coupled to the driver 128 via the upstream planetary gear unit 132. The upstream planetary gear unit 132 receives the rotational power from the upstream planetary gear carrier 156 as a rotational input, and transmits the rotational power to the upstream ring gear 154 via the upstream planetary gears 152. The upstream planetary gear unit 132 is configured such that the upstream planetary gear unit 132 has a gear ratio of 2.79. In other words, the upstream planetary gear unit 132 increases an input rotational speed of the upstream planetary gear carrier 156 to transmit the rotational power to the ring roller 158 that fixedly couples to the upstream ring gear 154. As a result, the ring roller 58 rotates in the forward rotational direction about the center axis R1.

The CVT unit 122 receives the rotational power from the ring roller 158 as a rotational input, and transmits the rotational power to the second roller carrier 168 via the first conical planetary rollers 160, the sun roller 164 and the second conical planetary rollers 166. Specifically, the CVT unit 122 receives the rotational power from the ring roller 158 in the forward rotational direction about the center axis R1, and transmits the rotational power to the second roller carrier 168 such that the second roller carrier 168 rotates in the forward rotational direction about the center axis R1. Specifically, each of the first frictional engagement portions 182 of the first conical planetary rollers 160 receives the rotational power from the first ring roller portion 178 of the ring roller 158 as a rotational input. Then, each of the second frictional engagement portions 184 of the first conical planetary rollers 160 transmits the rotational power to the first sun roller portion 186 of the sun roller 164. As a result, the sun roller 164 rotates in the reverse rotational direction about the center axis R1 at a rotational speed according to an axial position of the first sun roller portion 186 of the sun roller 164 axial position of the second contact C2). On the other hand, each of the third frictional engagement portions 190 of the second conical planetary roller 166 receives the rotational power from the second ring roller portion 180 of the ring roller 158. Furthermore, each of the fourth frictional engagement portions 192 of the second conical planetary roller 166 receives the rotational power from the second sun roller portion 188. In other words, each of the second conical planetary rollers 166 receives two rotational inputs from the ring roller 158 and the sun roller 164. Each of the second conical planetary rollers 166 operates as a differential. Thus, each of the second conical planetary rollers 166 combines the two rotational inputs from the ring roller 158 and the sun roller 164 to cause each of the second conical planetary rollers 166 to rotate in the forward rotational direction about the center axis R1 at a rotational speed according to an axial position of the second sun roller portion 188 of the sun roller 164 (i.e., axial position of the fourth contact C4). Furthermore, this rotational movement of each of the second conical planetary rollers 166 in turn causes the second roller carrier 168 to rotate in the forward rotational direction about center axis R1. The second roller carrier 168 is operatively coupled to the hub shell 30. Thus, the second roller carrier 168 further transmits the rotational power to the hub shell 30 via the cam loader 94 with the output plate 98, and the one-way clutch 104.

The varying mechanism 96 continuously changes an axial position of the sun roller 164 between the first axial position (shown in FIG. 3) and the second axial position (shown in FIG. 5) via the middle axial position (shown in FIG. 4) along the center axis R1 of the hub shaft 26. The second effective diameter D2 (or engaging radius) of the second frictional engagement portion 184 of the first conical planetary roller 160 at the second contact C2 between the second frictional engagement portion 184 and the first sun roller portion 186 of the sun roller 164 gradually decreases as the sun roller 164 continuously moves from the first axial position toward the second axial position along the first axial direction X1. The fourth effective diameter D4 (or engaging radius) of the fourth frictional engagement portion 192 of the second conical planetary roller 166 at the fourth contact C4 between the fourth frictional engagement portion 192 and the second sun roller portion 188 of the sun roller 164 gradually increases as the sun roller 164 continuously moves from the first axial position toward the second axial position along the first axial direction X1. These axial movements of the second and fourth contacts C2 and C4 on the second and fourth frictional engagement portion 184 and 192 changes effective radial distance between the ring roller 158 and the sun roller 164, thereby causing gear ratio of the CVT unit 122 to change. Specifically, these axial movements of the second and fourth contacts C2 and C4 cause gear ratios of the first and second conical planetary rollers 160 and 166 to continuously change, respectively, thereby continuously changing a gear ratio of the hub assembly 112. In particular, the first axial position of the sun roller 164 corresponds to a top gear position that establishes a high gear ratio of the hub assembly 112. The middle axial position of the sun roller 164 corresponds to a middle gear position that establishes a middle gear ratio of the hub assembly 112. The second axial position of the sun roller 164 corresponds to a low gear position that establishes a low gear ratio of the hill) assembly 112.

Third Embodiment

Figure 8:
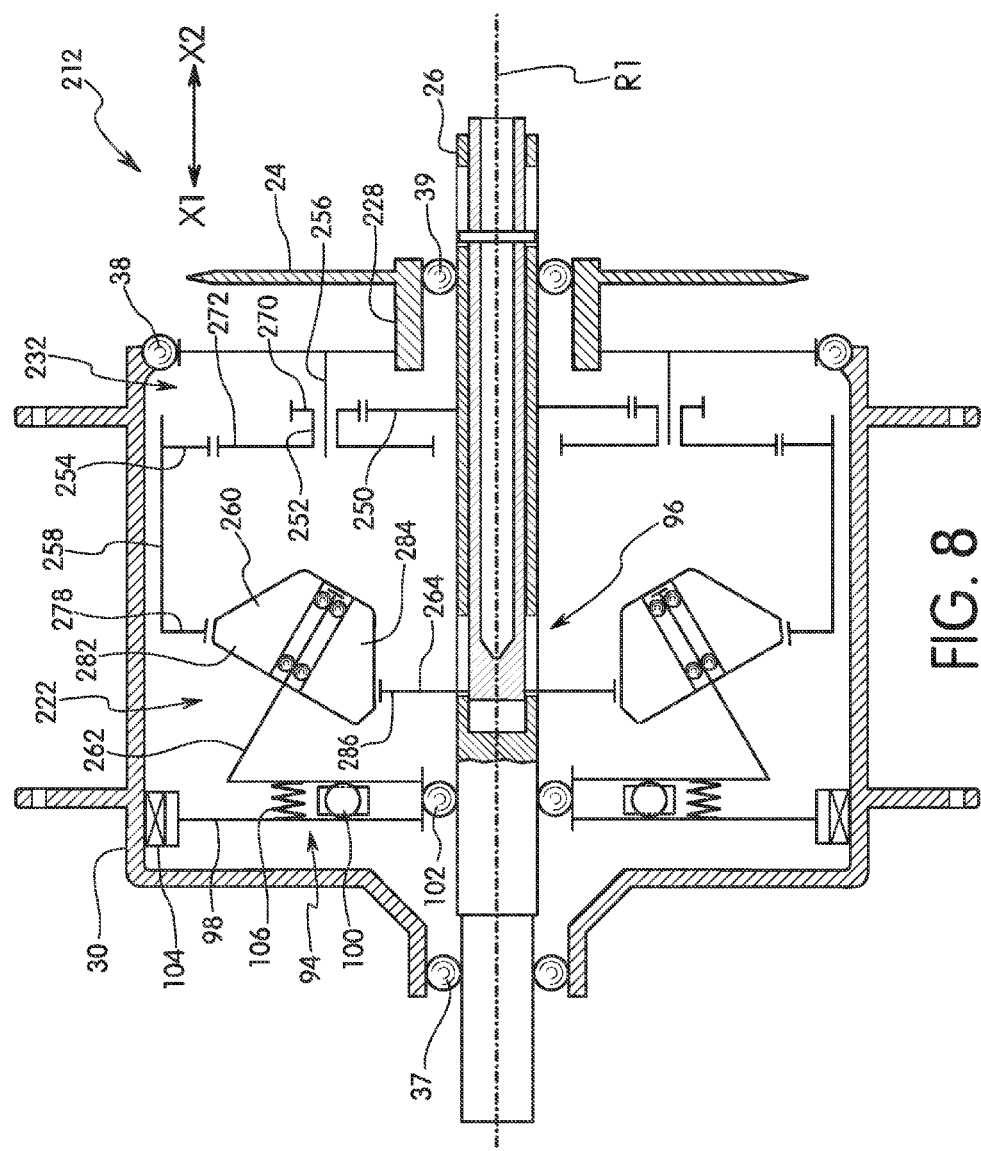
FIG. 8 is a schematic representation of a hub assembly having a continuously variable bicycle transmission unit in accordance with a third embodiment, illustrating a power transmission in the hub assembly.

Referring now to FIG. 8, a hub assembly 212 with a modified continuously variable transmission unit 222 (hereinafter "CVT unit 222") in accordance with a third embodiment will now be explained. The CVT unit 222 of the third embodiment is basically different from the CVT unit 22 of the first embodiment in that the CVT unit 222 only has a single conical planetary roller and a single roller carrier, and that a sun roller of the CVT unit 222 is non-rotatable about the center axis R1 of the hub shaft 26.

In view of the similarity between the first and third embodiments, the parts of the third embodiment that are identical to the parts of the first embodiment will be given the same reference numerals as the parts of the first embodiment. Also, parts of this third embodiment that are functionally identical and/or substantially identical to parts of the first embodiment will be given the same reference numerals but with "200" added thereto. In any event, the descriptions of the parts of the third embodiment that are substantially identical to the parts of the first embodiment may be omitted for the sake of brevity. However, it wilt be apparent to those skilled in the art from this disclosure that the descriptions and illustrations of the first embodiment also apply to this third embodiment, except as discussed and/or illustrated herein.

As illustrated in FIG. 8, the hub assembly 212 basically includes, among other things, the CVT unit 222 and a modified upstream planetary gear unit 232. The upstream planetary gear unit 232 is substantially identical to the upstream planetary gear unit 132 of the second embodiment. Thus, description of the upstream planetary gear unit 232 is minimal for the sake of brevity. The upstream planetary gear unit 232 basically includes an upstream sun gear 250, a plurality of upstream planetary gears 252, an upstream ring gear 254 and an upstream planetary gear carrier 256. The upstream planetary gear carrier 256 is fixedly coupled to a driver 228 that couples to the rear chain sprocket 24. In this embodiment, the upstream planetary gear unit 232 includes four of the upstream planetary gears 252 (only two is shown in FIG. 8). However, the number of the upstream planetary gears 252 can be changed as needed or desired. Each of the upstream planetary gears 252 has smaller and larger diameter gear sections 270 and 272.

The CVT unit 222 basically includes a ring roller 258, a plurality of first conical planetary rollers 260, a first roller carrier 262 first carrier), and a sun roller 264. Specifically, in this embodiment, the CVT unit 222 includes four of the first conical planetary rollers 260 (only two is shown in FIG. 8). However the number of the first conical planetary rollers 260 can be changed as needed or desired.

The ring roller 258 is operatively supported to the hub shaft 26, and operatively coupled to the driver 228 through the upstream planetary gear unit 232. Specifically, the ring roller 258 is rotatably supported to the hub shaft 26. The ring roller 258 includes a first ring roller portion 278. The first ring roller portion 278 frictionally engages with the first conical planetary rollers 260, respectively. The ring roller 258 is substantially identical to the ring roller 58 of the first embodiment, except that the ring roller 258 merely has a single ring roller portion. The first ring roller portion 278 has a tapered inner peripheral face that is substantially identical to the second tapered inner peripheral face 80a of the first embodiment.

The first conical planetary rollers 260 are rotatably supported to the first roller carrier 262. The first conical planetary rollers 260 are substantially identical to the second conical planetary rollers 166 of the second embodiment, and arranged in the same manner as the second conical planetary rollers 166 of the second embodiment. Thus, the description of the first conical planetary rollers 260 is minimal for the sake of brevity. The first conical planetary rollers 260 frictionally engage with the ring roller 258 and the sun roller 264. The first roller carrier 262 is substantially identical to the second roller carrier 168 of the second embodiment. Thus, description of the first roller carrier 262 is minimal for the sake of brevity.

The first roller carrier 262 is operatively supported to the hub shaft 26. In particular, the first roller carrier 262 is rotatably mounted around the hub shaft 26. The first roller carrier 262 is further operatively coupled to the hub shell 30. The first conical planetary rollers 260 are circumferentially arranged on the first roller carrier 262 about the hub shaft 26 with equal spacing. The first conical planetary rollers 260 are rotatably supported to the first roller carrier 262 in a conventional manner about rotational axes R3 (e.g., first rotational axes) of the first conical planetary rollers 260, respectively. Each of the rotational axes R3 of the first conical planetary rollers 260 is slanted relative to the center axis R1 of the hub shaft 26. Specifically, each of the rotational axes R3 is configured such that a distance between the center axis R1 and each of the rotational axes R3 decreases along the second axial direction X2 of the center axis R1. The first conical planetary rollers 260 are substantially identical to each other. The first conical planetary roller 260 has first and second frictional engagement portions 282 and 284 that are substantially identical to the third and fourth frictional engagement portions 190 and 192 of the second embodiment, respectively. The first and second frictional engagement portions 282 and 284 frictionally engage with the ring roller 258 and the sun roller 264, respectively. The first and second frictional engagement portions 282 and 284 have no gear teeth.

The sun roller 264 is operatively supported to the hub shaft 26. Specifically, the sun roller 264 is non-rotatably supported to the hub shaft 26 about the center axis R1 of the hub shaft. Furthermore, the sun roller 264 is movable along the center axis R1 of the huh shaft 26. The sun roller 264 frictionally engages with the first conical planetary rollers 260. The sun roller 264 is substantially identical to the sun roller 64 of the first embodiment, except that the sun roller 264 has a single sun roller portion. Thus, description of the sun roller 264 is minimal for the sake of brevity. The sun roller 264 has a first sun roller portion 286 that is substantially identical to the first sun roller portion 86 of the first embodiment. The first sun roller portion 286 frictionally engages with the first conical planetary rollers 260, respectively. The first sun roller portion 286 has no gear teeth.

With this configuration of the CVT unit 222, the first and second frictional engagement portions 282 and 284 of the first conical planetary rollers 260 frictionally engage with the first ring roller portion 278 of the ring roller 258 and the first sun roller portion 286 of the sun roller 264, respectively.

Referring further to FIG. 8, the power transmission path of the hub assembly 212 will be discussed in detail. First, the rear chain sprocket 24 receives the rotational power from the front chain sprocket 18 via the chain 20 (see FIG. 1). The rotational power rotates the rear chain sprocket 24 in the forward rotational direction about the center axis R1, which also rotates the driver 228 together with the upstream planetary gear carrier 256 of the upstream planetary gear unit 232 in the forward rotational direction about the center axis R1. The upstream planetary gear unit 232 is arranged to receive the rotational power from the driver 228, and rotate the ring roller 258 in the forward rotational direction about the center axis R1. The upstream planetary gear unit 232 is substantially identical to the upstream planetary gear unit 132 of the second embodiment. Thus, description of transmission of the rotational power through the upstream planetary gear unit 232 is omitted for the sake of brevity.

The CVT unit 222 receives the rotational power from the ring roller 258 as a rotational input, and transmits the rotational power to the first roller carrier 262 via the first conical planetary rollers 260 and the sun roller 264. Specifically, the CVT unit 222 receives the rotational power from the ring roller 258 in the forward rotational direction about the center axis R1, and transmits the rotational power to the first roller carrier 262 such that the first roller carrier 262 rotates in the forward rotational direction about the center axis R1. Specifically, each of the first frictional engagement portions 282 of the first conical planetary rollers 260 receives the rotational power from the first ring roller portion 278 of the ring roller 258 as a rotational input. On the other hand, each of the second frictional engagement portions 284 of the first conical planetary rollers 260 frictionally engages with the sun roller 264. Thus, the rotational power from the first ring roller portion 278 of the ring roller 258 rotates the first conical planetary rollers 260 about the sun roller 264 in the forward rotational direction, which in turn rotates the first roller carrier 262 in the forward rotational direction about the center axis R1. The first roller carrier 262 rotates in the forward rotational direction about the center axis R1 at a rotational speed according to an axial position of the first sun roller portion 286 of the sun roller 264 (i.e., axial position of the second contact C2). The first roller carrier 262 is operatively coupled to the hub shell 30. Thus, the first roller carrier 262 further transmits the rotational power to the hub shell 30 via the cam loader 94 with the output plate 98, and the one-way clutch 104.

The varying mechanism 96 continuously changes an axial position of the sun roller 264 between the first axial position (shown in FIG. 3) and the second axial position (shown in FIG. 5) via the middle axial position (shown in FIG. 4) along the center axis R1 of the hub shaft 26. The second effective diameter D2 (or engaging radius) of the second frictional engagement portion 284 of the first conical planetary roller 260 at the second contact C2 between the second frictional engagement portion 284 and the first sun roller portion 286 of the sun roller 264 gradually increases as the sun roller 264 continuously moves from the first axial position toward the second axial position along the first axial direction X1. This movement of the second contact C2 on the second frictional engagement portion 284 changes effective radial distance between the ring roller 258 and the sun roller 264, thereby causing gear ratio of the CVT unit 222 to change. Specifically, this axial movement of the second contact C2 causes a gear ratio of the first conical planetary roller 260 to continuously change, thereby continuously changing a gear ratio of the hub assembly 212.

Fourth Embodiment

Figure 9:
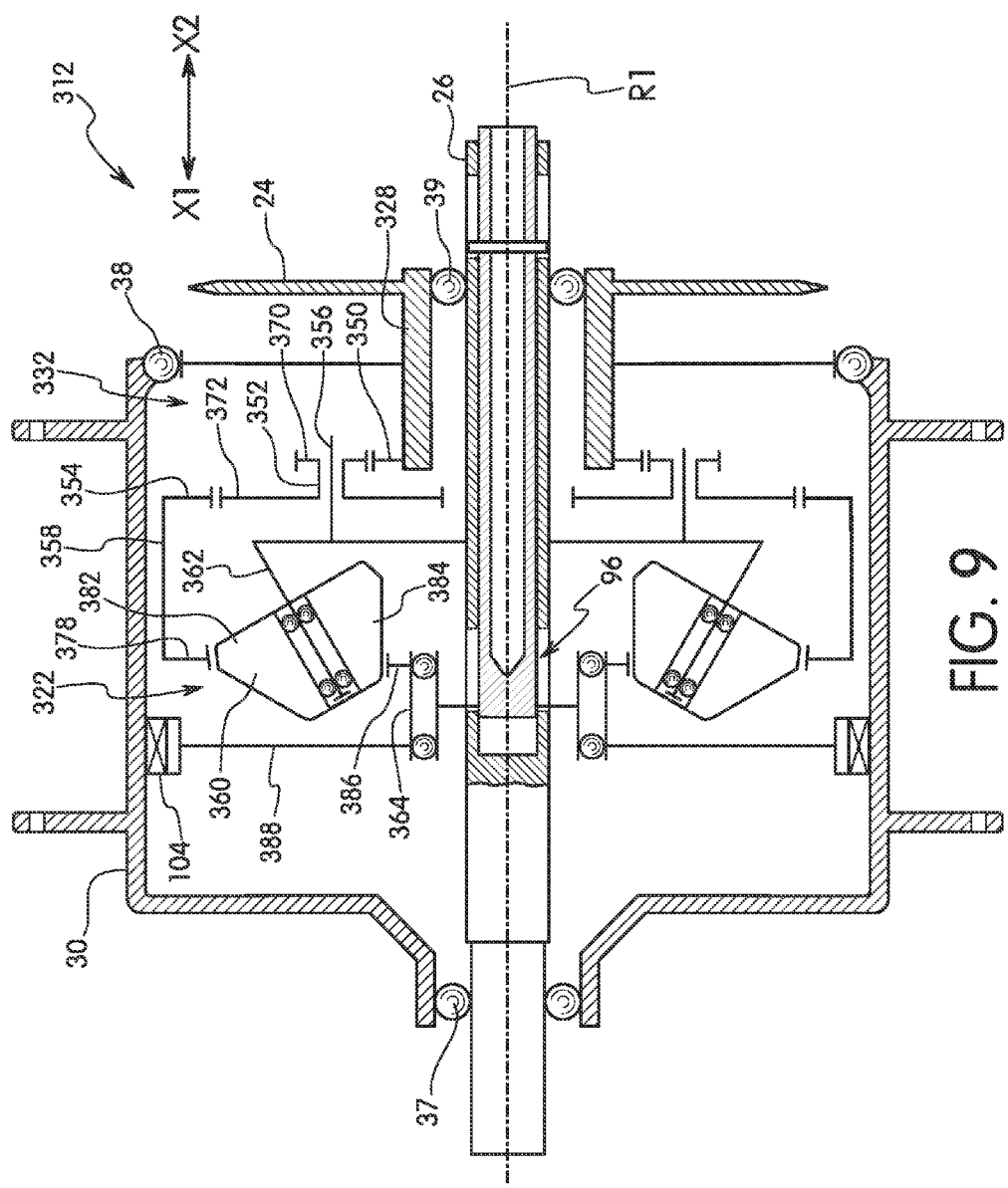
FIG. 9 is a schematic representation of a hub assembly having a continuously variable bicycle transmission unit in accordance with a fourth embodiment, illustrating a power transmission in the hub assembly.

Referring now to FIG. 9, a hub assembly 312 with a modified continuously variable transmission unit 322 (hereinafter "CVT unit 322") in accordance with a fourth embodiment will now be explained. The CVT unit 322 of the fourth embodiment is basically different form the CVT unit 22 of the first embodiment in that the CVT unit 322 only has a single conical planetary roller and a single roller carrier, and that a sun roller of the CVT unit 322 is operatively coupled to the hub shell 30 to rotate the hub shell 30.

In view of the similarity between the first and fourth embodiments, the parts of the fourth embodiment that are identical to the parts of the first embodiment will be given the same reference numerals as the parts of the first embodiment. Also, parts of this fourth embodiment that are functionally identical and/or substantially identical to parts of the first embodiment will be given the same reference numerals but with "300" added thereto any event, the descriptions of the parts of the fourth embodiment that are substantially identical to the parts of the first embodiment may be omitted for the sake of brevity. However, it will be apparent to those skilled in the art from this disclosure that the descriptions and illustrations of the first embodiment also apply to this fourth embodiment, except as discussed and/or illustrated herein.

As illustrated in FIG. 9, the hub assembly 312 basically includes, among other things, the CVT unit 322 and a modified upstream planetary gear unit 332. The upstream planetary gear unit 332 is substantially identical to the upstream planetary gear unit 32 of the first embodiment. Thus, description of the upstream planetary gear unit 332 is minimal for the sake of brevity. The upstream planetary gear unit 332 basically includes an upstream sun gear 350, a plurality of upstream planetary gears 352, an upstream ring gear 354 and an upstream planetary gear carrier 356. The upstream sun gear 350 is fixedly coupled to a driver 328 that couples to the rear chain sprocket 24. In this embodiment, the upstream planetary gear unit 332 includes four of the upstream planetary gears 352 (only two is shown in FIG. 9). However, the number of the upstream planetary gears 352 can be changed as needed or desired. Each of the upstream planetary gears 352 has smaller and larger diameter gear sections 370 and 372.

The CVT unit 322 basically includes a ring roller 358, a plurality of first conical planetary rollers 360, a first roller carrier 362 (e.g., first carrier), and a sun roller 364. Specifically, in this embodiment, the CVT unit 322 includes four of the first conical planetary rollers 360 (only two is shown in FIG. 9). However the number of the first conical planetary rollers 360 can be changed as needed or desired.

The ring roller 358 is operatively supported to the hub shaft 26, and operatively coupled to the driver 328 through the upstream planetary gear unit 332. Specifically, the ring roller 358 is rotatably supported to the hub shaft 26. The ring roller 358 includes a first ring roller portion 378. The first ring roller portion 378 frictionally engages with the first conical planetary rollers 360, respectively. The ring roller 358 is substantially identical to the ring roller 58 of the first embodiment, except that the ring roller 358 merely has a single ring roller portion.

The first conical planetary rollers 360 are rotatably supported to the first roller carrier 362. The first conical planetary rollers 360 are substantially identical to the first conical planetary rollers 60 of the first embodiment, and arranged in the same manner as the first conical planetary rollers 60 of the first embodiment. Thus, the description of the first conical planetary rollers 360 is minimal for the sake of brevity. The first conical planetary rollers 360 frictionally engage with the ring roller 358 and the sun roller 364. The first conical planetary rollers 360 are substantially identical to each other. Each of the first conical planetary rollers 360 has first and second frictional engagement portions 382 and 384 that are substantially identical to the first and second frictional engagement portions 82 and 84 of the first embodiment, respectively. The first and second frictional engagement portions 382 and 384 frictionally engage with the ring roller 358 and the sun roller 364, respectively. The first and second frictional engagement portions 382 and 384 have no gear teeth.

The first roller carrier 362 is substantially identical to the first roller carrier 62 of the first embodiment. Thus, description of the first roller carrier 362 is minimal for the sake of brevity. The first roller carrier 362 is operatively supported to the hub shaft 26. In particular, the first roller carrier 362 is non-rotatably mounted on the hub shaft 26. The first conical planetary rollers 360 are circumferentially arranged on the first roller carrier 362 about the hub shaft 26 with equal spacing. The first conical planetary rollers 360 are rotatably supported to the first roller carrier 362 in a conventional manner about rotational axes R3 (e.g., first rotational axes) of the first conical planetary rollers 360, respectively. Each of the rotational axes R3 of the first conical planetary rollers 360 is slanted relative the center axis R1 of the hub shaft 26. Specifically, each of the rotational axes 83 is configured such that a distance between the center axis R1 and each of the rotational axes R3 decreases along the first axial direction X1 of the center axis R1.

The sun roller 364 is operatively supported to the hub shaft 26. Specifically, the sun roller 364 is rotatably supported to the hub shaft 26. Furthermore, the sun roller 364 is movable along the center axis R1 of the hub shaft 26. The sun roller 364 frictionally engages with the first conical planetary rollers 360. The sun roller 364 is substantially identical to the sun roller 64 of the first embodiment, except that the sun roller 364 has a single sun roller portion, and that the sun roller 364 is operatively coupled to the hub shell 30. Thus, description of the sun roller 364 is minimal for the sake of brevity. The sun roller 364 has a first sun roller portion 386 that is substantially identical to the first sun roller portion 86 of the first embodiment. Furthermore, the sun roller 364 has an output portion 388 that is operatively coupled to the hub shell 30 via the one-way clutch 104. The output portion 388 is integrally formed on the sun roller 364. The output portion 388 is axially slidably coupled to the one-way clutch 104 in a conventional manner. The output portion 388 can be substantially identical to the output plate 98 of the first embodiment. The first sun roller portion 386 frictionally engages with the first conical planetary rollers 360, respectively. The first sun roller portion 386 has no gear teeth.

With this configuration of the CVT unit 322, the first and second frictional engagement portions 382 and 384 of the first conical planetary rollers 360 frictionally engage with the first ring roller portion 378 of the ring roller 358 and the first sun roller portion 386 of the sun roller 364, respectively.

Referring further to FIG. 9, the power transmission path of the hub assembly 312 will be discussed in detail. First, the rear chain sprocket 24 receives the rotational power from the front chain sprocket 18 via the chain 20 (see FIG. 1). The rotational power rotates the rear chain sprocket 24 in the forward rotational direction about the center axis R1, which also rotates the driver 328 together with the upstream sun gear 350 of the upstream planetary gear unit 332 in the forward rotational direction about the center axis R1. The upstream planetary gear unit 332 is arranged to receive the rotational power from the driver 328, and rotate the ring roller 358 in the reverse rotational direction about the center axis R1. The upstream planetary gear unit 332 is substantially identical to the upstream planetary gear unit 32 of the first embodiment. Thus, description of transmission of the rotational power through the upstream planetary gear unit 332 is omitted for the sake of brevity.

The CVT unit 322 receives the rotational power from the ring roller 358 as a rotational input, and transmits the rotational power to the sun roller 364 via the first conical planetary rollers 360. Specifically, the CVT unit 322 receives the rotational power from the ring roller 358 in the reverse rotational direction about the center axis R1, and transmits the rotational power to the sun roller 364 such that the sun roller 364 rotates in the forward rotational direction about the center axis R1. In other words, the CVT unit 322 reverses an input rotational direction (i.e., reverse rotational direction) of the ring roller 358. Specifically, each of the first frictional engagement portions 382 of the first conical planetary rollers 360 receives the rotational power from the first ring roller portion 378 of the ring roller 358 as a rotational input. Then, each of the second frictional engagement portions 382 of the first conical planetary rollers 360 transmits the rotational power to the first sun roller portion 386 of the sun roller 364. As a result, the sun roller 364 rotates in the forward rotational direction about the center axis R1 at a rotational speed according to an axial position of the first sun roller portion 386 of the sun roller 364 (i.e., axial position of the second contact C2). The sun roller 364 is operatively coupled to the hub shell 30. Thus, the sun roller 364 further transmits the rotational power to the hub shell 30 via the one-way clutch 104. In this embodiment, the hub assembly 312 does not include a cam loader in the power transmission path, as illustrated in FIG. 9. However, alternatively or additionally, the hub assembly 312 can include the cam loader 94 in the power transmission path such that the sun roller 364 transmits the rotational power to the hub shell 30 via the cam loader 94.

The varying mechanism 96 continuously changes an axial position of the sun roller 364 between the first axial position (shown in FIG. 3) and the second axial position (shown in FIG. 5) via the middle axial position (shown in FIG. 4) along the center axis R1 of the hub shaft 26. The second effective diameter D2 (or engaging radius) of the second frictional engagement portion 384 of the first conical planetary roller 360 at the second contact C2 between the second frictional engagement portion 384 and the first sun roller portion 386 of the sun roller 364 gradually decrease as the sun roller 364 continuously moves from the first axial position toward the second axial position along the first axial direction X1. This movement of the second contact C2 on the second frictional engagement portion 384 changes effective radial distance between the ring roller 358 and the sun roller 364, thereby causing gear ratio of the CVT unit 322 to change. Specifically, this axial movement of the second contact C2 causes a gear ratio of the first conical planetary roller 360 to continuously change, thereby continuously changing a gear ratio of the hub assembly 312.

Fifth Embodiment

Figure 10:
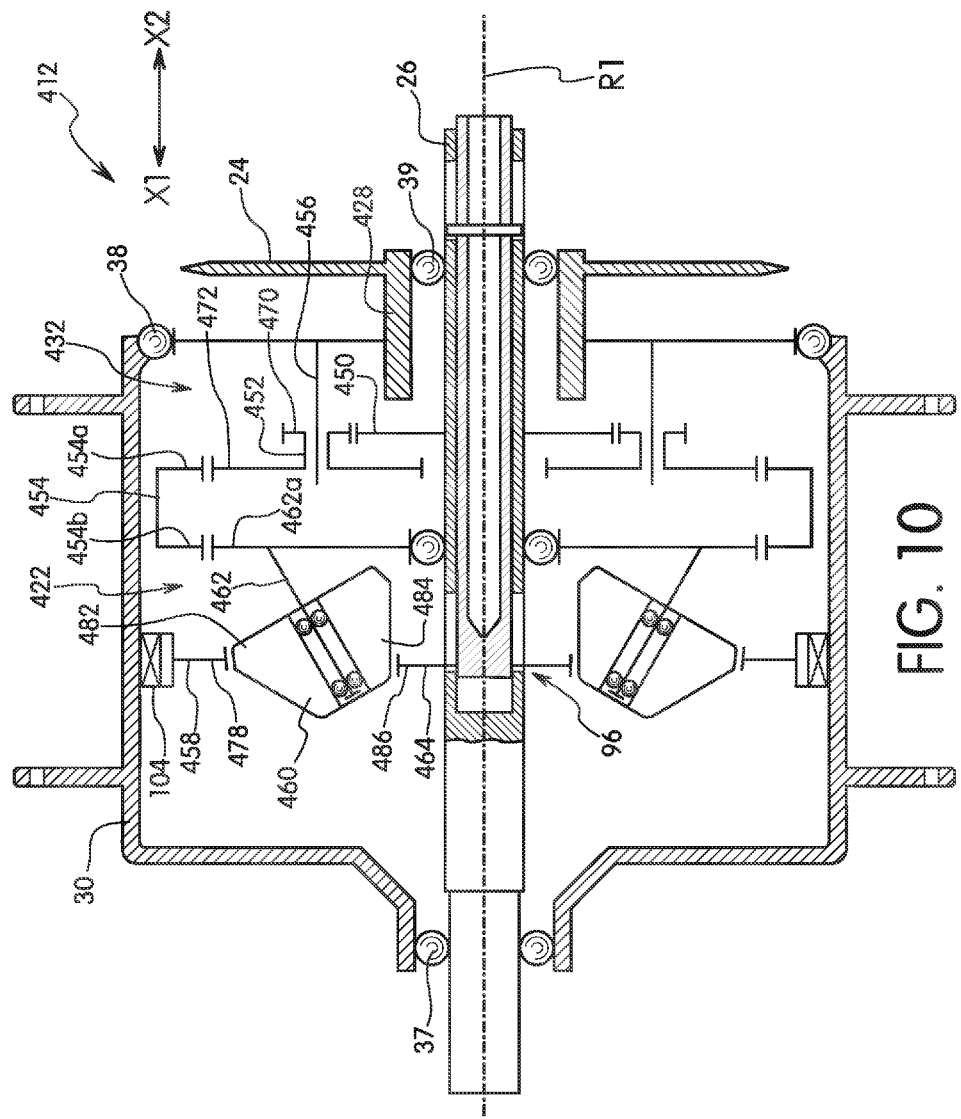
FIG. 10 is a schematic representation of a hub assembly having a continuously variable bicycle transmission unit in accordance with a fifth embodiment, illustrating a power transmission in the hub assembly.

Referring now to FIG. 10, a hub assembly 412 with a modified continuously variable transmission unit 422 (hereinafter "CVT unit 422") in accordance with a fifth embodiment will now be explained. The CVT unit 422 is basically different from the CVT unit 222 of the third embodiment in that a first roller carrier of the CVT unit 422 is operatively coupled to a driver to receive a rotational power from the driver, and that a ring roller of the CVT unit 422 is operatively coupled to the hub shell 30 to rotate the hub shell 30.

In view of the similarity between the first and fifth embodiments, the parts of the fifth embodiment that are identical to the parts of the first embodiment will be given the same reference numerals as the parts of the first embodiment. Also, parts of this fifth embodiment that are functionally identical and/or substantially identical to parts of the first embodiment will be given the same reference numerals but with "400" added thereto. In any event, the descriptions of the parts of the fifth embodiment that are substantially identical to the parts of the first embodiment may be omitted for the sake of brevity. However, it will be apparent to those skilled in the art from this disclosure that the descriptions and illustrations of the first embodiment also apply to this fifth embodiment, except as discussed and/or illustrated herein.

As illustrated in FIG. 10, the hill) assembly 412 basically includes, among other things, the CVT unit 422 and a modified upstream planetary gear unit 432. The upstream planetary gear unit 432 is substantially identical to the upstream planetary gear unit 132 of the second embodiment, except that an upstream ring gear 454 has first and second upstream ring gear portions 454a and 454b. Thus, description of the upstream planetary gear unit 432 is minimal for the sake of brevity. The upstream planetary gear unit 432 basically includes an upstream sun gear 450, a plurality of upstream planetary gears 452, the upstream ring gear 454 and an upstream planetary gear carrier 456. The upstream planetary gear carrier 456 is fixedly coupled to a driver 428 that couples to the rear chain sprocket 24. In this embodiment, the upstream planetary gear unit 432 includes four of the upstream planetary gears 452 (only two is shown in FIG. 10). However, the number of the upstream planetary gears 452 can be changed as needed or desired. Each of the upstream planetary gears 452 has smaller and larger diameter gear sections 470 and 472.

The upstream ring gear 454 is basically a cylindrical member. The first and second upstream ring gear portions 454a and 454b have radially inwardly extending gear teeth, respectively. The first upstream ring gear portion 454a meshes with the larger diameter gear sections 472 of the upstream planetary gears 452. The second upstream ring gear portion 454b is operatively coupled to the CVT unit 42 to transmit the rotational power to the CVT unit 422. In this embodiment, the second upstream ring gear portion 454b includes an internal gear. However, alternatively, the second upstream ring gear portion 454b can include a serration or a spline that meshes with the CVT unit 422 instead of an internal gear.

The CVT unit 42 basically includes a ring roller 458, a plurality of first conical planetary rollers 460, a first roller carrier 462 (e.g., first carrier), and a sun roller 464. Specifically, in this embodiment, the CVT unit 422 includes four of the first conical planetary rollers 460 (only two is shown in FIG. 10). However the number of the first conical planetary rollers 460 can be changed as needed or desired.

The first roller carrier 462 is operatively supported to the hub shaft 26. In particular, the first roller carrier 462 is rotatably mounted around the hub shaft 26. The first roller carrier 462 is further operatively coupled to the upstream ring gear 454. In particular, the first roller carrier 462 has outwardly extending gear teeth 462a on an outer peripheral face of the first roller carrier 462. The gear teeth 462a of the first roller carrier 462 mesh with the gear teeth of the second upstream ring gear portion 454b such that the first roller carrier 462 receives the rotational power from the upstream ring gear 454. The first conical planetary rollers 460 are circumferentially arranged on the first roller carrier 462 about the hub shaft 26 with equal spacing. The first conical planetary rollers 460 are rotatably supported to the first roller carrier 462 in a conventional manner about rotational axes R3 (e.g., first rotational axes) of the first conical planetary rollers 460, respectively. Each of the rotational axes R3 of the first conical planetary rollers 460 is slanted relative to the center axis R1 of the hub shaft 26. Specifically, each of the rotational axes R3 is configured such that a distance between the center axis R1 and each of the rotational axes R3 decreases along the first axial direction X1 of the center axis R1. The first conical planetary rollers 460 are substantially identical to each other. The first conical planetary rollers 460 are substantially identical to the first conical planetary rollers 60 of the first embodiment, and arranged in the same manner as the first conical planetary rollers 60 of the first embodiment. Thus, the description of the first conical planetary rollers 460 is minimal for the sake of brevity. Each of the first conical planetary rollers 460 has first and second frictional engagement portions 482 and 484 that are substantially identical to the first and second frictional engagement portions 82 and 84, respectively. The first and second frictional engagement portions 482 and 484 frictionally engage with the ring roller 458 and the sun roller 464, respectively. The first and second frictional engagement portions 482 and 484 have no gear teeth.

The sun roller 464 is operatively supported to the hub shaft 26. Specifically, the sun roller 464 is non-rotatably supported to the hub shaft 26 about the center axis R1 of the hub shaft. Furthermore, the sun roller 464 is movable along the center axis R1 of the huh shaft 26. The sun roller 464 frictionally engages with the first conical planetary rollers 460. The sun roller 464 is substantially identical to the sun roller 64 of the first embodiment, except that the sun roller 464 has a single sun roller portion. Thus, description of the sun roller 464 is minimal for the sake of brevity. The sun roller 464 has a first sun roller portion 486 that is substantially identical to the first sun roller portion 86 of the first embodiment. The first sun roller portion 486 frictionally engages with the first conical planetary rollers 460, respectively. The first sun roller portion 486 has no gear teeth.

The ring roller 458 is operatively supported to the hub shaft 26, and operatively coupled to the hub shell 30 via the one-way clutch 104. Specifically, the ring roller 458 is rotatably supported to the hub shaft 26. The ring roller 458 includes a first ring roller portion 478. The first ring roller portion 478 frictionally engages with the first conical planetary rollers 460, respectively. The ring roller 458 is substantially identical to the ring roller 58 of the first embodiment, except that the ring roller 458 merely has a single ring roller portion, and that the ring roller 458 is coupled to an inner peripheral portion of the one-way clutch 104.

With this configuration of the CVT unit 422, the first and second frictional engagement portions 482 and 484 of the first conical planetary rollers 460 frictionally engage with the first ring roller portion 478 of the ring roller 458 and the first sun roller portion 486 of the sun roller 464, respectively.

Referring further to FIG. 10, the power transmission path of the hub assembly 412 will be discussed in detail. First, the rear chain sprocket 24 receives the rotational power from the front chain sprocket 18 via the chain 20 (see FIG. 1). The rotational power rotates the rear chain sprocket 24 in the forward rotational direction about the center axis R1, which also rotates the driver 428 together with the upstream planetary gear carrier 456 of the upstream planetary gear unit 432 in the forward rotational direction about the center axis R1. The upstream planetary gear unit 432 is arranged to receive the rotational power from the driver 428, and rotate upstream ring gear 454 in the forward rotational direction about the center axis R1. The upstream planetary gear unit 432 is substantially identical to the upstream planetary gear unit 132 of the second embodiment. Thus, description of transmission of the rotational power through the upstream planetary gear unit 432 is omitted for the sake of brevity.

The CVT unit 422 receives the rotational power from the first roller carrier 462 as a rotational input, and transmits the rotational power to the ring roller 458 via the first conical planetary rollers 460 and the sun roller 464. Specifically, the CVT unit 422 receives the rotational power from first roller carrier 462 in the forward rotational direction about the center axis R1, and transmits the rotational power to ring roller 458 such that the ring roller 458 rotates in the forward rotational direction about the center axis R1. Specifically, the first roller carrier 462 receives the rotational power from the upstream ring gear 454 as a rotational input. On the other hand, each of the second frictional engagement portions 484 of the first conical planetary rollers 460 frictionally engages with the sun roller 464. Thus, the rotational power from the first roller carrier 462 rotates the first conical planetary rollers 460 about the sun roller 464 in the forward rotational direction while the first conical planetary rollers 460 rotates about the rotational axes R3, respectively, which in turn rotates the ring roller 458 in the forward rotational direction about the center axis R1. The ring roller 458 rotates in the forward rotational direction about the center axis R1 at a rotational speed according to an axial position of the first sun roller portion 486 of the sun roller 464 (i.e., axial position of the second contact C2). The ring roller 458 is operatively coupled to the hub shell 30. Thus, the ring roller 458 further transmits the rotational power to the hub shell 30 via the one-way clutch 104. In this embodiment, the hub assembly 412 does not include a cam loader in the power transmission path, as illustrated in FIG. 10. However, alternatively or additionally, the hill) assembly 412 can include the cam loader 94 in the power transmission path such that the ring roller 458 transmits the rotational power to the hub shell 30 via the cam loader 94.

The varying mechanism 96 continuously changes an axial position of the sun roller 464 between the first axial position (shown in FIG. 3) and the second axial position (shown in FIG. 5) via the middle axial position (shown in FIG. 4) along the center axis R1 of the hub shaft 26. The second effective diameter D2 (or engaging radius) of the second frictional engagement portion 484 of the first conical planetary roller 460 at the second contact C2 between the second frictional engagement portion 484 and the first sun roller portion 486 of the sun roller 464 gradually decreases as the sun roller 464 continuously moves from the first axial position toward the second axial position along the first axial direction X1. This movement of the second contact C2 on the second frictional engagement portion 484 changes effective radial distance between the ring roller 458 and the sun roller 464, thereby causing gear ratio of the CVT unit 422 to change. Specifically, this axial movement of the second contact C2 causes a gear ratio of the first conical planetary roller 460 to continuously change, thereby continuously changing a gear ratio of the hub assembly 412.

Sixth Embodiment

Figure 11:
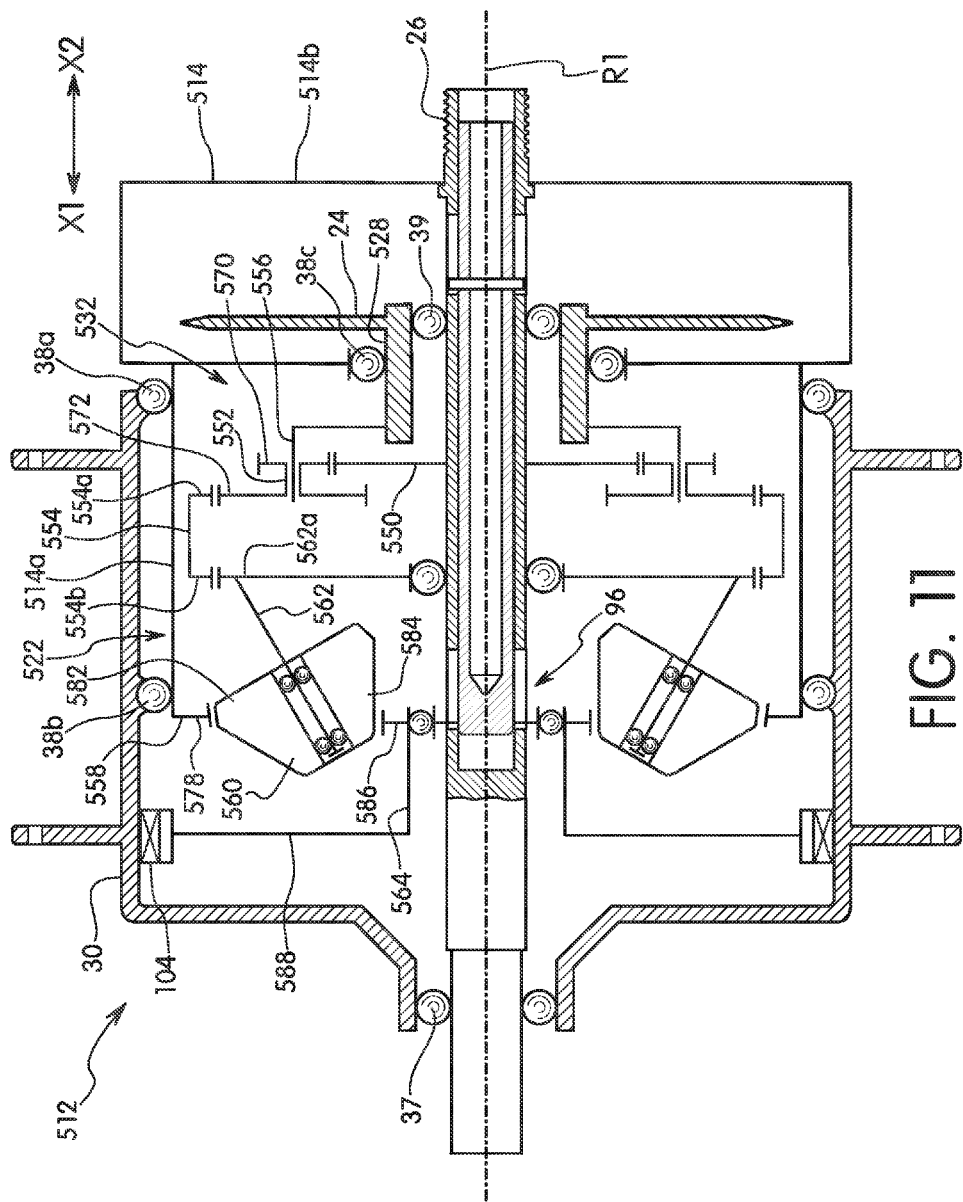
FIG. 11 is a schematic representation of a hub assembly having a continuously variable bicycle transmission unit in accordance with a sixth embodiment, illustrating a power transmission in the hub assembly.

Referring now to FIG. 11, a hub assembly 512 with a modified continuously variable transmission unit 522 (hereinafter "CVT unit 522") in accordance with a sixth embodiment will now be explained. The CVT unit 522 is basically different from the CVT unit 422 of the fifth embodiment in that a ring roller of the CVT unit 522 is non-rotatably coupled to the hub shaft 26, and that a sun roller of the CVT unit 522 is operatively coupled to the hub shell 30 to rotate the hub shell 30.

In view of the similarity between the first and sixth embodiments, the parts of the sixth embodiment that are identical to the parts of the first embodiment will be given the same reference numerals as the parts of the first embodiment. Also, parts of this sixth embodiment that are functionally identical and/or substantially identical to parts of the first embodiment wilt be given the same reference numerals but with "500" added thereto. In any event, the descriptions of the parts of the sixth embodiment that are substantially identical to the parts of the first embodiment may be omitted for the sake of brevity. However, it wilt be apparent to those skilled in the art from this disclosure that the descriptions and illustrations of the first embodiment also apply to this sixth embodiment, except as discussed and/or illustrated herein.

As illustrated in FIG. 11, the hub assembly 512 basically includes, among other things, the CVT unit 522 and a modified upstream planetary gear unit 532. The upstream planetary gear unit 532 is substantially identical to the upstream planetary gear unit 432 of the fifth embodiment. Thus, description of the upstream planetary gear unit 532 is minimal for the sake of brevity. The upstream planetary gear unit 532 basically includes an upstream sun gear 550, a plurality of upstream planetary gears 552, the upstream ring gear 554 and an upstream planetary gear carrier 556. The upstream planetary gear carrier 556 is fixedly coupled to a driver 528 that couples to the rear chain sprocket 24. In this embodiment, the upstream planetary gear unit 532 includes four of the upstream planetary gears 552 (only two is shown in FIG. 11). However, the number of the upstream planetary gears 552 can be changed as needed or desired. Each of the upstream planetary gears 552 has smaller and larger diameter gear sections 570 and 572.

The upstream ring gear 554 is basically a cylindrical member. The upstream ring gear 554 includes first and second upstream ring gear portions 554a and 554b. The first and second upstream ring gear portions 554a and 554b have radially inwardly extending gear teeth, respectively. The first upstream ring gear portion 554a meshes with the larger diameter gear sections 572 of the upstream planetary gears 552. The second upstream ring gear portion 554b is operatively coupled to the CVT unit 522 to transmit the rotational power to the CVT unit 522. In this embodiment, the second upstream ring gear portion 554b includes an internal gear. However, alternatively, the second upstream ring gear portion 554b can include a serration or a spline that meshes with the CVT unit 522 instead of an internal gear.

The CVT unit 522 basically includes a ring roller 558, a plurality of first conical planetary rollers 560, a first roller carrier 562 (e.g., first carrier), and a sun roller 564. Specifically, in this embodiment, the CVT unit 522 includes four of the first conical planetary rollers 560 (only two is shown in FIG. 11). However the number of the first conical planetary rollers 560 can be changed as needed or desired.

The first roller carrier 562 is operatively supported to the hub shaft 26. In particular, the first roller carrier 562 is rotatably mounted around the hub shaft 26. The first roller carrier 562 is further operatively coupled to the upstream ring gear 554. In particular, the first roller carrier 562 has outwardly extending gear teeth 562a on an outer peripheral face of the first roller carrier 562. The gear teeth 562a of the first roller carrier 562 mesh with the gear teeth of the second upstream ring gear portion 554b such that the first roller carrier 562 receives the rotational power from the upstream ring gear 554. The first conical planetary rollers 560 are circumferentially arranged on the first roller carrier 562 about the hub shaft 26 with equal spacing. The first conical planetary rollers 560 are rotatably supported to the first roller carrier 562 in a conventional manner about rotational axes R3 (e.g., first rotational axes) of the first conical planetary rollers 560, respectively. Each of the rotational axes R3 of the first conical planetary rollers 560 is slanted relative to the center axis R1 of the hub shaft 26. Specifically, each of the rotational axes R3 is configured such that a distance between the center axis R1 and each of the rotational axes R3 decreases along the first axial direction X1 of the center axis R1. The first conical planetary rollers 560 are substantially identical to each other. The first conical planetary rollers 560 are substantially identical to the first conical planetary rollers 60 of the first embodiment, and arranged in the same manner as the first conical planetary rollers 60 of the first embodiment. Thus, the description of the first conical planetary rollers 560 is minimal for the sake of brevity. Each of the first conical planetary rollers 560 has first and second frictional engagement portions 582 and 584 that are substantially identical to the first and second frictional engagement portions 82 and 84, respectively. The first and second frictional engagement portions 582 and 584 frictionally engage with the ring roller 558 and the sun roller 564, respectively. The first and second frictional engagement portions 582 and 584 have no gear teeth.

The ring roller 558 is fixedly and non-rotatably supported to the hub shaft 26. Specifically, the ring roller 558 is formed on a frame part 514. The frame part 514 has a cylindrical inner shell 514a and a casing portion 514b. The inner shell 514a axially extends along an inner peripheral face of the hub shell 30. The ring roller 558 is formed on an inner peripheral face of the inner shell 514a at one axial end of the inner shell 514a. The inner shell 514a rotatably supports the hub shell 30 by bearing assemblies 38a and 38b that are disposed between the inner shell 514a and the hub shell 30. The casing portion 514b is disposed outside of the hub shell 30, and fixedly coupled to the inner shell 514a. Furthermore, the casing portion 514b is fixedly coupled to the hub shaft 26 and the frame 14. The casing portion 514b covers the rear chain sprocket 24. The driver 528 is rotatably supported relative to the casing portion 514b by the bearing assembly 38c that is disposed between the casing portion 514b and the driver 528. The ring roller 558 includes a first ring roller portion 578. The first ring roller portion 578 frictionally engages with the first conical planetary rollers 560, respectively. The ring roller 558 is substantially identical to the ring roller 58 of the first embodiment, except that the ring roller 558 merely has a single ring roller portion, and that the ring roller 558 is formed on the frame part 514. The first ring roller portion 578 has no gear teeth.

The sun roller 564 is operatively supported to the hub shaft 26. Specifically, the sun roller 564 is rotatably supported to the hub shaft 26. Furthermore, the sun roller 564 is movable along the center axis R1 of the hub shaft 26. The sun roller 564 frictionally engages with the first conical planetary rollers 560. The sun roller 564 is substantially identical to the sun roller 64 of the first embodiment, except that the sun roller 564 has a single sun roller portion, and that the sun roller 564 is operatively coupled to the hub shell 30. Thus, description of the sun roller 564 is minimal for the sake of brevity. The sun roller 564 has a first sun roller portion 586 that is substantially identical to the first sun roller portion 86 of the first embodiment. Furthermore, the sun roller 564 has an output portion 588 that is operatively coupled to the hub shell 30 via the one-way clutch 104. The output portion 588 is integrally formed on the sun roller 564. The output portion 588 is slidably coupled to the one-way clutch 104 in a conventional manner. The output portion 588 can be substantially identical to the output plate 98 of the first embodiment. The first sun roller portion 586 frictionally engages with the first conical planetary rollers 560, respectively. The first sun roller portion 586 has no gear teeth.

With this configuration of the CVT unit 522, the first and second frictional engagement portions 582 and 584 of the first conical planetary rollers 560 frictionally engage with the first ring roller portion 578 of the ring roller 558 and the first sun roller portion 586 of the sun roller 564, respectively.

Referring further to FIG. 11, the power transmission path of the hub assembly 512 will be discussed in detail. First, the rear chain sprocket 24 receives the rotational power from the front chain sprocket 18 via the chain 20 (see FIG. 1). The rotational power rotates the rear chain sprocket 24 in the forward rotational direction about the center axis R1, which also rotates the driver 528 together with the upstream planetary gear carrier 556 of the upstream planetary gear unit 532 in the forward rotational direction about the center axis R1. The upstream planetary gear unit 532 is arranged to receive the rotational power from the driver 528, and rotate upstream ring gear 554 in the forward rotational direction about the center axis R1. The upstream planetary gear unit 532 is substantially identical to the upstream planetary gear unit 132 of the second embodiment. Thus, description of transmission of the rotational power through the upstream planetary gear unit 532 is omitted for the sake of brevity.

The CVT unit 522 receives the rotational power from first roller carrier 562 as a rotational input, and transmits the rotational power to the sun roller 564 via the first conical planetary rollers 560 and the ring roller 558. Specifically, the CVT unit 522 receives the rotational power from first roller carrier 562 in the forward rotational direction about the center axis R1, and transmits the rotational power to sun roller 564 such that the sun roller 564 rotates in the forward rotational direction about the center axis R1. Specifically, the first roller carrier 562 receives the rotational power from the upstream ring gear 554 as a rotational input. On the other hand, each of the first frictional engagement portions 582 of the first conical planetary rollers 560 frictionally engages with the ring roller 558. Thus, the rotational power from the first roller carrier 562 rotates the first conical planetary rollers 560 about the sun roller 564 in the forward rotational direction white the first conical planetary rollers 560 rotates about the rotational axes R3, respectively, which in turn rotates the sun roller 564 in the forward rotational direction about the center axis R1. The sun roller 564 rotates in the forward rotational direction about the center axis R1 at a rotational speed according to an axial position of the first sun roller portion 586 of the sun roller 564 (i.e., axial position of the second contact C2). The sun roller 564 is operatively coupled to the hub shell 30. Thus, the sun roller 564 further transmits the rotational power to the hub shell 30 via the one-way clutch 104. In this embodiment, the hub assembly 512 does not include a cam loader in the power transmission path, as illustrated in FIG. 11. However, alternatively or additionally, the hub assembly 512 can include the cam loader 94 in the power transmission path such that the sun roller 564 transmits the rotational power to the hub shell 30 via the cam loader 94.

The varying mechanism 96 continuously changes an axial position of the sun roller 564 between the first axial position (shown in FIG. 3) and the second axial position (shown in FIG. 5) via the middle axial position (shown in FIG. 4) along the center axis R1 of the hub shaft 26. The second effective diameter D2 (or engaging radius) of the second frictional engagement portion 584 of the first conical planetary roller 560 at the second contact C2 between the second frictional engagement portion 584 and the first sun roller portion 586 of the sun roller 564 gradually decreases as the sun roller 564 continuously moves from the first axial position toward the second axial position along the first axial direction X1. This movement of the second contact C2 on the second frictional engagement portion 584 changes effective radial distance between the ring roller 558 and the sun roller 564, thereby causing gear ratio of the CVT unit 522 to change. Specifically, this axial movement of the second contact C2 causes a gear ratio of the first conical planetary roller 560 to continuously change, thereby continuously changing a gear ratio of the hub assembly 512.

In this embodiment, the ring roller 558 is formed on the frame part 514, and is disposed around the first conical planetary roller 560. However, the ring roller 558 can be formed as a cone roller that is fixedly coupled to the hub shaft 26. In this case, the ring roller 558 frictionally engages with the first frictional engagement portions 582 at radially inward facing portions of the first frictional engagement portions 582 that face toward the center axis R1 of the hub shaft 26.

Seventh Embodiment

Figure 12:
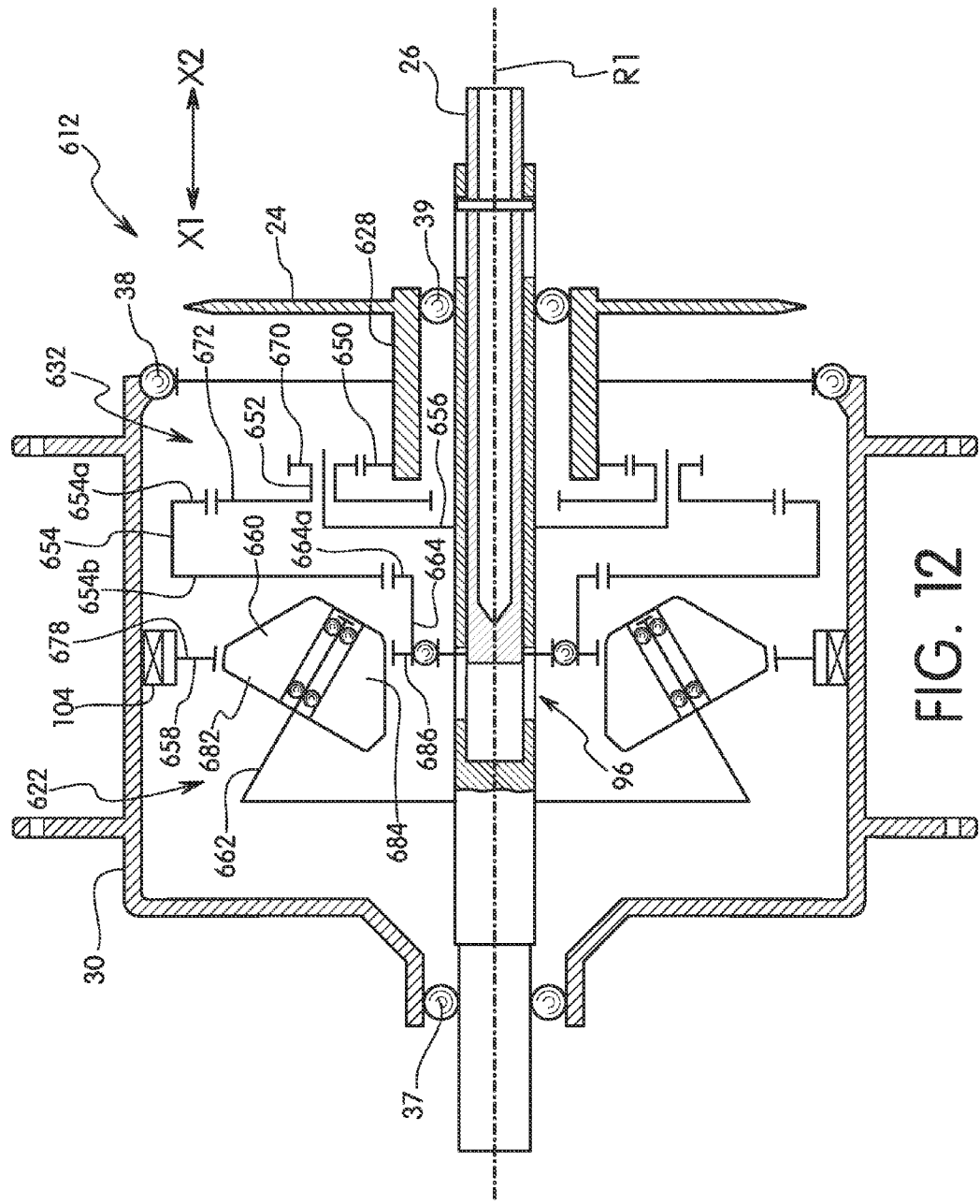
FIG. 12 is a schematic representation of a hub assembly having a continuously variable bicycle transmission unit in accordance with a seventh embodiment, illustrating a power transmission in the hub assembly.

Referring now to FIG. 12, a hub assembly 612 with a modified continuously variable transmission unit 622 (hereinafter "CVT unit 622") in accordance with a seventh embodiment will now be explained. The CVT unit 622 of the seventh embodiment is basically different from the CVT unit 22 of the first embodiment in that the CVT unit 622 only has a single conical planetary roller and a single roller carrier, that a sun roller of the CVT unit 622 is operatively coupled to a driver to receive a rotational power from the driver, and that a ring roller of the CVT is operatively coupled to the hub shell 30 to rotate the hub shell 30.

In view of the similarity between the first and seventh embodiments, the parts of the seventh embodiment that are identical to the parts of the first embodiment be given the same reference numerals as the parts of the first embodiment. Also, parts of this seventh embodiment that are functionally identical and/or substantially identical to parts of the first embodiment will be given the same reference numerals but with "600" added thereto. In any event, the descriptions of the parts of the seventh embodiment that are substantially identical to the parts of the first embodiment may be omitted for the sake of brevity. However, it will be apparent to those skilled in the art from this disclosure that the descriptions and illustrations of the first embodiment also apply to this seventh embodiment, except as discussed and/or illustrated herein.

As illustrated in FIG. 12, the hub assembly 612 basically includes, among other things, the CVT unit 622 and a modified upstream planetary gear unit 632. The upstream planetary gear unit 632 is substantially identical to the upstream planetary gear unit 32 of the first embodiment. Thus, description of the upstream planetary gear unit 632 is minimal for the sake of brevity. The upstream planetary gear unit 632 basically includes an upstream sun gear 650, a plurality of upstream planetary gears 652, an upstream ring gear 654 and an upstream planetary gear carrier 656. The upstream sun gear 650 is fixedly coupled to a driver 628 that couples to the rear chain sprocket 24. In this embodiment, the upstream planetary gear unit 632 includes four of the upstream planetary gears 652 (only two is shown in FIG. 12). However, the number of the upstream planetary gears 652 can be changed as needed or desired. Each of the upstream planetary gears 652 has smaller and larger diameter gear sections 670 and 672.

The upstream ring gear 654 is basically a cylindrical member. The upstream ring gear 654 includes first and second upstream ring gear portions 654a and 654b. The first and second upstream ring gear portions 654a and 654b have radially inwardly extending gear teeth, respectively. The first upstream ring gear portion 654a meshes with the larger diameter gear sections 672 of the upstream planetary gears 652. The second upstream ring gear portion 654b is operatively coupled to the CVT unit 622 to transmit the rotational power to the CVT unit 622. In this embodiment, the second upstream ring gear portion 654b includes an internal gear. However, alternatively, the second upstream ring gear portion 654b can include a serration or a spline that meshes with the CVT unit 622 instead of an internal gear.

The CVT unit 622 basically includes a ring roller 658, a plurality of first conical planetary rollers 660, a first roller carrier 662 first carrier), and a sun roller 664. Specifically, in this embodiment, the CVT unit 622 includes four of the first conical planetary rollers 660 (only two is shown in FIG. 12). However the number of the first conical planetary rollers 660 can be changed as needed or desired.

The sun roller 664 is operatively supported to the hub shaft 26. Specifically, the sun roller 664 is rotatably supported to the hub shaft 26. Furthermore, the sun roller 664 is movable along the center axis R1 of the hub shaft 26. The sun roller 664 frictionally engages with the first conical planetary rollers 660. The sun roller 664 is substantially identical to the sun roller 64 of the first embodiment, except that the sun roller 664 has a single sun roller portion, and that the sun roller 664 is operatively coupled to the driver 628 via the upstream planetary gear unit 632. Thus, description of the sun roller 664 is minimal for the sake of brevity. The sun roller 664 has a first sun roller portion 686 that is substantially identical to the first sun roller portion 86 of the first embodiment. Furthermore, the sun roller 664 has outwardly extending gear teeth 664a on an outer peripheral face of the sun roller 664. The gear teeth 664a of the sun roller 664 axially slidably mesh with the gear teeth of the second upstream ring gear portion 654b such that the sun roller 664 receives the rotational power from the upstream ring gear 654. The first sun roller portion 686 frictionally engages with the first conical planetary rollers 660, respectively. The first sun roller portion 686 has no gear teeth.

The first conical planetary rollers 660 are rotatably supported to the first roller carrier 662. The first conical planetary rollers 660 are substantially identical to the second conical planetary rollers 166 of the second embodiment, and arranged in the same manner as the second conical planetary rollers 166 of the second embodiment. Thus, the description of the first conical planetary rollers 660 is minimal for the sake of brevity. The first conical planetary rollers 660 frictionally engage with the ring roller 658 and the sun roller 664. The first conical planetary rollers 660 are substantially identical to each other. Each of the first conical planetary rollers 660 has first and second frictional engagement portions 682 and 684 that are substantially identical to the first and second frictional engagement portions 182 and 184 of the second embodiment, respectively. The first and second frictional engagement portions 682 and 684 frictionally engage with the ring roller 658 and the sun roller 664, respectively. The first and second frictional engagement portions 682 and 684 have no gear teeth.

The first roller carrier 662 is substantially identical to the first roller carrier 62 of the first embodiment, except for an axial orientation. Thus, description of the first roller carrier 662 is minimal for the sake of brevity. The first roller carrier 662 is operatively supported to the hub shaft 26. In particular, the first roller carrier 662 is non-movably mounted on the hub shaft 26. The first conical planetary rollers 660 are circumferentially arranged on the first roller carrier 662 about the hub shaft 26 with equal spacing. The first conical planetary rollers 660 are rotatably supported to the first roller carrier 662 in a conventional manner about rotational axes R3 (e.g., first rotational axes) of the first conical planetary rollers 660, respectively. Each of the rotational axes R3 of the first conical planetary rollers 660 is slanted relative to the center axis R1 of the hub shaft 26. Specifically, each of the rotational axes R3 is configured such that a distance between the center axis R1 and each of the rotational axes R3 increases along the first axial direction X1 of the center axis R1.

The ring roller 658 is operatively supported to the hub shaft 26, and operatively coupled to the hub shell 30 via the one-way clutch 104. Specifically, the ring roller 658 is rotatably supported to the hub shaft 26. The ring roller 658 includes a first ring roller portion 678. The first ring roller portion 678 frictionally engages with the first conical planetary rollers 660, respectively. The ring roller 658 is substantially identical to the ring roller 58 of the first embodiment, except that the ring roller 658 merely has a single ring roller portion, and that the ring roller 658 is coupled to an inner peripheral portion of the one-way clutch 104.

With this configuration of the CVT unit 622, the first and second frictional engagement portions 682 and 684 of the first conical planetary rollers 660 frictionally engage with the first ring roller portion 678 of the ring roller 658 and the first sun roller portion 686 of the sun roller 664, respectively.

Referring further to FIG. 12, the power transmission path of the hub assembly 612 will be discussed in detail. First, the rear chain sprocket 24 receives the rotational power from the front chain sprocket 18 via the chain 20 (see FIG. 1). The rotational power rotates the rear chain sprocket 24 in the forward rotational direction about the center axis R1, which also rotates the driver 628 together with the upstream sun gear 650 of the upstream planetary gear unit 632 in the forward rotational direction about the center axis R1. The upstream planetary gear unit 632 is arranged to receive the rotational power from the driver 628, and rotate the upstream ring gear 654 in the reverse rotational direction about the center axis R1. The upstream planetary gear unit 632 is substantially identical to the upstream planetary gear unit 32 of the first embodiment. Thus, description of transmission of the rotational power through the upstream planetary gear unit 632 is omitted for the sake of brevity.

The CVT unit 622 receives the rotational power from the sun roller 664 as a rotational input, and transmits the rotational power to the ring roller 458 via the first conical planetary rollers 660. Specifically, the CVT unit 622 receives the rotational power from the sun roller 664 in the reverse rotational direction about the center axis R1, and transmits the rotational power to the ring roller 658 such that the ring roller 658 rotates in the forward rotational direction about the center axis R1. In other words, the CVT unit 622 reverses an input rotational direction (i.e., reverse rotational direction) of the sun roller 664. Specifically, the sun roller 664 receives the rotational power from the upstream ring gear 654 as a rotational input. On the other hand, each of the second frictional engagement portions 684 of the first conical planetary rollers 660 frictionally engages with the sun roller 664. Thus, the rotational power from the sun roller 664 rotates the first conical planetary rollers 660 about the rotational axes R3, respectively, which rotates the ring roller 658 in the forward rotational direction about the center axis R1. The ring roller 658 rotates in the forward rotational direction about the center axis R1 at a rotational speed according to an axial position of the first sun roller portion 686 of the sun roller 664 (i.e., axial position of the second contact C2). The ring roller 658 is operatively coupled to the hub shell 30. Thus, the ring roller 658 further transmits the rotational power to the hub shell 30 via the one-way clutch 104. In this embodiment, the hub assembly 612 does not include a cam loader in the power transmission path, as illustrated in FIG. 12. However, alternatively or additionally, the hub assembly 612 can include the cam loader 94 in the power transmission path such that the ring roller 658 transmits the rotational power to the hub shell 30 via the cam loader 94.

The varying mechanism 96 continuously changes an axial position of the sun roller 664 between the first axial position (shown in FIG. 3) and the second axial position (shown in FIG. 5) via the middle axial position (shown in FIG. 4) along the center axis R1 of the hub shaft 26. The second effective diameter D2 (or engaging radius) of the second frictional engagement portion 684 of the first conical planetary roller 660 at the second contact C2 between the second frictional engagement portion 684 and the first sun roller portion 686 of the sun roller 664 gradually increase as the sun roller 664 continuously moves from the first axial position toward the second axial position along the first axial direction X1. This movement of the second contact C2 on the second frictional engagement portion 684 changes effective radial distance between the ring roller 658 and the sun roller 664, thereby causing gear ratio of the CVT unit 622 to change. Specifically, this axial movement of the second contact C2 causes a gear ratio of the first conical planetary roller 660 to continuously change, thereby continuously changing a gear ratio of the hub assembly 612.

Eighth Embodiment

Referring now to FIG. 3, a hill) assembly 712 with a modified continuously variable transmission unit 722 (hereinafter "CVT unit 722") in accordance with a seventh embodiment wilt now be explained. The CVT unit 722 of the eighth embodiment is basically different from the CVT unit 22 of the first embodiment in that the CVT unit 722 only has a single conical planetary roller and a single roller carrier, that a sun roller of the CVT unit 722 is operatively coupled to a driver to receive a rotational power from the driver, and that a first roller carrier of the CVT is operatively coupled to the hub shell 30 to rotate the hub shell 30.

In view of the similarity between the first and eighth embodiments, the parts of the eighth embodiment that are identical to the parts of the first embodiment will be given the same reference numerals as the parts of the first embodiment. Also, parts of this eighth embodiment that are functionally identical and/or substantially identical to parts of the first embodiment wilt be given the same reference numerals but with "700" added thereto. In any event, the descriptions of the parts of the eighth embodiment that are substantially identical to the parts of the first embodiment may be omitted for the sake of brevity. However, it will be apparent to those skilled in the art from this disclosure that the descriptions and illustrations of the first embodiment also apply to this eighth embodiment, except as discussed and/or illustrated herein.

Figure 13:
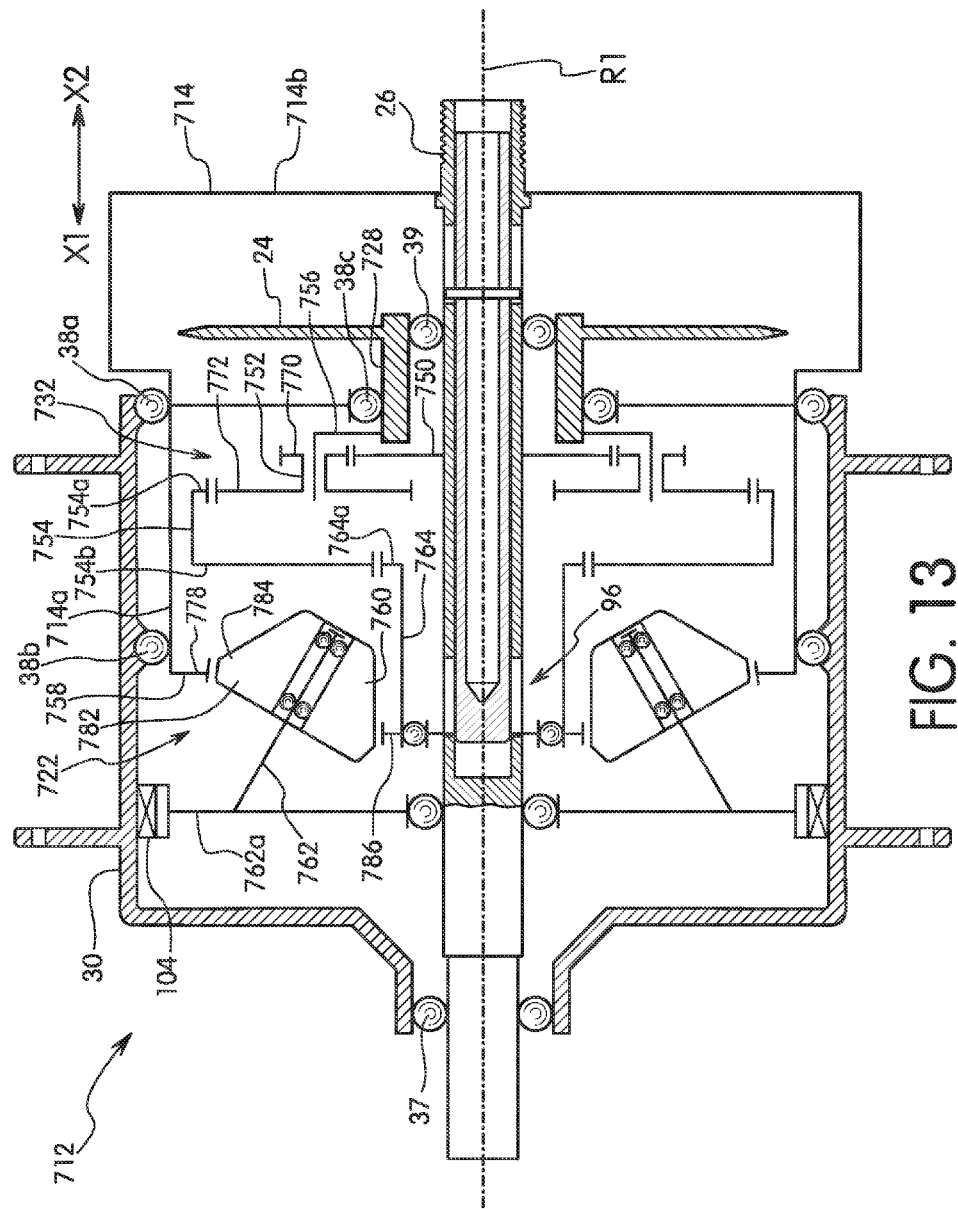
FIG. 13 is a schematic representation of a hub assembly having a continuously variable bicycle transmission unit in accordance with an eighth embodiment, illustrating a power transmission in the hub assembly.

As illustrated in FIG. 13, the hub assembly 712 basically includes, among other things, the CVT unit 722 and a modified upstream planetary gear unit 732. The upstream planetary gear unit 732 is substantially identical to the upstream planetary gear unit 432 of the fifth embodiment. Thus, description of the upstream planetary gear unit 732 is minimal for the sake of brevity. The upstream planetary gear unit 732 basically includes an upstream sun gear 750, a plurality of upstream planetary gears 752, an upstream ring gear 754 and an upstream planetary gear carrier 756. The upstream planetary gear carrier 756 is fixedly coupled to a driver 728 that couples to the rear chain sprocket 24. In this embodiment, the upstream planetary gear unit 732 includes four of the upstream planetary gears 752 (only two is shown in FIG. 13). However, the number of the upstream planetary gears 752 can be changed as needed or desired. Each of the upstream planetary gears 752 has smaller and larger diameter gear sections 770 and 772.

The upstream ring gear 754 is basically a cylindrical member. The upstream ring gear 754 includes first and second upstream ring gear portions 754a and 754b. The first and second upstream ring gear portions 754a and 754b have radially inwardly extending gear teeth, respectively. The first upstream ring gear portion 754a meshes with the larger diameter gear sections 772 of the upstream planetary gears 752. The second upstream ring gear portion 754b is operatively coupled to the CVT unit 722 to transmit the rotational power to the CVT unit 722. In this embodiment, the second upstream ring gear portion 754b includes an internal gear. However, alternatively, the second upstream ring gear portion 754b can include a serration or a spline that meshes with the CVT unit 722 instead of an internal gear.

The CVT unit 722 basically includes a ring roller 758, a plurality of first conical planetary rollers 760, a first roller carrier 762 (e.g., first carrier), and a sun roller 764. Specifically, in this embodiment, the CVT unit 722 includes four of the first conical planetary rollers 760 (only two is shown in FIG. 13). However the number of the first conical planetary rollers 760 can be changed as needed or desired.

The sun roller 764 is operatively supported to the hub shaft 26. Specifically, the sun roller 764 is rotatably supported to the hub shaft 26. Furthermore, the sun roller 764 is movable along the center axis R1 of the hub shaft 26. The sun roller 764 frictionally engages with the first conical planetary rollers 760. The sun roller 764 is substantially identical to the sun roller 64 of the first embodiment, except that the sun roller 764 has a single sun roller portion, and that the sun roller 764 is operatively coupled to the driver 728 via the upstream planetary gear unit 732. Thus, description of the sun roller 764 is minimal for the sake of brevity. The sun roller 764 has a first sun roller portion 786 that is substantially identical to the first sun roller portion 86 of the first embodiment. Furthermore, the sun roller 764 has outwardly extending gear teeth 764a on an outer peripheral face of the sun roller 764. The gear teeth 764a of the sun roller 764 axially slidably mesh with the gear teeth of the second upstream ring gear portion 754b such that the sun roller 764 receives the rotational power from the upstream ring gear 754. The first sun roller portion 786 frictionally engages with the first conical planetary rollers 760, respectively. The first sun roller portion 786 has no gear teeth.

The ring roller 758 is fixedly and non-rotatably supported to the hub shaft 26. Specifically, the ring roller 758 is formed on a frame part 714. The frame part 714 has a cylindrical inner shell 714a and a casing portion 714b. The frame part 714 is substantially identical to the frame part 514 of the sixth embodiment. The inner shell 714a axially extends along an inner peripheral face of the hub shell 30. The ring roller 758 is formed on an inner peripheral face of the inner shell 714a at one axial end of the inner shell 714a. The inner shell 714a rotatably supports the hub shell 30 by bearing assemblies 38a and 38b that are disposed between the inner shell 714a and the hub shell 30. The casing portion 714b is disposed outside of the hub shell 30, and fixedly coupled to the inner shell 714a. Furthermore, the casing portion 714b is fixedly coupled to the hub shaft 26 and the frame 14. The casing portion 714b covers the rear chain sprocket 24. The driver 728 is rotatably supported relative to the casing portion 714b by the bearing assembly 38c that is disposed between the casing portion 714b and the driver 728. The ring roller 758 includes a first ring roller portion 778. The first ring roller portion 778 frictionally engages with the first conical planetary rollers 760, respectively. The ring roller 758 is substantially identical to the ring roller 58 of the first embodiment, except that the ring roller 758 merely has a single ring roller portion, and that the ring roller 758 is formed on the frame part 714. The first ring roller portion 778 has no gear teeth.

The first conical planetary rollers 760 are rotatably supported to the first roller carrier 762. The first conical planetary rollers 760 are substantially identical to the second conical planetary rollers 166 of the second embodiment, and arranged in the same manner as the second conical planetary rollers 166 of the second embodiment. Thus, the description of the first conical planetary rollers 760 is minimal for the sake of brevity. The first conical planetary rollers 760 frictionally engage with the ring roller 758 and the sun roller 764. The first roller carrier 762 is substantially identical to the first roller carrier 562 of the sixth embodiment, except for an axial orientation. Thus, description of the first roller carrier 762 is minimal for the sake of brevity. The first roller carrier 762 is operatively supported to the hub shaft 26. In particular, the first roller carrier 762 is rotatably mounted around the hub shaft 26. The first roller carrier 762 is further operatively coupled to the hub shell 30 via the one-way clutch 104. In particular, the first roller carrier 762 has an output portion 762a. The output portion 762a of the first roller carrier 762 is coupled to the one-way clutch 104 to transmit the rotational power to the hub shell 30. The first conical planetary rollers 760 are circumferentially arranged on the first roller carrier 762 about the hub shaft 26 with equal spacing. The first conical planetary rollers 760 are rotatably supported to the first roller carrier 762 in a conventional manner about rotational axes R3 (e.g., first rotational axes) of the first conical planetary rollers 760, respectively. Each of the rotational axes R3 of the first conical planetary rollers 760 is slanted relative to the center axis R1 of the hub shaft 26. Specifically, each of the rotational axes R3 is configured such that a distance between the center axis R1 and each of the rotational axes R3 increases along the first axial direction X1 of the center axis R1. The first conical planetary rollers 760 are substantially identical to each other. Each of the first conical planetary rollers 760 has first and second frictional engagement portions 782 and 784 that are substantially identical to the first and second frictional engagement portions 182 and 184 of the second embodiment, respectively. The first and second frictional engagement portions 782 and 784 frictionally engage with the ring roller 758 and the sun roller 764, respectively. The first and second frictional engagement portions 782 and 784 have no gear teeth.

With this configuration of the CVT unit 722, the first and second frictional engagement portions 782 and 784 of the first conical planetary rollers 760 frictionally engage with the first ring roller portion 778 of the ring roller 758 and the first sun roller portion 786 of the sun roller 764, respectively.

Referring further to FIG. 13, the power transmission path of the hub assembly 712 will be discussed in detail. First, the rear chain sprocket 24 receives the rotational power from the front chain sprocket 18 via the chain 20 (see FIG. 1). The rotational power rotates the rear chain sprocket 24 in the forward rotational direction about the center axis which also rotates the driver 728 together with the upstream sun gear 750 of the upstream planetary gear unit 732 in the forward rotational direction about the center axis R1. The upstream planetary gear unit 732 is arranged to receive the rotational power from the driver 728, and rotate the upstream ring gear 754 in the forward rotational direction about the center axis R1. The upstream planetary gear unit 732 is substantially identical to the upstream planetary gear unit 132 of the second embodiment. Thus, description of transmission of the rotational power through the upstream planetary gear unit 732 is omitted for the sake of brevity.

The CVT unit 722 receives the rotational power from the sun roller 764 as a rotational input, and transmits the rotational power to the first roller carrier 762 via the first conical planetary rollers 760. Specifically, the CVT unit 722 receives the rotational power from the sun roller 764 in the forward rotational direction about the center axis R1, and transmits the rotational power to the first roller carrier 762 such that the first roller carrier 762 rotates in the forward rotational direction about the center axis R1. Specifically, the sun roller 764 receives the rotational power from the upstream ring gear 754 as a rotational input. On the other hand, each of the first frictional engagement portions 782 of the first conical planetary rollers 760 frictionally engages with the ring roller 758. Thus, the rotational power from the sun roller 764 rotates the first conical planetary rollers 760 about the sun roller 764 in the forward rotational direction while the first conical planetary rollers 760 rotates about the rotational axes R3, respectively, which in turn rotates the first roller carrier 762 in the forward rotational direction about the center axis R1. The first roller carrier 762 rotates in the forward rotational direction about the center axis R1 at a rotational speed according to an axial position of the first sun roller portion 786 of the sun roller 764 (i.e., axial position of the second contact C2). The first roller carrier 762 is operatively coupled to the hub shell 30. Thus, the first roller carrier 762 further transmits the rotational power to the hub shell 30 via the one-way clutch 104. In this embodiment, the hub assembly 712 does not include a cam loader in the power transmission path, as illustrated in FIG. 13. However, alternatively or additionally, the hub assembly 712 can include the cam loader 94 in the power transmission path such that the first roller carrier 762 transmits the rotational power to the hub shell 30 via the cam loader 94.

The varying mechanism 96 continuously changes an axial position of the sun roller 764 between the first axial position (shown in FIG. 3) and the second axial position (shown in FIG. 5) via the middle axial position (shown in FIG. 4) along the center axis R1 of the hub shaft 26. The second effective diameter D2 (or engaging radius) of the second frictional engagement portion 784 of the first conical planetary roller 760 at the second contact C2 between the second frictional engagement portion 784 and the first sun roller portion 786 of the sun roller 764 gradually increase as the sun roller 764 continuously moves from the first axial position toward the second axial position along the first axial direction X1. This movement of the second contact C2 on the second frictional engagement portion 784 changes effective radial distance between the ring roller 758 and the sun roller 764, thereby causing gear ratio of the CVT unit 722 to change. Specifically, this axial movement of the second contact C2 causes a gear ratio of the first conical planetary roller 760 to continuously change, thereby continuously changing a gear ratio of the hub assembly 712.

In this embodiment, the ring roller 758 is formed on the frame part 714, and is disposed around the first conical planetary roller 760. However, the ring roller 758 can be formed as a cone roller that is fixedly coupled to the hub shaft 26. In this case, the ring roller 758 frictionally engages with the first frictional engagement portions 782 at radially inward facing portions of the first frictional engagement portions 782 that face toward the center axis R1 of the hub shaft 26.

Ninth Embodiment

Figure 14:
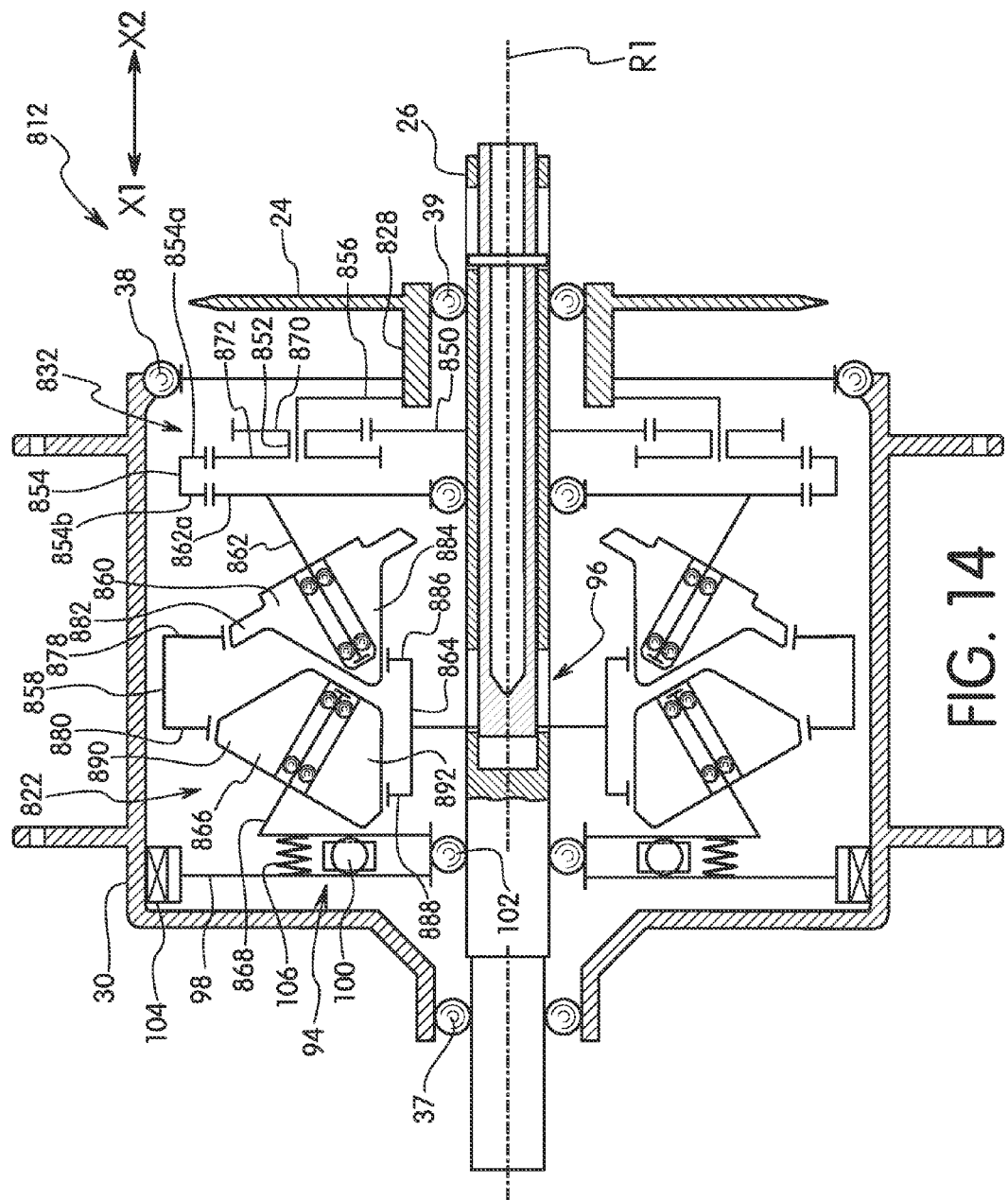
FIG. 14 is a schematic representation of a hub assembly having a continuously variable bicycle transmission unit in accordance with a ninth embodiment, illustrating a power transmission in the hub assembly.

Referring now to FIG. 14, a hub assembly 812 with a modified continuously variable transmission unit 822 (hereinafter "CVT unit 822") in accordance with a ninth embodiment will now be explained. The CVT unit 822 is basically different from the CVT unit 122 of the second embodiment in that a sun roller of the CVT unit 822 is non-rotatably coupled to the hub shaft 26, and that a first roller carrier of the CVT unit 822 is operatively coupled to a driver to receive a rotational power from the driver.

In view of the similarity between the first and ninth embodiments, the parts of the ninth embodiment that are identical to the parts of the first embodiment will be given the same reference numerals as the parts of the first embodiment. Also, parts of this ninth embodiment that are functionally identical and/or substantially identical to parts of the first embodiment will be given the same reference numerals but with "800" added thereto. In any event, the descriptions of the parts of the ninth embodiment that are substantially identical to the parts of the first embodiment may be omitted for the sake of brevity. However, it wilt be apparent to those skilled in the art from this disclosure that the descriptions and illustrations of the first embodiment also apply to this ninth embodiment, except as discussed and/or illustrated herein.

As illustrated in FIG. 14, the hub assembly 812 basically includes, among other things, the CVT unit 822 and a modified upstream planetary gear unit 832. The upstream planetary gear unit 832 is substantially identical to the upstream planetary gear unit 432 of the filth embodiment. Thus, description of the upstream planetary gear unit 832 is minimal for the sake of brevity. The upstream planetary gear unit 832 basically includes an upstream sun gear 850, a plurality of upstream planetary gears 852, the upstream ring gear 854 and an upstream planetary gear carrier 856. The upstream planetary gear carrier 856 is fixedly coupled to a driver 828 that couples to the rear chain sprocket 24. In this embodiment, the upstream planetary gear unit 832 includes four of the upstream planetary gears 852 (only two is shown in FIG. 14). However, the number of the upstream planetary gears 852 can be changed as needed or desired. Each of the upstream planetary gears 852 has smaller and larger diameter gear sections 870 and 872.

The upstream ring gear 854 is basically a cylindrical member. The upstream ring gear 854 includes first and second upstream ring gear portions 854a and 854b. The first and second upstream ring gear portions 854a and 854b have radially inwardly extending gear teeth, respectively. The first upstream ring gear portion 854a meshes with the larger diameter gear sections 872 of the upstream planetary gears 852. The second upstream ring gear portion 854b is operatively coupled to the CVT unit 822 to transmit the rotational power to the CVT unit 822. In this embodiment, the second upstream ring gear portion 854b includes an internal gear. However, alternatively, the second upstream ring gear portion 854b can include a serration or a spline that meshes with the CVT unit 822 instead of an internal gear.

The CVT unit 822 basically includes a ring roller 858, a plurality of first conical planetary rollers 860, a first roller carrier 862 first carrier), and a sun roller 864. The CVT unit 822 further includes a plurality of second conical planetary rollers 866 and a second roller carrier 868 (e.g., second carrier). Specifically, in this embodiment, the CVT unit 822 includes four of the first conical planetary rollers 860 (only two is shown in FIG. 14), and four of the second conical planetary rollers 866 (only two is shown in FIG. 14). However the numbers of the first conical planetary rollers 860 and the second conical planetary rollers 866 can be changed as needed or desired.

The first roller carrier 862 is operatively supported to the hub shaft 26. In particular, the first roller carrier 862 is rotatably mounted around the hub shaft 26. The first roller carrier 862 is further operatively coupled to the upstream ring gear 854. In particular, the first roller carrier 862 has outwardly extending gear teeth 862a on an outer peripheral face of the first roller carrier 862. The gear teeth 862a of the first roller carrier 862 mesh with the gear teeth of the second upstream ring gear portion 854b such that the first roller carrier 862 receives the rotational power from the upstream ring gear 854. The first conical planetary rollers 860 are circumferentially arranged on the first roller carrier 862 about the hub shaft 26 with equal spacing. The first conical planetary rollers 860 are rotatably supported to the first roller carrier 862 in a conventional manner about rotational axes R3 (e.g., first rotational axes) of the first conical planetary rollers 860, respectively. Each of the rotational axes R3 of the first conical planetary rollers 860 is slanted relative to the center axis R1 of the hub shaft 26. Specifically, each of the rotational axes R3 is configured such that a distance between the center axis R1 and each of the rotational axes R3 decreases along the first axial direction X1 of the center axis R1. The first conical planetary rollers 860 are substantially identical to each other. The first conical planetary rollers 860 are substantially identical to the first conical planetary rollers 160 of the second embodiment, and arranged in the same manner as the first conical planetary rollers 160 of the second embodiment. Thus, the description of the first conical planetary rollers 860 is minimal for the sake of brevity. Each of the first conical planetary rollers 860 has first and second frictional engagement portions 882 and 884 that are substantially identical to the first and second frictional engagement portions 182 and 184 of the second embodiment, respectively. The first and second frictional engagement portions 882 and 884 frictionally engage with the ring roller 858 and the sun roller 864, respectively. The first and second frictional engagement portions 882 and 884 have no gear teeth.

The ring roller 858 is operatively supported to the hub shaft 26. Specifically, the ring roller 858 is rotatably supported to the hub shaft 26. The ring roller 858 includes first and second ring roller portions 878 and 880 at axially spaced apart locations of the ring roller 858 along the center axis R1 of the hub shaft 26. The first and second ring roller portions 878 and 880 frictionally engage with the first and second conical planetary rollers 860 and 866, respectively. The ring roller 858 is substantially identical to the ring roller 158 of the second embodiment, except that the ring roller 858 is independently formed from the upstream ring gear 854 as a separate member. An inner diameter of the first ring roller portion 878 is smaller than an inner diameter of the second ring roller portion 880. The first and second ring roller portions 878 and 880 have no gear teeth.

The sun roller 864 is operatively supported to the hub shaft 26. Specifically, the sun roller 864 is non-rotatably supported to the hub shaft 26. Furthermore, the sun roller 864 is movable along the center axis R1 of the hub shaft 26. The sun roller 864 frictionally engages with the first and second conical planetary rollers 860 and 866. The sun roller 864 is substantially identical to the sun roller 164 of the second embodiment, except that the sun roller 864 is non-rotatably coupled to the hub shaft 26. Thus, description of the sun roller 864 is minimal for the sake of brevity. The sun roller 864 has first and second sun roller portions 886 and 888 that are substantially identical to the first and second sun roller portion 186 and 188 of the second embodiment. The first and second sun roller portions 886 and 888 frictionally engage with the first and second conical planetary rollers 860 and 866, respectively. The first and second sun roller portions 886 and 888 have no gear teeth.

The second conical planetary rollers 866 are rotatably supported to the second roller carrier 868. The second conical planetary rollers 866 frictionally engage with the ring roller 858 and the sun roller 864. The second roller carrier 868 is substantially identical to the second roller carrier 168 of the second embodiment. Thus, description of the second roller carrier 868 is minimal for the sake of brevity. The second roller carrier 868 is operatively supported to the hub shaft 26. In particular, the second roller carrier 868 is rotatably mounted around the hub shaft 26. The second roller carrier 868 is further operatively coupled to the hub shell 30. The second conical planetary rollers 866 are circumferentially arranged on the second roller carrier 868 about the hub shaft 26 with equal spacing. The second conical planetary rollers 866 are rotatably supported to the second roller carrier 868 in a conventional manner about rotational axes R4 (e.g., second rotational axes) of the second conical planetary rollers 866, respectively. Each of the rotational axes R4 of the second conical planetary rollers 866 is slanted relative to the center axis R1 of the hub shaft 26. Specifically, each of the rotational axes R4 is configured such that a distance between the center axis R1 and each of the rotational axes R4 decreases along the second axial direction X2 of the center axis R1. The second conical planetary rollers 866 are substantially identical to each other. Furthermore, the second conical planetary rollers 866 are substantially identical to the second conical planetary rollers 166 of the second embodiment, and are arranged in the same manner as the second conical planetary rollers 166 of the second embodiment. Thus, description of the second conical planetary rollers 866 is minimal for the sake of brevity. The second conical planetary roller 866 has third and fourth frictional engagement portions 890 and 892 that are substantially identical to the third and fourth frictional engagement portions 190 and 192 of the second embodiment, respectively. The third and fourth frictional engagement portions 890 and 892 frictionally engage with the ring roller 858 and the sun roller 864, respectively. The third and fourth frictional engagement portions 890 and 892 have no gear teeth.

With this configuration of the CVT unit 822, the first and second frictional engagement portions 882 and 884 of the first conical planetary rollers 860 frictionally engage with the first ring roller portion 878 of the ring roller 858 and the first sun roller portion 886 of the sun roller 864, respectively. The third and fourth frictional engagement portions 890 and 892 of the second conical planetary rollers 866 frictionally engage with the second ring roller portion 880 of the ring roller 858 and the second sun roller portion 888 of the sun roller 864, respectively.

Referring further to FIG. 14, the power transmission path of the hub assembly 812 will be discussed in detail. First, the rear chain sprocket 24 receives the rotational power from the front chain sprocket 18 via the chain 20 (see FIG. 1). The rotational power rotates the rear chain sprocket 24 in the forward rotational direction about the center axis R1, which also rotates the driver 828 together with the upstream planetary gear carrier 856 of the upstream planetary gear unit 832 in the forward rotational direction about the center axis R1. The upstream planetary gear unit 832 is arranged to receive the rotational power from the driver 828, and rotate the upstream ring gear 854 in the forward rotational direction about the center axis R1. The upstream planetary gear unit 832 is substantially identical to the upstream planetary gear unit 132 of the second embodiment. Thus, description of transmission of the rotational power through the upstream planetary gear unit 832 is omitted for the sake of brevity.

The CVT unit 822 receives the rotational power from the first roller carrier 862 as a rotational input, and transmits the rotational power to the second roller carrier 868 via the first conical planetary rollers 860, the ring roller 858 and the second conical planetary rollers 866. Specifically, the CVT unit 822 receives the rotational power from the first roller carrier 862 in the forward rotational direction about the center axis R1, and transmits the rotational power to the second roller carrier 868 such that the second roller carrier 868 rotates in the forward rotational direction about the center axis R1. Specifically, the first roller carrier 862 receives the rotational power from the upstream ring gear 854 as a rotational input. On the other hand, each of the second frictional engagement portions 884 of the first conical planetary rollers 860 frictionally engages with the sun roller 864. Thus, the rotational power from the first roller carrier 862 rotates the first conical planetary rollers 860 about the sun roller 864 in the forward rotational direction while the first conical planetary rollers 860 rotates about the rotational axes R3, respectively, which in turn rotates the ring roller 858 in the forward rotational direction about the center axis R1 at a rotational speed according to an axial position of the first sun roller portion 886 of the sun roller 864 (i.e., axial position of the second contact C2). Furthermore, each of the third frictional engagement portions 890 of the second conical planetary roller 866 receives the rotational power from the second ring roller portion 880 of the ring roller 858. On the other hand, each of the fourth frictional engagement portions 892 of the second conical planetary roller 866 frictionally engages with the sun roller 864. Thus, the rotational power from the second ring roller portion 880 of the ring roller 858 rotates the second conical planetary rollers 866 about the second sun roller portion 888 in the forward rotational direction, which in turn rotates the second roller carrier 868 in the forward rotational direction about the center axis R1. The second roller carrier 868 rotates in the forward rotational direction about the center axis R1 at a rotational speed according to an axial position of the second sun roller portion 888 of the sun roller 864 (i.e., axial position of the fourth contact C4). The second roller carrier 868 is operatively coupled to the hub shell 30. Thus, the second roller carrier 868 further transmits the rotational power to the hub shell 30 via the cam loader 94 with the output plate 98, and the one-way clutch 104.

The varying mechanism 96 continuously changes an axial position of the sun roller 864 between the first axial position (shown in FIG. 3) and the second axial position (shown in FIG. 5) via the middle axial position (shown in FIG. 4) along the center axis R1 of the hub shaft 26. The second effective diameter D2 (or engaging radius) of the second frictional engagement portion 884 of the first conical planetary roller 860 at the second contact C2 between the second frictional engagement portion 884 and the first sun roller portion 886 of the sun roller 864 gradually decreases as the sun roller 864 continuously moves from the first axial position toward the second axial position along the first axial direction X1. The fourth effective diameter D4 (or engaging radius) of the fourth frictional engagement portion 892 of the second conical planetary roller 866 at the fourth contact C4 between the fourth frictional engagement portion 892 and the second sun roller portion 888 of the sun roller 864 gradually increases as the sun roller 864 continuously moves from the first axial position toward the second axial position along the first axial direction X1. These axial movements of the second and fourth contacts C2 and C4 on the second and fourth frictional engagement portion 884 and 892 changes effective radial distance between the ring roller 858 and the sun roller 864, thereby causing gear ratio of the CVT unit 822 to change. Specifically, these axial movements of the second and fourth contacts C2 and C4 cause gear ratios of the first and second conical planetary rollers 860 and 866 to continuously change, respectively, thereby continuously changing a gear ratio of the hub assembly 812.

Tenth Embodiment

Figure 15:
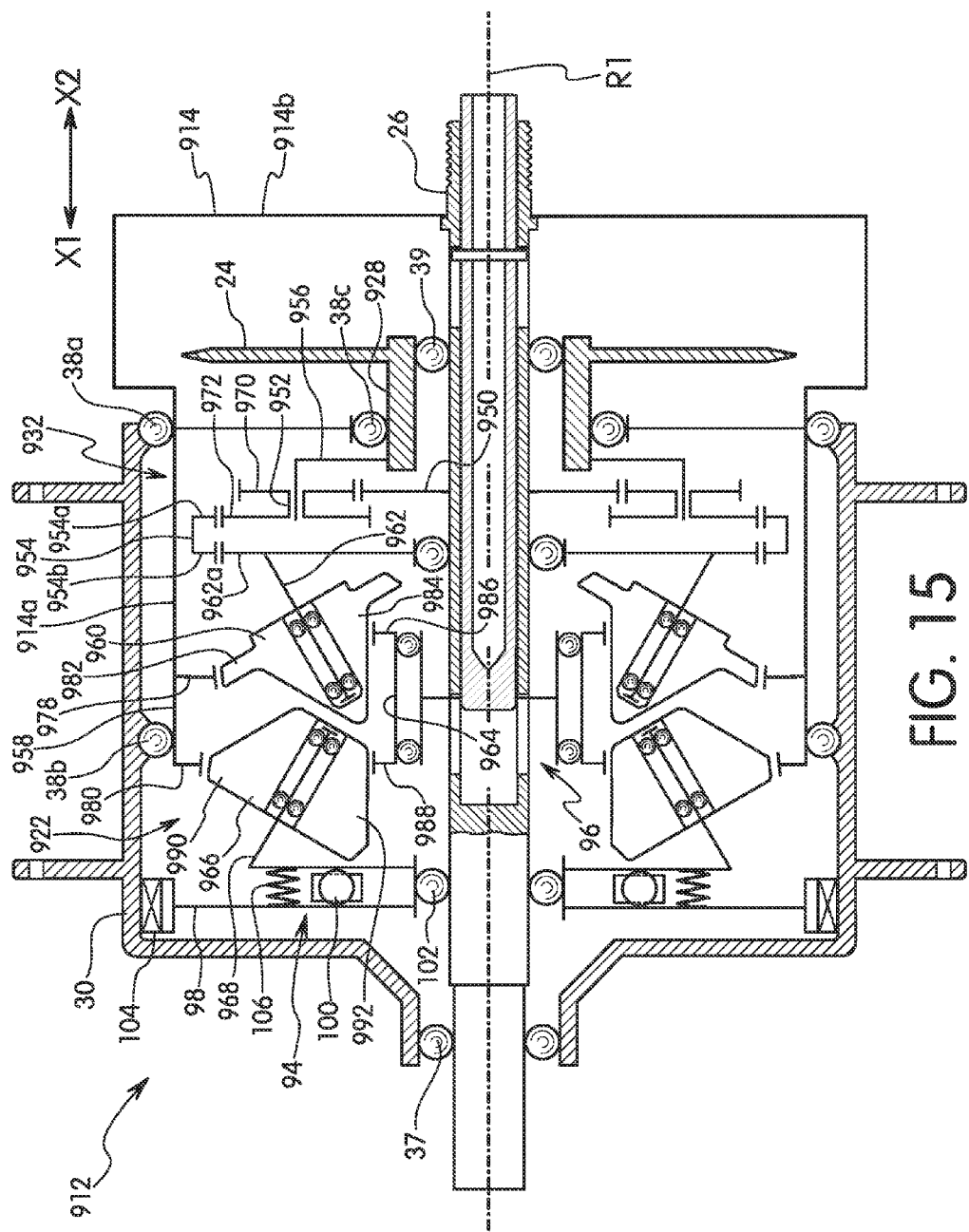
FIG. 15 is a schematic representation of a hub assembly having a continuously variable bicycle transmission unit in accordance with a tenth embodiment, illustrating a power transmission in the hub assembly.

Referring now to FIG. 15, a hub assembly 912 with a modified continuously variable transmission unit 922 (hereinafter "CVT unit 922") in accordance with a tenth embodiment will now be explained. The CVT unit 922 is basically different from the CVT unit 122 of the second embodiment in that a ring roller of the CVT unit 922 is non-rotatably coupled to the hub shaft 26, and that a first roller carrier of the CVT unit 922 is operatively coupled to a driver to receive a rotational power from the driver. Thus, description of the CVT unit 922 is minimal for the sake of brevity.

In view of the similarity between the first and tenth embodiments, the parts of the tenth embodiment that are identical to the parts of the first embodiment will be given the same reference numerals as the parts of the first embodiment. Also, parts of this tenth embodiment that are functionally identical and/or substantially identical to parts of the first embodiment will be given the same reference numerals but with "900" added thereto. In any event, the descriptions of the parts of the tenth embodiment that are substantially identical to the parts of the first embodiment may be omitted for the sake of brevity. However, it will be apparent to those skilled in the art from this disclosure that the descriptions and illustrations of the first embodiment also apply to this tenth embodiment, except as discussed and/or illustrated herein.

As illustrated FIG. 15, the hub assembly 912 basically includes, among other things, the CVT unit 922 and a modified upstream planetary gear unit 932. The upstream planetary gear unit 932 is substantially identical to the upstream planetary gear unit 432 of the fifth embodiment. Thus, description of the upstream planetary gear unit 932 is minimal for the sake of brevity. The upstream planetary gear unit 932 basically includes an upstream sun gear 950, a plurality of upstream planetary gears 952, the upstream ring gear 954 and an upstream planetary gear carrier 956. The upstream planetary gear carrier 956 is fixedly coupled to a driver 928 that couples to the rear chain sprocket 24. In this embodiment, the upstream planetary gear unit 932 includes four of the upstream planetary gears 952 (only two is shown in FIG. 15). However, the number of the upstream planetary gears 952 can be changed as needed or desired. Each of the upstream planetary gears 952 has smaller and larger diameter gear sections 970 and 972.

The upstream ring gear 954 is basically a cylindrical member. The upstream ring gear 954 includes first and second upstream ring gear portions 954a and 954b. The first and second upstream ring gear portions 954a and 954b have radially inwardly extending gear teeth, respectively. The first upstream ring gear portion 954a meshes with the larger diameter gear sections 972 of the upstream planetary gears 952. The second upstream ring gear portion 954b is operatively coupled to the CVT unit 922 to transmit the rotational power to the CVT unit 922. In this embodiment, the second upstream ring gear portion 954b includes an internal gear. However, alternatively, the second upstream ring gear portion 954b can include a serration or a spline that meshes with the CVT unit 922 instead of an internal gear.

The CVT unit 922 basically includes a ring roller 958, a plurality of first conical planetary rollers 960, a first roller carrier 962 (e.g., first carrier), and a sun roller 964. The CVT unit 922 further includes a plurality of second conical planetary rollers 966 and a second roller carrier 968 (e.g., second carrier). Specifically, in this embodiment, the CVT unit 922 includes four of the first conical planetary rollers 960 (only two is shown in FIG. 15), and four of the second conical planetary rollers 966 (only two is shown in FIG. 15). However the numbers of the first conical planetary rollers 960 and the second conical planetary rollers 966 can be changed as needed or desired.

The first roller carrier 962 is operatively supported to the hub shaft 26. In particular, the first roller carrier 962 is rotatably mounted around the hub shaft 26. The first roller carrier 962 is further operatively coupled to the upstream ring gear 954. In particular, the first roller carrier 962 has outwardly extending gear teeth 962a on an outer peripheral face of the first roller carrier 962. The gear teeth 962a of the first roller carrier 962 mesh with the gear teeth of the second upstream ring gear portion 954b such that the first roller carrier 962 receives the rotational power from the upstream ring gear 954. The first conical planetary rollers 960 are circumferentially arranged on the first roller carrier 962 about the hub shaft 26 with equal spacing. The first conical planetary rollers 960 are rotatably supported to the first roller carrier 962 in a conventional manner about rotational axes R3 (e.g., first rotational axes) of the first conical planetary rollers 960, respectively. Each of the rotational axes R3 of the first conical planetary rollers 960 is slanted relative to the center axis R1 of the hub shaft 26. Specifically, each of the rotational axes R3 is configured such that a distance between the center axis R1 and each of the rotational axes R3 decreases along the first axial direction X1 of the center axis R1. The first conical planetary rollers 960 are substantially identical to each other.

The first conical planetary rollers 960 are substantially identical to the first conical planetary rollers 160 of the second embodiment, and arranged in the same manner as the first conical planetary rollers 160 of the second embodiment. Thus, the description of the first conical planetary rollers 960 is minimal for the sake of brevity. Each of the first conical planetary rollers 960 has first and second frictional engagement portions 982 and 984 that are substantially identical to the first and second frictional engagement portions 182 and 184 of the second embodiment, respectively. The first and second frictional engagement portions 982 and 984 frictionally engage with the ring roller 958 and the sun roller 964, respectively. The first and second frictional engagement portions 982 and 984 have no gear teeth.

The ring roller 958 is fixedly and non-rotatably supported to the hub shaft 26. Specifically, the ring roller 958 is formed on a frame part 914. The frame part 914 has a cylindrical inner shell 914a and a casing portion 914b. The frame part 914 is substantially identical to the frame part 514 of the sixth embodiment, except for a configuration of the ring roller 958. The inner shell 914a axially extends along an inner peripheral face of the hub shell 30. The ring roller 958 is formed on an inner peripheral face of the inner shell 914a at one axial end of the inner shell 914a. The inner shell 914a rotatably supports the hub shell 30 by bearing assemblies 38a and 38b that are disposed between the inner shell 914a and the hub shell 30. The casing portion 914b is disposed outside of the hub shell 30, and fixedly coupled to the inner shell 914a. Furthermore, the casing portion 914b is fixedly coupled to the hub shaft 26 and the frame 14. The casing portion 914b covers the rear chain sprocket 24. The driver 928 is rotatably supported relative to the casing portion 914b by the bearing assembly 38c that is disposed between the casing portion 914b and the driver 928. The ring roller 958 includes first and second ring roller portions 978 and 980 at axially spaced apart locations of the ring roller 958 along the center axis R1 of the hub shaft 26. The first and second ring roller portions 978 and 980 frictionally engage with the first and second conical planetary rollers 960 and 966, respectively. The ring roller 958 is substantially identical to the ring roller 158 of the second embodiment, except that the ring roller 958 is independently formed from the upstream ring gear 954 as a separate member, and that the ring roller 958 is formed on the frame part 914. An inner diameter of the first ring roller portion 978 is smaller than an inner diameter of the second ring roller portion 980. The first and second ring roller portions 978 and 980 have no gear teeth.

The sun roller 964 is operatively supported to the hub shaft 26. Specifically, the sun roller 964 is rotatably supported to the hub shaft 26. Furthermore, the sun roller 964 is movable along the center axis R1 of the hub shaft 26. The sun roller 964 frictionally engages with the first and second conical planetary rollers 960 and 966. The sun roller 964 is substantially identical to the sun roller 164 of the second embodiment. Thus, description of the sun roller 964 is minimal for the sake of brevity. The sun roller 964 has first and second sun roller portions 986 and 988 that are substantially identical to the first and second sun roller portion 186 and 188 of the second embodiment. The first and second sun roller portions 986 and 988 frictionally engage with the first and second conical planetary rollers 960 and 966, respectively. The first and second sun roller portions 986 and 988 have no gear teeth.

The second conical planetary rollers 966 are rotatably supported to the second roller carrier 968. The second conical planetary rollers 966 frictionally engage with the ring roller 958 and the sun roller 964. The second roller carrier 968 is substantially identical to the second roller carrier 168 of the second embodiment. Thus, description of the second roller carrier 968 is minimal for the sake of brevity. The second roller carrier 968 is operatively supported to the hub shaft 26. In particular, the second roller carrier 968 is rotatably mounted around the hub shaft 26. The second roller carrier 968 is further operatively coupled to the hub shell 30. The second conical planetary rollers 966 are circumferentially arranged on the second roller carrier 968 about the hubshaft 26 with equal spacing. The second conical planetary rollers 966 are rotatably supported to the second roller carrier 968 in a conventional manner about rotational axes R4 (e.g., second rotational axes) of the second conical planetary rollers 966, respectively. Each of the rotational axes R4 of the second conical planetary rollers 966 is slanted relative to the center axis R1 of the hub shaft 26. Specifically, each of the rotational axes R4 is configured such that a distance between the center axis R1 and each of the rotational axes R4 decreases along the second axial direction X2 of the center axis R1. The second conical planetary rollers 966 are substantially identical to each other. Furthermore, the second conical planetary rollers 966 are substantially identical to the second conical planetary rollers 166 of the second embodiment, and are arranged in the same manner as the second conical planetary rollers 166 of the second embodiment. Thus, description of the second conical planetary rollers 966 is minimal for the sake of brevity. The second conical planetary roller 966 has third and fourth frictional engagement portions 990 and 992 that are substantially identical to the third and fourth frictional engagement portions 190 and 192 of the second embodiment, respectively. The third and fourth frictional engagement portions 990 and 992 frictionally engage with the ring roller 958 and the sun roller 964, respectively. The third and fourth frictional engagement portions 990 and 992 have no gear teeth.

With this configuration of the CVT unit 922, the first and second frictional engagement portions 982 and 984 of the first conical planetary rollers 960 frictionally engage with the first ring roller portion 978 of the ring roller 958 and the first sun roller portion 986 of the sun roller 964, respectively. The third and fourth frictional engagement portions 990 and 992 of the second conical planetary rollers 966 frictionally engage with the second ring roller portion 980 of the ring roller 958 and the second sun roller portion 988 of the sun roller 964, respectively.

Referring further to FIG. 15, the power transmission path of the hub assembly 912 will be discussed in detail. First, the rear chain sprocket 24 receives the rotational power from the front chain sprocket 18 via the chain 20 (see FIG. 1). The rotational power rotates the rear chain sprocket 24 in the forward rotational direction about the center axis R1, which also rotates the driver 928 together with the upstream planetary gear carrier 956 of the upstream planetary gear unit 932 in the forward rotational direction about the center axis R1. The upstream planetary gear unit 932 is arranged to receive the rotational power from the driver 928, and rotate the upstream ring gear 954 in the forward rotational direction about the center axis R1. The upstream planetary gear unit 932 is substantially identical to the upstream planetary gear unit 132 of the second embodiment. Thus, description of transmission of the rotational power through the upstream planetary gear unit 932 is omitted for the sake of brevity.

The CVT unit 922 receives the rotational power from the first roller carrier 962 as a rotational input, and transmits the rotational power to the second roller carrier 968 via the first conical planetary rollers 960, the sun roller 964 and the second conical planetary rollers 966. Specifically, the CVT unit 922 receives the rotational power from the first roller carrier 962 in the forward rotational direction about the center axis R1, and transmits the rotational power to the second roller carrier 968 such that the second roller carrier 968 rotates in the forward rotational direction about the center axis R1. Specifically, the first roller carrier 962 receives the rotational power from the upstream ring gear 954 as a rotational input. On the other hand, each of the first frictional engagement portions 982 of the first conical planetary rollers 960 frictionally engages with the ring roller 958. Thus, the rotational power from the first roller carrier 962 rotates the first conical planetary rollers 960 about the sun roller 964 in the forward rotational direction white the first conical planetary rollers 960 rotates about the rotational axes R3, respectively, which in turn rotates the sun roller 964 in the forward rotational direction about the center axis R1 at a rotational speed according to an axial position of the first sun roller portion 986 of the sun roller 964 (i.e., axial position of the second contact C2). Furthermore, each of the fourth frictional engagement portions 992 of the second conical planetary roller 966 receives the rotational power from the second sun roller portion 988 of the sun roller 964. On the other hand, each of the third frictional engagement portions 990 of the second conical planetary roller 966 frictionally engages with the second ring roller portion 980. Thus, the rotational power from the second sun roller portion 988 of the sun roller 964 rotates the second conical planetary rollers 966 about the second sun roller portion 988 in the forward rotational direction, which in turn rotates the second roller carrier 968 in the forward rotational direction about the center axis R1. The second roller carrier 968 rotates in the forward rotational direction about the center axis R1 at a rotational speed according to an axial position of the second sun roller portion 988 of the sun roller 964 (i.e., axial position of the fourth contact C4). The second roller carrier 968 is operatively coupled to the hub shell 30. Thus, the second roller carrier 968 further transmits the rotational power to the hub shell 30 via the cam loader 94 with the output plate 98, and the one-way clutch 104.

The varying mechanism 96 continuously changes an axial position of the sun roller 964 between the first axial position (shown in FIG. 3) and the second axial position (shown in FIG. 5) via the middle axial position (shown in FIG. 4) along the center axis R1 of the hub shaft 26. The second effective diameter D2 (or engaging radius) of the second frictional engagement portion 984 of the first conical planetary roller 960 at the second contact C2 between the second frictional engagement portion 984 and the first sun roller portion 986 of the sun roller 964 gradually decreases as the sun roller 964 continuously moves from the first axial position toward the second axial position along the first axial direction X1. The fourth effective diameter D4 (or engaging radius) of the fourth frictional engagement portion 992 of the second conical planetary roller 966 at the fourth contact C4 between the fourth frictional engagement portion 992 and the second sun roller portion 988 of the sun roller 964 gradually increases as the sun roller 964 continuously moves from the first axial position toward the second axial position along the first axial direction X1. These axial movements of the second and fourth contacts C2 and C4 on the second and fourth frictional engagement portion 984 and 992 changes effective radial distance between the ring roller 958 and the sun roller 964, thereby causing gear ratio of the CVT unit 922 to change. Specifically, these axial movements of the second and fourth contacts C2 and C4 cause gear ratios of the first and second conical planetary rollers 960 and 966 to continuously change, respectively, thereby continuously changing a gear ratio of the hub assembly 912.

In this embodiment, the ring roller 958 is formed on the frame part 914, and is disposed around the first and second conical planetary rollers 960 and 966. However, each of the first and second ring roller portions 978 and 980 of the ring roller 958 can be formed as a cone roller that is fixedly coupled to the hub shaft 26, respectively. In this case, the first ring roller portion 978 frictionally engages with the first frictional engagement portions 982 at radially inward facing portions of the first frictional engagement portions 982 that face toward the center axis R1 of the hub shaft 26. Furthermore, the second ring roller portion 980 frictionally engages with the third frictional engagement portions 990 at radially inward facing portions of the third frictional engagement portions 990 that face toward the center axis R1 of the hub shaft 26.

Eleventh Embodiment

Figure 16:
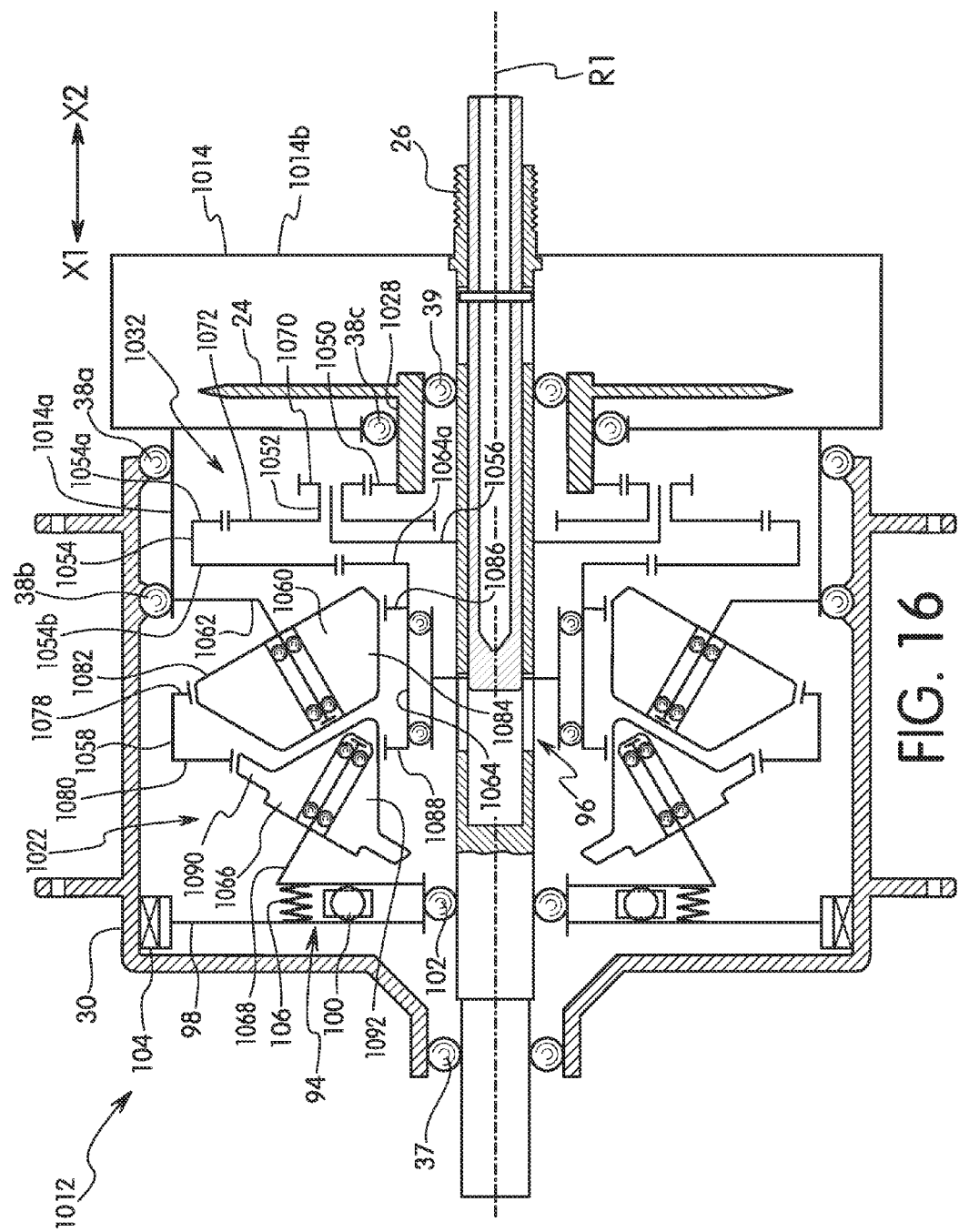
FIG. 16 is a schematic representation of a hub assembly having a continuously variable bicycle transmission unit in accordance with an eleventh embodiment, illustrating a power transmission in the hub assembly.

Referring now to FIG. 16, a hub assembly 1012 with a modified continuously variable transmission unit 1022 (hereinafter "CVT unit 1022") in accordance with an eleventh embodiment will now be explained. The CVT unit 1022 is basically different from the CVT unit 22 of the first embodiment in that a first roller carrier of the CVT unit 1022 is non-rotatably coupled to the hub shaft 26, and that a sun roller of the CVT unit 1022 is operatively coupled to a driver to receive a rotational power from the driver.

In view of the similarity between the first and eleventh embodiments, the parts of the eleventh embodiment that are identical to the parts of the first embodiment will be given the same reference numerals as the parts of the first embodiment. Also, parts of this eleventh embodiment that are functionally identical and/or substantially identical to parts of the first embodiment will be given the same reference numerals but with "1000" added thereto. In any event, the descriptions of the parts of the eleventh embodiment that are substantially identical to the parts of the first embodiment may be omitted for the sake of brevity. However, it will be apparent to those skilled in the art from this disclosure that the descriptions and illustrations of the first embodiment also apply to this eleventh embodiment, except as discussed and/or illustrated herein.

As illustrated in FIG. 16, the hub assembly 1012 basically includes, among other things, the CVT unit 1022 and a modified upstream planetary gear unit 1032. The upstream planetary gear unit 1032 is substantially identical to the upstream planetary gear unit 632 of the seventh embodiment. Thus, description of the upstream planetary gear unit 1032 is minimal for the sake of brevity. The upstream planetary gear unit 1032 basically includes an upstream sun gear 1050, a plurality of upstream planetary gears 1052, the upstream ring gear 1054 and an upstream planetary gear carrier 1056. The upstream sun gear 1050 is fixedly coupled to a driver 1028 that couples to the rear chain sprocket 24. In this embodiment, the upstream planetary gear unit 1032 includes four of the upstream planetary gears 1052 (only two is shown in FIG. 16). However, the number of the upstream planetary gears 1052 can be changed as needed or desired. Each of the upstream planetary gears 1052 has smaller and larger diameter gear sections 1070 and 1072.

The upstream ring gear 1054 is basically a cylindrical member. The upstream ring gear 1054 includes first and second upstream ring gear portions 1054a and 1054b. The first and second upstream ring gear portions 1054a and 1054b have radially inwardly extending gear teeth, respectively. The first upstream ring gear portion 1054a meshes with the larger diameter gear sections 1072 of the upstream planetary gears 1052. The second upstream ring gear portion 1054b is operatively coupled to the CVT unit 1022 to transmit the rotational power to the CVT unit 1022. In this embodiment, the second upstream ring gear portion it 054b includes an internal gear. However, alternatively, the second upstream ring gear portion 1054b can include a serration or a spline that meshes with the CVT unit 1022 instead of an internal gear.

The CVT unit 1022 basically includes a ring roller 1058, a plurality of first conical planetary rollers 1060, a first roller carrier 1062 (e.g., first carrier), and a sun roller 1064. The CVT unit 1022 further includes a plurality of second conical planetary rollers 1066 and a second roller carrier 1068 (e.g., second carrier). Specifically, in this embodiment, the CVT unit 1022 includes four of the first conical planetary rollers 1060 (only two is shown in FIG. 16), and four of the second conical planetary rollers 1066 (only two is shown in FIG. 16). However the numbers of the first conical planetary rollers 1060 and the second conical planetary rollers 1066 can be changed as needed or desired.

The sun roller 1064 is operatively supported to the huh shaft 26. Specifically, the sun roller 1064 is rotatably supported to the hub shaft 26. Furthermore, the sun roller 1064 is movable along the center axis R1 of the hub shaft 26. The sun roller 1064 frictionally engages with the first and second conical planetary rollers 1060 and 1066. The sun roller 1064 is substantially identical to the sun roller 64 of the first embodiment, except that the sun roller 1064 is operatively coupled to the driver 1028 via the upstream planetary gear unit 1032. Thus, description of the sun roller 1064 is minimal for the sake of brevity. The sun roller 1064 has first and second sun roller portions 1086 and 1088 that are substantially identical to the first and second sun roller portions 86 and 88 of the first embodiment. The first and second sun roller portions 1086 and 1088 frictionally engage with the first and second conical planetary rollers 1060 and 1066, respectively. The first and second sun roller portions 1086 and 1088 have no gear teeth. Furthermore, the sun roller 1064 has outwardly extending gear teeth 1064a on an outer peripheral face of the sun roller 1064. The gear teeth 1064a of the sun roller 1064 axially slidably mesh with the gear teeth of the second upstream ring gear portion 1054h such that the sun roller 1064 receives the rotational power from the upstream ring gear 1054.

The first roller carrier 1062 is non-movably supported to the hub shaft 26. Specifically, the first roller carrier 1062 is formed on a frame part 1014. The frame part 1014 has a cylindrical inner shell 1014a and a casing portion 1014b. The frame part 1014 is substantially identical to the frame part 514 of the sixth embodiment, except that the first roller carrier 1062 is formed on the frame part 1014. The inner shell 1014a axially extends along an inner peripheral face of the hub shell 30. The first roller carrier 1062 is formed on an inner peripheral face of the inner shell 1014a at one axial end of the inner shell 1014a. The inner shell 1014a rotatably supports the hub shell 30 by bearing assemblies 38a and 38b that are disposed between the inner shell 1014a and the hub shell 30. The casing portion 1014b is disposed outside of the hub shell 30, and fixedly coupled to the inner shell 1014a. Furthermore, the casing portion 1014b is fixedly coupled to the hub shaft 26 and the frame 14. The casing portion 1014b covers the rear chain sprocket 24. The driver 1028 is rotatably supported relative to the casing portion 1014b by the bearing assembly 38c that is disposed between the casing portion 1014b and the driver 1028. The first conical planetary rollers 1060 are circumferentially arranged on the first roller carrier 1062 about the huh shaft 26 with equal spacing.

The first conical planetary rollers 1060 are rotatably supported to the first roller carrier 1062 in a conventional manner about rotational axes R3 (e.g., first rotational axes) of the first conical planetary rollers 1060, respectively. Each of the rotational axes R3 of the first conical planetary rollers 1060 is slanted relative to the center axis R1 of the hub shaft 26. Specifically, each of the rotational axes R3 is configured such that a distance between the center axis R1 and each of the rotational axes R3 decreases along the first axial direction X1 of the center axis R1. The first conical planetary rollers 1060 are substantially identical to each other. The first conical planetary rollers 1060 are substantially identical to the first conical planetary rollers 60 of the first embodiment, and arranged in the same manner as the first conical planetary rollers 60 of the first embodiment. Thus, the description of the first conical planetary rollers 1060 is minimal for the sake of brevity. Each of the first conical planetary rollers 1060 has first and second frictional engagement portions 1082 and 1084 that are substantially identical to the first and second frictional engagement portions 82 and 84 of the first embodiment, respectively. The first and second frictional engagement portions 1082 and 1084 frictionally engage with the ring roller 1058 and the sun roller 1064, respectively. The first and second frictional engagement portions 1082 and 1084 have no gear teeth.

The ring roller 1058 is operatively supported to the hub shaft 26. Specifically, the ring roller 1058 is rotatably supported to the hub shaft 26. The ring roller 1058 includes first and second ring roller portions 1078 and 1080 at axially spaced apart locations of the ring roller 1058 along the center axis R1 of the hub shaft 26. The first and second ring roller portions 1078 and 1080 frictionally engage with the first and second conical planetary rollers 1060 and 1066, respectively. The ring roller 1058 is substantially identical to the ring roller 58 of the first embodiment, except that the ring roller 1058 is independently formed from the upstream ring gear 1054 as a separate member. An inner diameter of the first ring roller portion 1078 is larger than an inner diameter of the second ring roller portion 1080. The first and second ring roller portions 1078 and 1080 have no gear teeth.

The second conical planetary rollers 1066 are rotatably supported to the second roller carrier 1068. The second conical planetary rollers 1066 frictionally engage with the ring roller 1058 and the sun roller 1064. The second roller carrier 1068 is substantially identical to the second roller carrier 68 of the first embodiment. Thus, description of the second roller carrier 1068 is minimal for the sake of brevity. The second roller carrier 1068 is operatively supported to the hub shaft 26. In particular, the second roller carrier 1068 is rotatably mounted around the hub shaft 26. The second roller carrier 1068 is further operatively coupled to the hub shell 30. The second conical planetary rollers 1066 are circumferentially arranged on the second roller carrier 1068 about the hub shaft 26 with equal spacing. The second conical planetary rollers 1066 are rotatably supported to the second roller carrier 1068 in a conventional manner about rotational axes R4 (e.g., second rotational axes) of the second conical planetary rollers 1066, respectively. Each of the rotational axes R4 of the second conical planetary rollers 1066 is slanted relative to the center axis R1 of the hub shaft 26. Specifically, each of the rotational axes R4 is configured such that a distance between the center axis R1 and each of the rotational axes R4 decreases along the second axial direction X2 of the center axis R1. The second conical planetary rollers 1066 are substantially identical to each other. Furthermore, the second conical planetary rollers 1066 are substantially identical to the second conical planetary rollers 66 of the first embodiment, and are arranged in the same manner as the second conical planetary rollers 66 of the first embodiment. Thus, description of the second conical planetary rollers 1066 is minimal for the sake of brevity. The second conical planetary roller 1066 has third and fourth frictional engagement portions 1090 and 1092 that are substantially identical to the third and fourth frictional engagement portions 90 and 92 of the first embodiment, respectively. The third and fourth frictional engagement portions 1090 and 1092 frictionally engage with the ring roller 1058 and the sun roller 1064, respectively. The third and fourth frictional engagement portions 1090 and 1092 have no gear teeth.

With this configuration of the CVT unit 1022, the first and second frictional engagement portions 1082 and 1084 of the first conical planetary rollers 1060 frictionally engage with the first ring roller portion 1078 of the ring roller 1058 and the first sun roller portion 1086 of the sun roller 1064, respectively. The third and fourth frictional engagement portions 1090 and 1092 of the second conical planetary rollers 1066 frictionally engage with the second ring roller portion 1080 of the ring roller 1058 and the second sun roller portion 1088 of the sun roller 1064, respectively.

Referring further to FIG. 16, the power transmission path of the hub assembly 1012 will be discussed in detail. First, the rear chain sprocket 24 receives the rotational power from the front chain sprocket 18 via the chain 20 (see FIG. 1). The rotational power rotates the rear chain sprocket 24 in the forward rotational direction about the center axis R1, which also rotates the driver 1028 together with the upstream sun gear 1050 of the upstream planetary gear unit 1032 in the forward rotational direction about the center axis R1. The upstream planetary gear unit 1032 is arranged to receive the rotational power from the driver 1028, and rotate the upstream ring gear 1054 in the reverse rotational direction about the center axis R1. The upstream planetary gear unit 1032 is substantially identical to the upstream planetary gear unit 32 of the first embodiment. Thus, description of transmission of the rotational power through the upstream planetary gear unit 1032 is omitted for the sake of brevity.

The CVT unit 1022 receives the rotational power from the sun roller 1064 as a rotational input, and transmits the rotational power to the second roller carrier 1068 via the first conical planetary rollers 1060, the ring roller 1058 and the second conical planetary rollers 1066. Specifically, the CVT unit 1022 receives the rotational power from the sun roller 1064 in the reverse rotational direction about the center axis R1, and transmits the rotational power to the second roller carrier 1068 such that the second roller carrier 1068 rotates in the forward rotational direction about the center axis R1. In particular, each of the second frictional engagement portions 1084 of the first conical planetary rollers 1060 receives the rotational power from the first sun roller portion 1086 of the sun roller 1064 as a rotational input. Then, each of the first frictional engagement portions 1082 of the first conical planetary rollers 1060 transmits the rotational power to the first ring roller portion 1078 of the ring roller 1058. As a result, the ring roller 1058 rotates in the forward rotational direction about the center axis R1 at a rotational speed according to an axial position of the first sun roller portion 1086 of the sun roller 1064 (i.e., axial position of the second contact C2). On the other hand, each of the fourth frictional engagement portions 1092 of the second conical planetary roller 1066 receives the rotational power from the second sun roller portion 1088 of the sun roller 1064. Furthermore, each of the third frictional engagement portions 1090 of the second conical planetary roller 1066 receives the rotational power from the second ring roller portion 1080. In other words, each of the second conical planetary rollers 66 receives two rotational inputs from the ring roller 1058 and the sun roller 1064. Each of the second conical planetary rollers 1066 operates as a differential. Thus, each of the second conical planetary rollers 1066 combine the two rotational inputs from the ring roller 1058 and the sun roller 1064 to cause each of the second conical planetary rollers 1066 to rotate in the forward rotational direction about the center axis R1 at a rotational speed according to an axial position of the second sun roller portion 1088 of the sun roller 1064 (i.e., axial position of the fourth contact C4). Furthermore, this rotational movement of each of the second conical planetary rollers 1066 in turn causes the second roller carrier 1068 to rotate in the forward rotational direction about center axis R1. The second roller carrier 1068 is operatively coupled to the hub shell 30. Thus, the second roller carrier 1068 further transmits the rotational power to the hub shell 30 via the cam loader 94 with the output plate 98, and the one-way clutch 104.

The varying mechanism 96 continuously changes an axial position of the sun roller 1064 between the first axial position (shown in FIG. 3) and the second axial position (shown in FIG. 5) via the middle axial position (shown in FIG. 4) along the center axis R1 of the hub shaft 26. The second effective diameter D2 (or engaging radius) of the second frictional engagement portion 1084 of the first conical planetary roller 1060 at the second contact C2 between the second frictional engagement portion 1084 and the first sun roller portion 1086 of the sun roller 1064 gradually decreases as the sun roller 1064 continuously moves from the first axial position toward the second axial position along the first axial direction X1. The fourth effective diameter D4 (or engaging radius) of the fourth frictional engagement portion 1092 of the second conical planetary roller 1066 at the fourth contact C4 between the fourth frictional engagement portion 1092 and the second sun roller portion 1088 of the sun roller 1064 gradually increases as the sun roller 1064 continuously moves from the first axial position toward the second axial position along the first axial direction X1. These axial movements of the second and fourth contacts C2 and C4 on the second and fourth frictional engagement portion 1084 and 1092 changes effective radial distance between the ring roller 1058 and the sun roller 1064, thereby causing gear ratio of the CVT unit 1022 to change. Specifically, these axial movements of the second and fourth contacts C2 and C4 cause gear ratios of the first and second conical planetary rollers 1060 and 1066 to continuously change, respectively, thereby continuously changing a gear ratio of the hub assembly 1012.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features). Thus, the foregoing descriptions of the embodiments according to the present invention are provided for illustration only, and not for the purpose of limiting the invention as defined by the appended claims and their equivalents.

What is claimed is:

1. A continuously variable bicycle transmission comprising:
 a ring roller;
 a first conical planetary roller frictionally engaged with the ring roller;
 a first carrier rotatably supporting the first conical planetary roller;
 a sun roller movable along an axis, the sun roller being frictionally engaged with the first conical planetary roller; and
 an upstream planetary gear mechanism operatively disposed between a drive member and a driven member, and the upstream planetary gear mechanism being arranged to receive a rotation of the drive member and rotate the sun roller.

2. The continuously variable bicycle transmission according to claim 1, further comprising
 a shaft supporting the ring roller, the first carrier and the sun roller,
 the sun roller being movable along the shaft.

3. The continuously variable bicycle transmission according to claim 1, further comprising
 the drive member operatively coupled to the ring roller, and
 the driven member operatively coupled to the first carrier.

4. The continuously variable bicycle transmission according to claim 1, further comprising
 the drive member operatively coupled to the ring roller, and
 the driven member operatively coupled to the sun roller.

5. The continuously variable bicycle transmission according to claim 1, further comprising
 the drive member operatively coupled to the first carrier, and
 the driven member operatively coupled to the ring roller.

6. The continuously variable bicycle transmission according to claim 1, further comprising
 the drive member operatively coupled to the first carrier, and
 the driven member operatively coupled to the sun roller.

7. The continuously variable bicycle transmission according to claim 1, further comprising
 the drive member operatively coupled to the sun roller, and
 the driven member operatively coupled to the ring roller.

8. The continuously variable bicycle transmission according to claim 1, further comprising
 the drive member operatively coupled to the sun roller, and
 the driven member operatively coupled to the first carrier.

9. The continuously variable bicycle transmission according to claim 1, wherein the first conical planetary roller has first and second frictional engagement portions at axially spaced apart locations of the first conical planetary roller along a first rotational axis of the first conical planetary roller, the first and second frictional engagement portions frictionally engaging the ring roller and the sun roller, respectively.

10. The continuously variable bicycle transmission according to claim 1, further comprising
a second conical planetary roller frictionally engaged with the ring roller and the sun roller, and
a second carrier rotatably supporting the second conical planetary roller.

11. The continuously variable bicycle transmission according to claim 10, further comprising
a shaft supporting the ring roller, the first and second carriers and the sun roller,
the sun roller being movable along the shaft.

12. The continuously variable bicycle transmission according to claim 10, further comprising
the drive member operatively coupled to the ring roller, and
the driven member operatively coupled to the second carrier.

13. The continuously variable bicycle transmission according to claim 10, further comprising
the drive member operatively coupled to the first carrier, and
the driven member operatively coupled to the second carrier.

14. The continuously variable bicycle transmission according to claim 10, further comprising
the drive member operatively coupled to the sun roller, and
the driven member operatively coupled to the second carrier.

15. The continuously variable bicycle transmission according to claim 10, wherein
the first conical planetary roller has first and second frictional engagement portions at axially spaced apart locations of the first conical planetary roller along a first rotational axis of the first conical planetary roller, the first and second frictional engagement portions frictionally engaging the ring roller and the sun roller, respectively,
the second conical planetary roller has third and fourth frictional engagement portions at axially spaced apart locations of the second conical planetary roller along a second rotational axis of the second conical planetary roller, the third and fourth frictional engagement portions frictionally engaging the ring roller and the sun roller, respectively.

16. The continuously variable bicycle transmission according to claim 1, further comprising
a varying mechanism operatively coupled to the sun roller such that the varying mechanism changes an axial position of the sun roller between a first axial position and a second axial position along the axis.

17. The continuously variable bicycle transmission according to claim 1, further comprising
a shaft defining the axis,
the drive member rotatably supported to the shaft, and
the driven member rotatably supported to the shaft,
the ring roller being operatively supported to the shaft,
the first carrier being operatively supported to the shaft,
the sun roller operatively supported to the shaft, the sun roller being movable along the shaft.

18. The continuously variable bicycle transmission according to claim 17, wherein
the drive member is operatively coupled to the ring roller, and
the driven member is operatively coupled to the first carrier.

19. The continuously variable bicycle transmission according to claim 17, wherein
the drive member is operatively coupled to the ring roller, and
the driven member is operatively coupled to the sun roller.

20. The continuously variable bicycle transmission according to claim 17, wherein
the drive member is operatively coupled to the first carrier, and
the driven member is operatively coupled to the ring roller.

21. The continuously variable bicycle transmission according to claim 17, wherein
the drive member is operatively coupled to the first carrier, and
the driven member is operatively coupled to the sun roller.

22. The continuously variable bicycle transmission according to claim 17, wherein
the drive member is operatively coupled to the sun roller, and
the driven member is operatively coupled to the ring roller.

23. The continuously variable bicycle transmission according to claim 17, wherein
the drive member is operatively coupled to the sun roller, and
the driven member is operatively coupled to the first carrier.

24. A continuously variable bicycle transmission comprising:
a ring roller;
a first conical planetary roller frictionally engaged with the ring roller;
a first carrier rotatably supporting the first conical planetary roller; and
a sun roller movable along an axis, the sun roller being frictionally engaged with the first conical planetary roller;
a shaft defining the axis;
a drive member rotatably supported to the shaft;
a driven member rotatably supported to the shaft;
the ring roller being operatively supported to the shaft;
the first carrier being operatively supported to the shaft;
the sun roller operatively supported to the shaft, the sun roller being movable along the shaft; and
the first conical planetary roller having first and second frictional engagement portions at axially spaced apart locations of the first conical planetary roller along a first rotational axis of the first conical planetary roller, the first and second frictional engagement portions frictionally engaging the ring roller and the sun roller, respectively.

25. The continuously variable bicycle transmission according to claim 17, further comprising
a second conical planetary roller frictionally engaged with the ring roller and the sun roller, and
a second carrier operatively supported to the shaft, the second carrier rotatably supporting the second conical planetary roller.

26. The continuously variable bicycle transmission according to claim 25, wherein
the drive member is operatively coupled to the ring roller, and
the driven member is operatively coupled to the second carrier.

27. The continuously variable bicycle transmission according to claim 25, wherein
the drive member is operatively coupled to the first carrier, and
the driven member is operatively coupled to the second carrier.

28. The continuously variable bicycle transmission according to claim 25, wherein
the drive member is operatively coupled to the sun roller, and
the driven member is operatively coupled to the second carrier.

29. The continuously variable bicycle transmission according to claim 25, wherein
the first conical planetary roller has first and second frictional engagement portions at axially spaced apart locations of the first conical planetary roller along a first rotational axis of the first conical planetary roller, the first and second frictional engagement portions frictionally engaging the ring roller and the sun roller, respectively;
the second conical planetary roller has third and fourth frictional engagement portions at axially spaced apart locations of the second conical planetary roller along a second rotational axis of the second conical planetary roller, the third and fourth frictional engagement portions frictionally engaging the ring roller and the sun roller, respectively.

30. The continuously variable bicycle transmission according to claim 17, further comprising
a varying mechanism operatively coupled to the sun roller such that the varying mechanism changes an axial position of the sun roller between a first axial position and a second axial position along the shaft.

31. The continuously variable bicycle transmission according to claim 30, wherein
the first conical planetary roller is configured such that an engaging radius of the first conical planetary roller at a second frictional engagement portion decreases as the sun roller moves from the first axial position toward the second axial position.

32. The continuously variable bicycle transmission according to claim 29, further comprising
a varying mechanism operatively coupled to the sun roller such that the varying mechanism changes an axial position of the sun roller between a first axial position and a second axial position along the shaft.

33. The continuously variable bicycle transmission according to claim 32, wherein
the first conical planetary roller is configured such that an engaging radius of the first conical planetary roller at the second frictional engagement portion decreases as the sun roller moves from the first position toward the second position, and
the second conical planetary roller is configured such that an engaging radius of the second conical planetary roller at the fourth frictional engagement portion increases as the sun roller moves from the first position toward the second position.

34. The continuously variable bicycle transmission according to claim 17, wherein
the first conical planetary roller has a first rotational axis that is slanted relative to a center axis of the shaft.

35. The continuously variable bicycle transmission according to claim 25, wherein
the first conical planetary roller has a first rotational axis that is slanted relative to a center axis of the shaft,
the second conical planetary roller has a second rotational axis that is slanted relative to the center axis of the shaft.

36. The continuously variable bicycle transmission according to claim 1, wherein
the upstream planetary gear mechanism is arranged to rotate the ring roller.

37. The continuously variable bicycle transmission according to claim 1, wherein
the upstream planetary gear mechanism is arranged to rotate the first carrier.

38. A continuously variable bicycle transmission comprising:
a ring roller;
a first conical planetary roller frictionally engaged with the ring roller;
a first carrier rotatably supporting the first conical planetary roller; and
a sun roller movable along an axis, the sun roller being frictionally engaged with the first conical planetary roller;
a shaft defining the axis;
a drive member rotatably supported to the shaft;
a driven member rotatably supported to the shaft;
an upstream planetary gear mechanism operatively disposed between the drive member and the driven member;
the ring roller being operatively supported to the shaft;
the first carrier being operatively supported to the shaft;
the sun roller operatively supported to the shaft, the sun roller being movable along the shaft; and
the upstream planetary gear mechanism being arranged to receive a rotation of the drive member and rotate the sun roller.

39. The continuously variable bicycle transmission according to claim 1, wherein
the upstream planetary gear mechanism includes
an upstream sun gear that is disposed on an outer peripheral face of the drive member,
an upstream ring gear that is disposed on an inner peripheral face of the ring roller,
an upstream planetary gear that is engaged with the upstream sun gear and the upstream ring gear, and
an upstream planetary gear carrier that is non-rotatably supported to the shaft, the upstream planetary gear carrier rotatably supporting the upstream planetary gear.

40. The continuously variable bicycle transmission according to claim 1, wherein
the upstream planetary gear mechanism includes
an upstream sun gear that is disposed on an outer peripheral face of the shaft,
an upstream ring gear that is disposed on an inner peripheral face of the ring roller,
an upstream planetary gear that is engaged with the upstream sun gear and the upstream ring gear, and
an upstream planetary gear carrier that is disposed on an outer peripheral face of the drive member, the upstream planetary gear carrier rotatably supporting the upstream planetary gear.

41. The continuously variable bicycle transmission according to claim 25, further comprising
an axial biasing member, disposed between the driven member and the second carrier, the axial biasing member being configured to bias the second carrier away from the driven member.

42. The continuously variable bicycle transmission according to claim 41, wherein the biasing member includes
an output member that is disposed between the driven member and the second carrier, the output member being rotatably mounted around the shaft, the output member being axially non-movably supported to the shaft,
a ball that is disposed between the output member and the second carrier, and
a cam surface that is disposed on at least one of the output member and the second carrier, the cam surface being configured such that the ball axially presses the second carrier away from the output member when the output member and the second carrier relatively rotate with respect to each other.

43. The continuously variable bicycle transmission according to claim 25, wherein
the ring roller further has first and second ring roller portions at axially spaced apart locations of the ring roller along the shaft, the first and second ring roller portions frictionally engaging the first and second conical planetary rollers, respectively.

44. The continuously variable bicycle transmission according to claim 43, wherein
the first and second ring roller portions have first and second tapered inner peripheral faces, respectively.

45. The continuously variable bicycle transmission according to claim 43, wherein
an inner diameter of the first ring roller portion is larger than an inner diameter of the second ring roller portion.

46. The continuously variable bicycle transmission according to claim 43, wherein
an inner diameter of the first ring roller portion is smaller than an inner diameter of the second ring roller portion.

47. The continuously variable bicycle transmission according to claim 25, wherein
the sun roller has first and second sun roller portions at axially spaced apart locations of the sun roller along the shaft, the first and second sun roller portions frictionally engaging the first and second conical planetary rollers, respectively.

48. The continuously variable bicycle transmission according to claim 47, wherein
an interface between the first sun roller portion and the first conical planetary roller and an interface between the second sun roller portion and the second conical planetary roller are substantially parallel to each other.

49. The continuously variable bicycle transmission according to claim 29, wherein
an interface between the second frictional engagement portion of the first conical planetary roller and the sun roller and an interface between the fourth frictional engagement portion of the second conical planetary roller and the sun roller are substantially parallel to each other.

50. The continuously variable bicycle transmission according to claim 10, wherein
the ring roller is configured to be operatively coupled to a bicycle drive member,
the first carrier is configured to be non-rotatably mounted on a bicycle axle,
the sun roller is configured to be rotatably mounted around the axle, the sun roller being movable along the axle, and
the second carrier is configured to be rotatably mounted around the axle, the second carrier being further configured to be operatively coupled to a bicycle driven member.

51. The continuously variable bicycle transmission according to claim 10, further comprising
a hub shaft defining the axis,
a driver rotatably supported to the shaft,
a hub shell rotatably supported to the shaft,
a varying mechanism operatively coupled to the sun roller such that the varying mechanism changes an axial position of the sun roller between a first axial position and a second axial position along the shaft,
the upstream planetary gear mechanism operatively disposed between the driver and the hub shell, and
an axial biasing member disposed between the hub shell and the second carrier, the axial biasing member being configured to bias the second carrier,
the ring roller being operatively supported to the shaft and operatively coupled to the driver,
the first carrier being non-rotatably supported to the shaft,
the sun roller being operatively supported to the shaft, the sun roller being movable along the shaft, and
the second carrier being operatively supported to the shaft and operatively coupled to the hub shell.

* * * * *